(12) United States Patent
Maekawa et al.

(10) Patent No.: US 9,341,754 B2
(45) Date of Patent: May 17, 2016

(54) LIGHT DIFFUSER FOR POINT LIGHT SOURCE AND DIRECT TYPE POINT LIGHT SOURCE BACKLIGHT DEVICE

(75) Inventors: Tomofumi Maekawa, Tokyo (JP); Masaaki Kondo, Tokyo (JP)

(73) Assignee: Asahi Kasei E-materials Corporation, Tokyo (JP)

( * ) Notice: Subject to any disclaimer, the term of this patent is extended or adjusted under 35 U.S.C. 154(b) by 261 days.

(21) Appl. No.: 13/394,383

(22) PCT Filed: Jun. 11, 2010

(86) PCT No.: PCT/JP2010/059979
§ 371 (c)(1),
(2), (4) Date: Mar. 28, 2012

(87) PCT Pub. No.: WO2011/030594
PCT Pub. Date: Mar. 17, 2011

(65) Prior Publication Data
US 2012/0176772 A1    Jul. 12, 2012

(30) Foreign Application Priority Data

Sep. 11, 2009  (JP) ................................ 2009-211115
Sep. 11, 2009  (JP) ................................ 2009-211117

(51) Int. Cl.
*G02B 5/04*    (2006.01)
*G02B 5/02*    (2006.01)

(52) U.S. Cl.
CPC ............ *G02B 5/0231* (2013.01); *G02B 5/0278* (2013.01)

(58) Field of Classification Search
CPC ... G02B 6/0053; G02B 5/0231; G02B 5/0278
USPC .................................. 362/235, 246, 612, 620
See application file for complete search history.

(56) References Cited

U.S. PATENT DOCUMENTS 6,517,213 B1    2/2003   Fujita et al.
7,334,920 B2    2/2008   Chang
(Continued)

FOREIGN PATENT DOCUMENTS

CN    101046576 A    10/2007
JP    05-196808 A    8/1993
(Continued)

OTHER PUBLICATIONS

International Search Report from International Application No. PCT/JP2010/059979 mailed Sep. 21, 2010.
(Continued)

*Primary Examiner* — Sean Gramling
*Assistant Examiner* — Gerald J. Sufleta, II
(74) *Attorney, Agent, or Firm* — Morgan, Lewis & Bockius LLP

(57) ABSTRACT

In a direct type point light source backlight using point light sources, a light diffuser is provided that can achieve coexistence of superior luminance, luminance uniformity (front and oblique views), and a color unevenness characteristic even with a desired backlight thickness and a few number of point light sources without using a number of optical films together. Specifically, provided is a light diffuser for point light sources, the light diffuser having a plurality of convex portions formed on a surface thereof, wherein the convex portion has a substantially triangular pyramid shape whose bottom surface is a triangle, and an inclined angle θ with respect to a bottom surface of a side surface of the substantially triangular pyramid shape and a refractive index A of a material forming the convex portion satisfy the following equations (1) and (2).

$$\theta \geq -40A° + 115.2°$$ (1)

$$\theta \leq 25A° + 22.25°$$ (2)

16 Claims, 24 Drawing Sheets

(56) References Cited

U.S. PATENT DOCUMENTS

| | | | |
|---|---|---|---|
| 7,441,938 B2 * | 10/2008 | Sakai et al. | 362/634 |
| 2001/0030638 A1 | 10/2001 | Kashima | |
| 2006/0103790 A1 | 5/2006 | Choi et al. | |
| 2008/0007966 A1 | 1/2008 | Ohkawa | |
| 2008/0112184 A1 | 5/2008 | Epstein et al. | |
| 2009/0080220 A1 * | 3/2009 | Chang | 362/620 |
| 2009/0262428 A1 | 10/2009 | Kurokawa | |
| 2009/0268430 A1 | 10/2009 | Suzuki et al. | |

FOREIGN PATENT DOCUMENTS

| | | |
|---|---|---|
| JP | 078805 U | 2/1995 |
| JP | H10-246805 A | 9/1998 |
| JP | H10274947 A | 10/1998 |
| JP | 2006-119561 A | 5/2006 |
| JP | 2007-178875 A | 7/2007 |
| JP | 2007-179036 A | 7/2007 |
| JP | 2007-227410 A | 9/2007 |
| JP | 2007-299572 A | 11/2007 |
| TW | 200819795 A | 5/2008 |
| TW | 200834185 A | 8/2008 |
| TW | 200839379 A | 10/2008 |
| TW | 200928448 A | 7/2009 |
| WO | 2007/114158 A1 | 10/2007 |

OTHER PUBLICATIONS

Office Action issued in corresponding Taiwanese Patent Application No. 099119336 dated Aug. 26, 2013.

Chinese Office Action mailed Oct. 28, 2013, issued in Chinese Patent Application No. 201080047866.8.

* cited by examiner

Convex triangular pyramid

Top R convex triangular pyramid

Convex triangular pyramid frustum

Convex triangular pyramid shape

Fig. 7
Diffuser layer configuration
(a) and (b) same layer
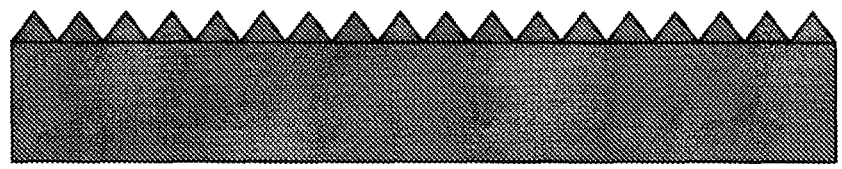
(a) and (b) continuous layer
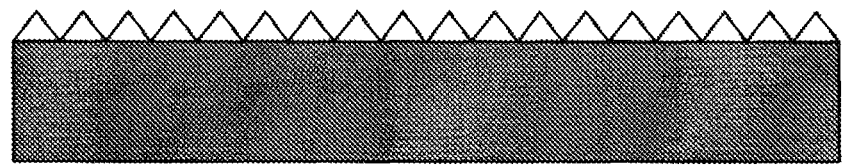
(a) and (b) separation layers
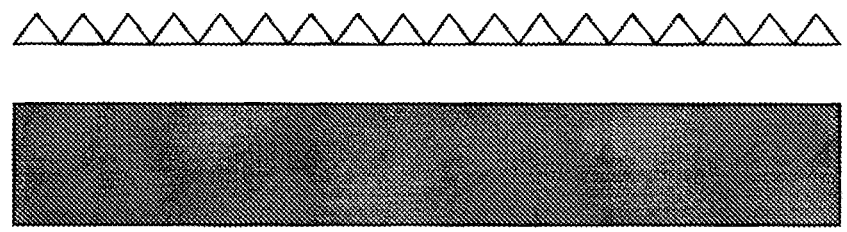

LED-1 light outgoing pattern

Fig. 10
Diffuser surface shape view (elevational view)
Convex triangular pyramid shape
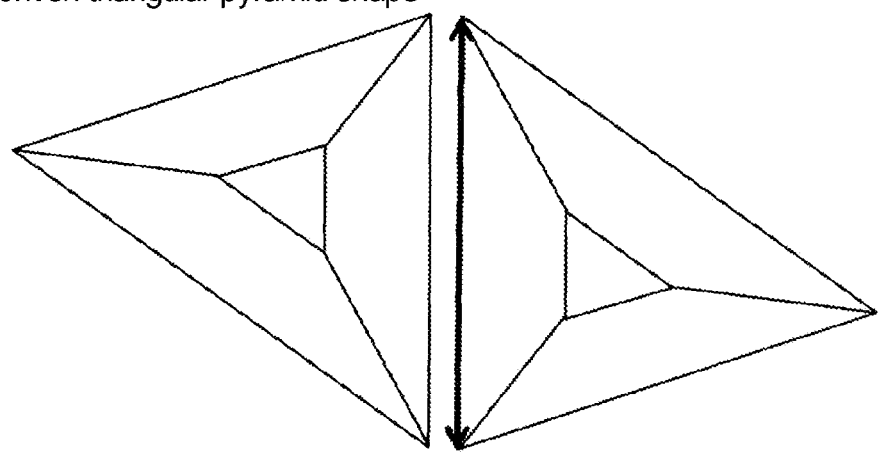
LED arrangement view
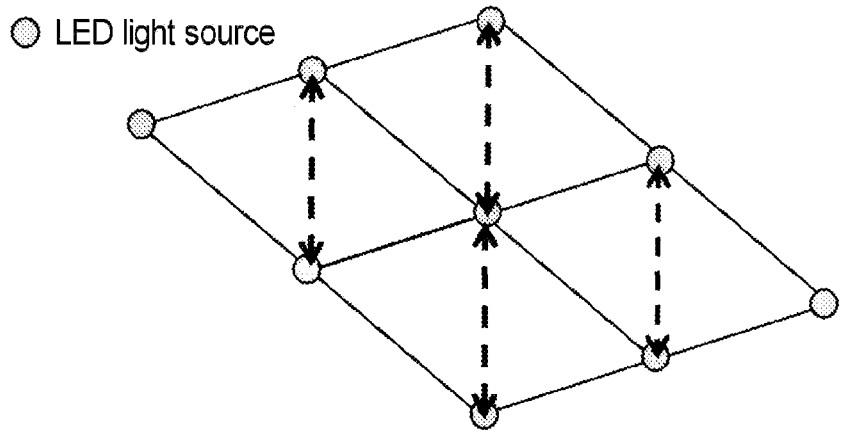
Above-described continuous line arrow and dashed line arrow are in parallel relation.

Fig. 11
Diffuser surface shape view (elevational view)
Convex triangular pyramid shape
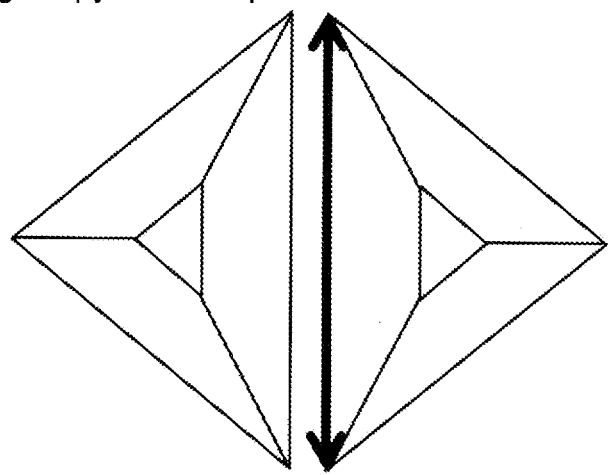
LED arrangement view
⊚ LED light source
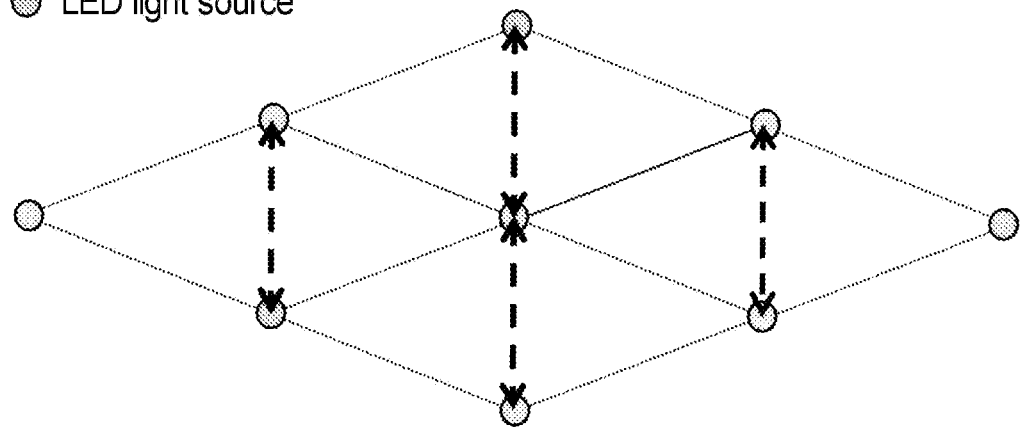
Above-described continuous line arrow and dashed line arrow are in parallel relation.

Fig. 12
Diffuser surface shape view (elevational view)
Equilateral triangle
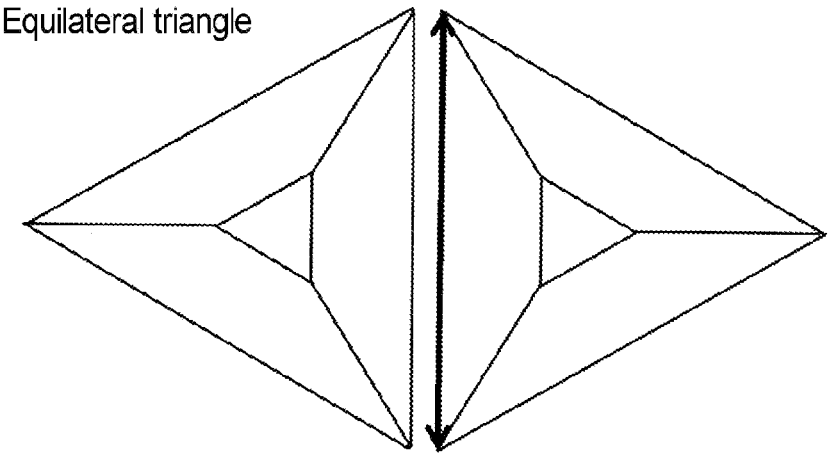
LED arrangement view
○ LED light source
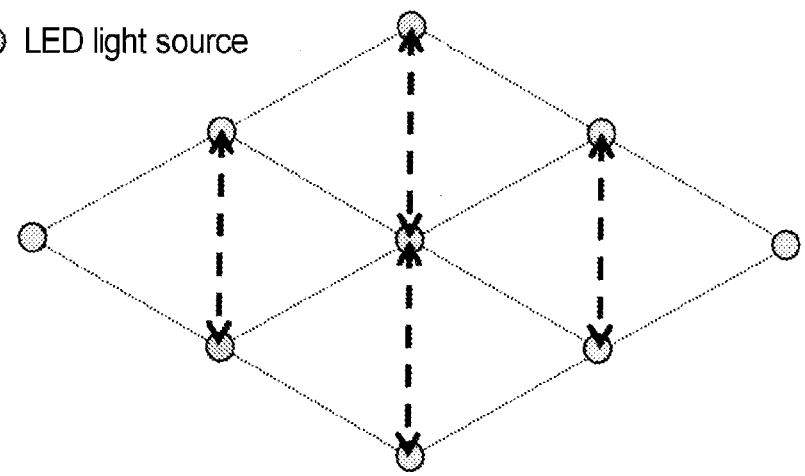
Above-described continuous line arrow and dashed line arrow are in parallel relation.

LED arrangement view (lattice-shaped arrangement)

◉ LED light source

LED-2 light outgoing pattern

LED-3 light outgoing pattern

Elevational view of light outgoing surface side of light diffuser (convex triangular pyramid shape)

(A)
Convex triangular pyramid shape
(equilateral triangular bottom surface)

(B)

Top and edge line R convex triangular pyramid

LIGHT DIFFUSER FOR POINT LIGHT SOURCE AND DIRECT TYPE POINT LIGHT SOURCE BACKLIGHT DEVICE

The present application is a U.S. National Phase Application of International Application No. PCT/JP2010/059979, filed Jun. 11, 2010, which claims the benefit of priority of Japanese Application No. 2009-211115 and Japanese Application No. 2009-211117 both filed Sep. 11, 2009, the disclosures of which are incorporated herein by reference in their entireties.

TECHNICAL FIELD

The present invention relates to a light diffuser suitable for combination of backlights in which point light sources are arranged, and to a direct type point light source backlight device provided with the light diffuser.

BACKGROUND ART

Generally, as backlights for liquid crystal displays, there are included two types called an edge light type backlight and a direct type backlight. The direct type backlights that are inexpensive and can achieve high luminance have been often used for large-sized display devices.

The direct type backlight is generally conventionally designed based on a linear light source such as a cold cathode tube, and a method for surface emitting by using a diffuser or an optical film has been employed.

However, in recent years, a shift to an LED as a light source has been required instead of the cold cathode tube from viewpoints of environmental problems, a life of light source, power saving, and picture quality enhancement.

However, since the LED is a point light source while the cold cathode tube is a line source, there is a problem that luminance unevenness becomes large. Therefore, a technology is needed for a diffuser and an optical film that can convert a point light source into a surface light source.

As an LED light source, an LED that is the most inexpensive and has Lambertian distribution in which a beam intensity of light right above the LED is high is generally often used. Therefore, it is a large problem how a light source with a strong directivity for right above the LED is converted into the surface light source.

Meanwhile, in recent years, reduction in thickness and reduction in cost have been strongly required for a liquid crystal display, and as for a backlight, a technology has been required for reducing light sources, reducing optical films, and diffusing light at a short distance from the light sources to a diffuser.

Conventionally, as a light diffusion technology for direct type point light sources, image formation positioning means have been proposed. When four point light sources are selected among a plurality of point light sources such that the four point light sources constitute a convex quadrilateral that has the smallest area and the shortest circumference length, the image formation positioning means have images of the four point light sources observed within a specific region of a light emitting surface of a light diffuser. In addition, as a shape of a light diffuser, a concave quadrangular pyramid shape having different inclined angles has been proposed (For example, refer to Patent Literature 1).

In addition, similarly, with a view to improve a utilization efficiency of light beams, a structure has been proposed in which concave quadrangular pyramids are arranged in an oblique line at a light outgoing surface side of a light diffuser (For example, refer to Patent Literature 2).

Further, as a technique for reducing light amount unevenness of an LED light source, a prism sheet has been proposed in which a plurality of prisms having corner cube shapes are formed without space at an outgoing surface side of a light diffuser (For example, refer to Patent Literature 3).

CITATION LIST

Patent Literature

Patent Literature 1: International Publication Pamphlet No. WO07/114,158
Patent Literature 2: U.S. Pat. No. 7,334,920
Patent Literature 3: Japanese Patent Laid-Open No. 10-274947

SUMMARY OF INVENTION

Technical Problem

However, when using the light diffuser having a concave inverted quadrangular pyramid shape at the outgoing surface side described in Patent Literature 1, a reduction effect of luminance unevenness is small, and there has been a serious problem in luminance uniformity when viewed from an oblique direction. Accordingly, when the light diffuser of the above-described shape is used, it is necessary to increase the number of point light sources or optical films, or to thicken a backlight in order to improve luminance uniformity.

In addition, although Patent Literature 1 describes that a surface of the light diffuser is formed as an uneven polygonal pyramid shape, it does not describe that shaping a triangular pyramid shape having a correlation between a specific inclined angle and a refractive index at the outgoing surface side of the light diffuser, as described in the claims of this application, dramatically improve luminance and luminance uniformity (front and oblique fields of view) of a direct type LED light source backlight.

In addition, similarly to Patent Literature 1, the light diffuser having the concave quadrangular pyramid shape at the outgoing surface side described in Patent Literature 2 also has a problem that luminance uniformity and an improvement effect of color unevenness in front and oblique directions are small. It is necessary to increase the number of light sources or use together a number of optical films including prism films in order to improve luminance uniformity of the point light sources, thus resulting in a problem of high cost.

Further, the prism sheet with a thickness of 1 mm in which a plurality of minute prisms of corner cube shapes made of acrylic resin are formed without space is proposed in Patent Literature 3. However, sufficient improvement or a sufficient improvement effect in luminance and luminance unevenness has not been obtained yet.

In addition, although Patent Literature 3 describes that a prism sheet is also preferably used in which prisms of cone shapes, such as a quadrangular pyramid and a hexagonal pyramid, in addition to the corner cube shape are arranged at the outgoing surface side of the light diffuser, it does not describe that luminance and luminance uniformity (front and oblique fields of view) and color unevenness of the direct type LED light source backlight are improved by shaping the triangular pyramid shape having the correlation between the specific inclined angle and the refractive index described in the application claims at the outgoing surface side of the light diffuser.

In this way, in the above-mentioned conventional technology, improvement is needed, such as arranging a number of point light sources or using together a number of optical films in order to exert superior luminance, luminance uniformity (front and oblique fields of view), and a color unevenness characteristic in a desired backlight thickness.

The present invention is made to solve the above-described problems, and an object of the present invention is, in a direct type point light source backlight using point light sources, to provide a light diffuser that can achieve coexistence of superior luminance, luminance uniformity (front and oblique fields of view), and a color unevenness characteristic while having a desired backlight thickness and a few light sources without using together a number of optical films, and further to provide a direct type backlight device using such light diffuser.

Solution to Problem

As a result of earnest studying to solve the above-described problems, the inventors made the present invention by finding out that when an inclined angle of a convex portion and a refractive-index of a material forming the convex portion in a light diffuser having the plurality of convex portions of triangular pyramid shapes at a light outgoing surface side satisfy a particular relationship, significantly improved are luminance, a color unevenness characteristic, and luminance uniformity, particularly luminance uniformity from an oblique view when the light diffuser is arranged right above point light sources.

In addition, the inventors made the present invention by finding out that when a direct type backlight device is manufactured by combining the point light sources with the above-described light diffuser, a color unevenness characteristic, luminance, and luminance uniformity (from front and oblique views) of the direct type backlight device are significantly improved, and can be achieved substantial reduction of the number of light sources, thinning of a backlight thickness, and reduction of optical films that could not be anticipated in a conventional technology.

Namely, the present invention is as follows.

[1]

A light diffuser for point light sources, the light diffuser having a plurality of convex portions formed on a surface thereof, wherein the convex portion has a substantially triangular pyramid shape whose bottom surface is a triangle, and an inclined angle $\theta$ with respect to a bottom surface of a side surface of the substantially triangular pyramid shape, and a refractive index A of a material forming the convex portion satisfy the following equations (1) and (2).

$$\theta \geq -40A° + 115.2°  \quad (1)$$

$$\theta \leq 25A° + 22.25° \quad (2)$$

[2]

The light diffuser for the point light sources described in the [1], wherein the inclined angle $\theta$ and the refractive index A satisfy the following equations (3) and (4).

$$\theta \geq -40A° + 116.2° \quad (3)$$

$$\theta \leq 25A° + 20.25° \quad (4)$$

[3]

The light diffuser for the point light sources described in the [1] or the [2], wherein the inclined angle $\theta$ is $\theta \neq 55°$.

[4]

The light diffuser for the point light sources described in any one of the [1] to [3], wherein retroreflection characteristics are not exhibited with respect to visible light entering from a surface side opposite to a convex portion formed surface side, and further the following condition (1) is satisfied.

Condition (1): An average reflectance R is not less than 45% when making enter a light of a wavelength 450 to 750 nm with an incident angle inclined by seven degrees with respect to a perpendicular to a horizontal surface of a light diffuser from a surface opposite to the convex portion using a spectrophotometer.

[5]

The light diffuser for the point light sources described in any one of the [1] to [4], wherein the following equation (5) is satisfied.

$$0 \leq g/(b+c+d) \leq 0.30 \quad (5)$$

In a cutting surface appearing when the convex portion is cut at a flat surface passing three points of the following I and J points, and a top of the convex portion (a center of gravity of a triangle top when the convex portion is a triangular pyramid frustum shape), b, c, and d in equation (5) respectively indicate:

a length of a projected line segment obtained when a portion B, in which an angle $\theta'$ between a tangent plane of one side surface and a bottom surface of the convex portion satisfies the following equations (1') and (2'), is projected to a horizontal surface;

a length of a projected line segment obtained when a portion C, which is closer to a skirt side of the convex portion than the portion B, is projected to the horizontal surface;

and a length of a projected line segment obtained when a portion D, which is closer to the top side than the portion B, is projected to the horizontal surface.

$$\theta' \geq -40A° + 115.2° \quad (1')$$

$$\theta' \leq 25A° + 22.25° \quad (2')$$

I point: A projected point obtained when the top of the convex portion (the center of gravity of the triangle top when the convex portion is the triangular pyramid frustum shape) is vertically projected to the triangular bottom surface.

J point: An intersection of a perpendicular with a side that is obtained when the perpendicular is drawn from the I point to the side closest to the I point among the sides composing the triangular bottom surface.

In addition, g in equation (5) indicates a length of a projected line segment obtained when a portion, which is located closer to the top side than a portion in which the angle $\theta'$ between a tangent among tangents of the one side surface of the convex portion and the bottom surface satisfies (1') and (2'), is projected to the horizontal surface in a single-sided portion, which includes the J' point, from a center of a cutting surface appearing when the convex portion is cut at a flat surface perpendicular to the triangular bottom surface and also passing through the following I' point and a J' point.

However, when there exist a plurality of cutting surfaces that satisfy the conditions, the cutting surface in which a value of g is the largest.

I' point: A midpoint of a line segment obtained by connecting a point obtained when the top of the convex portion (the center of gravity of the triangle top when the convex portion is the triangular pyramid frustum shape) is vertically projected to the triangle bottom surface with a top of the triangular bottom surface closest to the projected point among the tops of the triangular bottom surface.

J' point: An intersection of a perpendicular with a side that is obtained when the perpendicular is drawn from the I' point to the side closest to the I' point among the sides composing the triangular bottom surface.

[6]

The light diffuser for the point light sources described in the [5], wherein a sum of the b, c, and d is 5 to 200 µm.

[7]

The light diffuser for the point light sources described in any one of the [1] to [6], comprising at least an (a) lens layer and a (b) diffusion layer, wherein the (a) lens layer and the (b) diffusion layer are any one of selected layers from a group consisting of a same layer, a continuous layer, and a separation layer, and the convex portion is formed on a surface of the (a) lens layer.

[8]

The light diffuser for the point light sources described in the [7], wherein the (b) diffusion layer contains transparent resin and a diffusing agent, and a diffusion rate S thereof is 2 to 40%.

[9]

The light diffuser for the point light sources described in the [7] or [8], comprising an (a) lens layer, and a (b) diffusion layer, wherein a sum of thicknesses of the (a) lens layer and the (b) diffusion layer is 0.5 to 3.0 mm.

[10]

A direct type point light source backlight device, comprising:

a plurality of point light sources;

a light diffuser described in any one of the [1] to [9] which is disposed above the point light sources, and in which a plurality of convex portions of substantially triangular pyramid shapes whose bottom surfaces are triangles are formed in a surface of the light diffuser at a surface side opposite to a surface side opposed to the point light sources; and a diffusive reflection sheet disposed under the point light sources.

[11]

The direct type point light source backlight device described in the [10], wherein the point light source is an LED light source whose light peak angle is −25 to 25°.

[12]

The direct type point light source backlight device described in the [10] or [11], wherein a diffuse reflectance of the diffusive reflection sheet is not less than 90%.

[13]

The direct type backlight device described in any one of the [10] to [12], further comprising at least two optical films having a light-collecting function at a light outgoing surface side of the light diffuser.

[14]

The direct type backlight device described in any one of the [10] to [13], wherein an average pitch of the point light sources is set to be P, wherein a distance from the point light source to the light diffuser is set to be H, and wherein P/H falls in a range of 1.5 to 2.5.

[15]

A direct type backlight device, comprising:

a plurality of point light sources; and a light diffuser described in any one of the [1] to [9], wherein the plurality of point light sources are periodically arranged in a lattice, the plurality of convex portions of the light diffuser are periodically arranged so that one sides of triangular bottom surfaces of the adjacent convex portions may be parallel to each other, and the plurality of point light sources and the light diffuser are laminated so that any one side of the triangular bottom surface of each convex portion of the light diffuser may be parallel to or perpendicular to diagonal lines of a quadrangle composing lattices of lattice-shaped arrangement of the point light sources.

[16]

A direct type backlight device, comprising:

a plurality of point light sources; and a light diffuser described in any one of the [1] to [9], wherein the plurality of point light sources are periodically arranged in a lattice, the plurality of convex portions are substantially triangular pyramid shapes whose bottom surfaces are isosceles triangles, the plurality of convex portions of the light diffuser are periodically arranged so that bases of isosceles triangular bottom surfaces of the adjacent convex portions may be parallel to each other, and the plurality of point light sources and the light diffuser are laminated so that a base of the isosceles triangular bottom surface of the each convex portion of the light diffuser may be parallel to or perpendicular to diagonal lines of a quadrangle composing lattices of lattice-shaped arrangement of the point light sources.

[17]

A direct type backlight device, comprising:

a plurality of point light sources; and a light diffuser described in any one of the [1] to [9], the plurality of point light sources are periodically arranged in a lattice, the plurality of convex portions are substantially triangular pyramid shapes whose bottom surfaces are equilateral triangles, the plurality of convex portions are periodically arranged so that one sides of equilateral triangular bottom surfaces of the adjacent convex portions may be parallel to each other, and the plurality of point light sources and the light diffuser are laminated so that any one side of the equilateral triangular bottom surface of the each convex portion of the light diffuser may be parallel to or perpendicular to diagonal lines of a quadrangle composing lattices of lattice-shaped arrangement of the point light sources.

Advantageous Effects of Invention

When a light diffuser of the present invention is used, excellent luminance, an excellent color unevenness characteristic, and excellent luminance uniformity (front and oblique field of views) are exerted when the light diffuser is combined with point light sources and thus, as a result, reducing the point light sources and optical films that are used for a backlight, and thinning of the backlight can be achieved.

BRIEF DESCRIPTION OF DRAWINGS

FIG. 7 is an illustration of a layer configuration of the light diffuser (a same layer, continuous layers, separation layers).

FIG. 10 is an illustration of a correlation between the convex portion triangular pyramid shape shaped on the surface of the light diffuser and LED arrangement.

FIG. 11 is an illustration of a correlation between the convex portion triangular pyramid shape shaped on the surface of the light diffuser and the LED arrangement.

FIG. 12 is an illustration of a correlation between the convex portion triangular pyramid shape shaped on the surface of the light diffuser and the LED arrangement.

DESCRIPTION OF EMBODIMENTS

Hereinafter, an embodiment for carrying out the present invention (hereinafter referred to as "the embodiment") will be described in detail.

It is to be noted that the present invention is not limited to the following description, but it can be variously modified to be carried out within the scope of the invention.

[Light Diffuser for Point Light Source]

A light diffuser of the embodiment is a light diffuser having a plurality of convex portions formed on a surface thereof.

The convex portion is a substantially triangular pyramid shape whose bottom surface is a triangle.

The light diffuser for point light sources of the embodiment is a light diffuser for point light sources in which an inclined angle θ (hereinafter simply referred to as an inclined angle θ.) with respect to a bottom surface of a side surface of the substantially triangular pyramid shape, and a refractive index A (hereinafter simply referred to as the refractive index A.) of a material forming the convex portion satisfy the following equations (1) and (2).

$$\theta \geq -40A° + 115.2°  \quad (1)$$

$$\theta \leq 25A° + 22.25° \quad (2)$$

Figure 4:
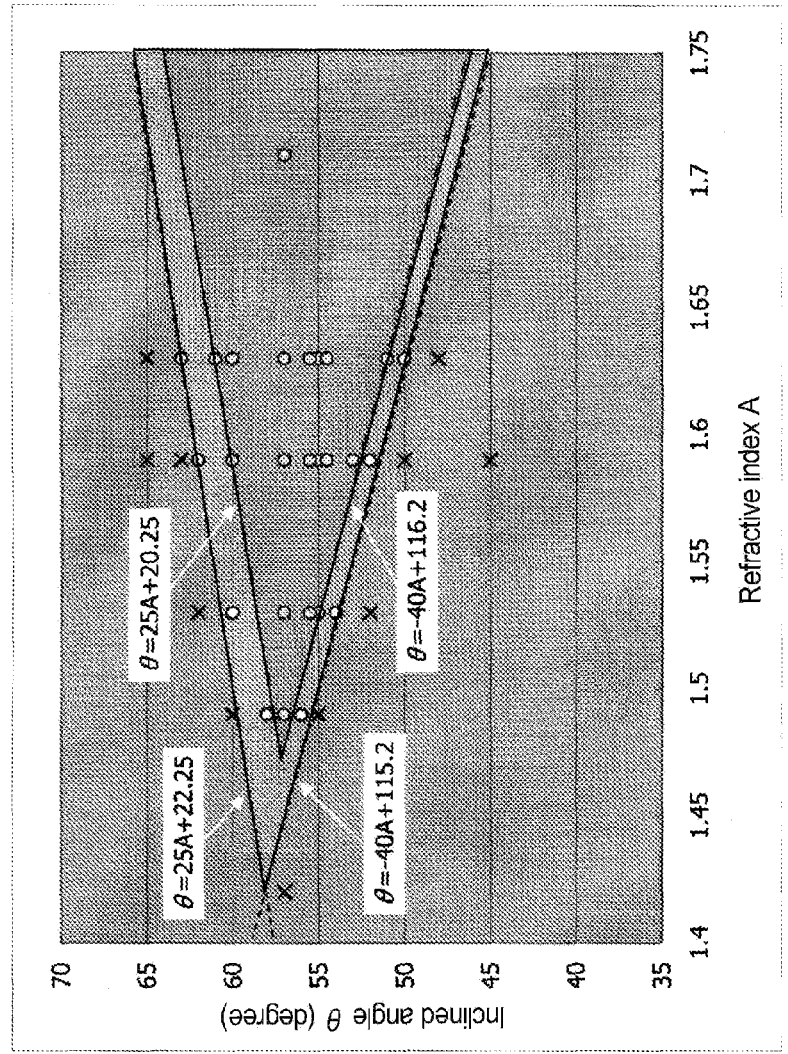
FIG. 4 is a graph showing correlations between inclined angles θ of a convex triangular pyramid shape specified in claim 1 of the present invention and refractive indexes A of resin forming the convex triangular pyramid shape.

A graph is shown in FIG. 4 in which the refractive indexes A are indicated as a horizontal axis and the inclined angles θ as a vertical axis. The light diffuser of the embodiment satisfies conditions in regions of a lower side of an expression θ=25A°+22.25° and of an upper side of an expression θ=−40A°+115.2° shown in FIG. 4.

The inclined angle θ and the refractive index A of the substantially triangular pyramid shape of the convex portion of the surface of the light diffuser satisfy the relationships in equations (1) and (2), and thereby in a point light source backlight using the light diffuser, luminance uniformity from an oblique view is significantly improved in addition to luminance, a color unevenness characteristic, and luminance uniformity from a front view.

If, for example, a convex polygonal pyramid shape or a concave polygonal pyramid shape including a triangular pyramid other than the convex substantially triangular pyramid is used as a surface shape of the light diffuser, performance as an object of the present application cannot be exerted.

In addition, when the equations (1) and (2) are not satisfied even though the surface shape of the light diffuser is the convex substantially triangular pyramid shape, a color unevenness characteristic and luminance uniformity from front and oblique views significantly degrade.

In the light diffuser of the embodiment, it is preferable that the inclined angle θ and the refractive index A satisfy the following equations (3) and (4) since luminance, a color unevenness characteristic, luminance uniformity from the front view, and luminance uniformity from the oblique view are further improved.

$$\theta \geq -40A° + 116.2° \quad (3)$$

$$\theta \leq 25A° + 20.25° \quad (4)$$

Further, it is preferable that the inclined angle θ is not less than 55.5 degrees since the diffuser becomes particularly superior in luminance, a color unevenness characteristic, luminance uniformity from the front view, and luminance uniformity from the oblique view.

The inclined angle θ can be obtained by observing a cross-sectional shape of the surface of the diffuser using a laser microscope or an SEM (electron microscope).

The refractive index A can be obtained by the following: a portion forming the convex portion is cut and separated; subsequently, a film whose surface is smooth is fabricated by heat pressing etc.; and an Abbe refractometer is used based on JIS K7142. Moreover, when the convex portion cannot be smoothed, the refractive index A can be obtained with a Becke method by crushing the cut portion after the convex portion is cut off.

In addition, the refractive index A of a material forming the convex portion of the light diffuser is decided by a transparent material (for example, transparent resin) of materials forming a sample, and the refractive index itself does not change due to a light diffusing agent etc. even though they are added to the materials.

Therefore, when it is difficult to measure a refractive index by the method since the convex portion contains the light diffusing agent etc. and has diffusivity, the refractive index A can be obtained also by the following: only a transparent material (for example, transparent resin raw material) of materials forming the convex portion is made into a film; and a refractive index of the film is measured using the Abbe refractometer similarly to the above.

Figure 3:
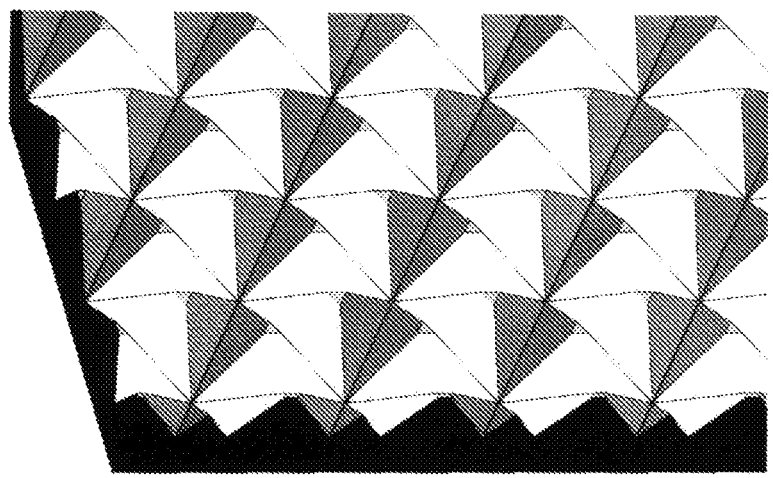
FIG. 3 is a perspective view of one example of a convex triangular pyramid frustum shape shaped on the surface of the light diffuser.

The substantially triangular pyramid shape, which is a shape of the convex portion of the light diffuser of the embodiment, means a solid whose bottom surface is a triangle and whose top is a point or a triangle whose area is smaller than the bottom surface, and it also includes a so-called triangular pyramid frustum as shown in FIG. 3.

Figure 1:
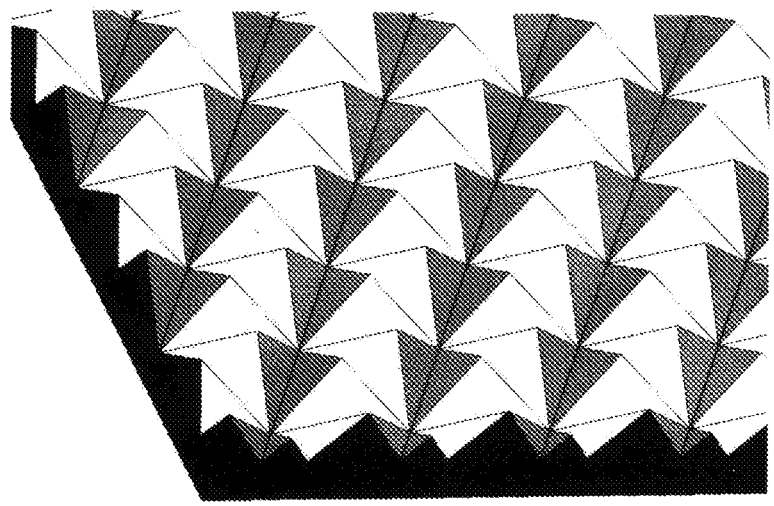
FIG. 1 is a perspective view of one example of a convex triangular pyramid shape shaped on a surface of a light diffuser.
Figure 2:
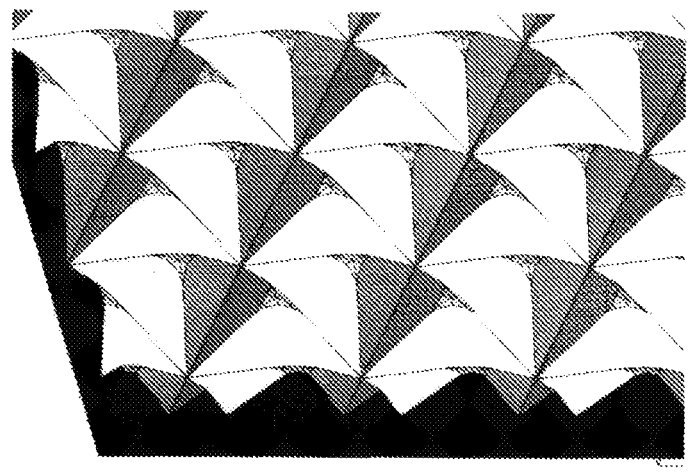
FIG. 2 is a perspective view of one example of a convex triangular pyramid shape whose top is a curved surface shape shaped on the surface of the light diffuser.

A side surface of the convex portion of the light diffuser may be a flat surface or a curved surface, and when the top of the convex portion is the point, the top may be sharp as shown in FIG. 1, or may be a curved surface as shown in FIG. 2.

In addition, edge lines of the triangular pyramid may be sharp, or may be a curved surface.

Further, in the substantially triangular pyramid shape which is the shape of the convex portion of the light diffuser of the embodiment, it is preferable that a straight line (central axis) connecting the top (or a center of a triangle top) and a center of the triangular bottom surface is perpendicular to the flat surface, i.e., the convex portion is not an oblique triangular pyramid.

In the light diffuser of the embodiment, the inclined angle θ is an angle between the side surface and the bottom surface of the convex portion as mentioned above.

It is to be noted that when the flat surface is included in the side surface of the convex portion even though a part of the side surface of the convex portion includes the curved surface, an angle between the flat surface and the bottom surface is the inclined angle θ. When the plurality of flat surfaces are included in the side surface of the convex portion, an angle between the flat surface with a largest area and the bottom surface is the inclined angle θ.

In addition, when all the side surfaces of the convex portion are curved surfaces, a largest angle of angles between a tangent plane of the side surface and the bottom surface is set to be the inclined angle θ.

In addition, when the substantially triangular pyramid shape is the oblique triangular pyramid, a largest angle of angles between the three side surfaces and the bottom surface of the convex portion is set to be the inclined angle θ.

It is preferable that the light diffuser of the embodiment is a light diffuser having formed periodically on the surface thereof the convex portions of the same shape, which is the substantially triangular pyramid shape.

In addition, it is preferable that the shape and arrangement of the convex portions of the light diffuser of the embodiment satisfy the following equation (5) from a viewpoint of a color unevenness characteristic, luminance, and luminance uniformity.

$$0 \leq g/(b+c+d) \leq 0.30 \tag{5}$$

Figure 5:
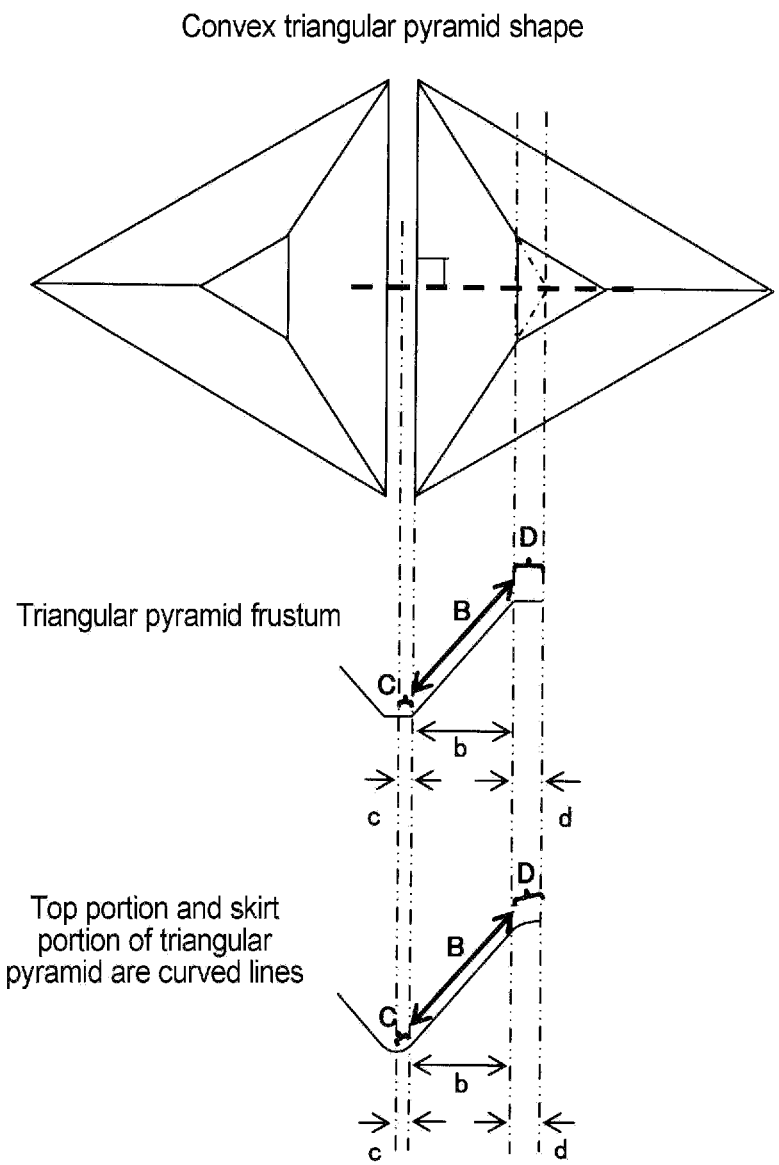
FIG. 5 is an elevational view and a cross-sectional view of the convex triangular pyramid shape shaped on the surface of the light diffuser surface.

In a cutting surface appearing when the convex portion is cut at a flat surface passing three points of the following I and J points, and a top of the convex portion (a center of gravity of a top triangle when the convex portion is a triangular pyramid frustum shape), b, c, and d in the equation (5) respectively indicate:
a length of a projected line segment obtained when a portion B, in which an angle θ' between a tangent plane of one side surface and a bottom surface of the convex portion satisfies the following equations (1') and (2'), is projected to a horizontal surface (b in FIG. 5); a length of a projected line segment obtained when a portion C, which is closer to a skirt side of the convex portion than the portion B, is projected to the horizontal surface (c in FIG. 5); and a length of a projected line segment obtained when a portion D, which is closer to the top side than the portion B, is projected to the horizontal surface (d in FIG. 5).

$$\theta' \geq -40A° + 115.2° \tag{1'}$$

$$\theta' \leq 25A° + 22.25° \tag{2'}$$

I point: A projected point obtained when the top of the convex portion (the center of gravity of the triangle top when the convex portion is the triangular pyramid frustum shape) is vertically projected to the triangular bottom surface.

J point: An intersection of a perpendicular with a side that is obtained when the perpendicular is drawn from the I point to the side closest to the I' point among the sides composing the triangular bottom surface.

It is to be noted that a distance L×½ between the adjacent convex portions is defined to be included in the portion C located closer to the skirt side of the convex portion than B in FIG. 5, and that a termination of a top portion side of D is defined to be the top (the center of the top triangle when the convex portion is the triangular pyramid frustum shape) of the convex portion.

Although a straight line segment is exemplified as the portion B in FIG. 5, the portion B may be a curved line as long as it is a portion satisfying the equations (1') and (2').

For example, when the refractive index A of the material forming the convex portion of the light diffuser is 1.59, the portion B may be a curved line that continuously changes in a range where θ'=52 to 62°.

g in the equation (5) will be described.

Figure 23:
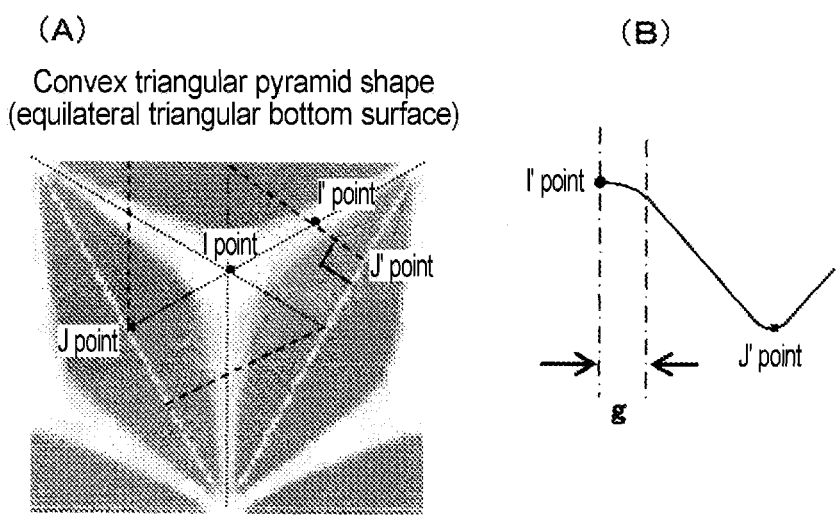
FIG. 23(A) is a top view of a convex portion for explaining a definition of g.
FIG. 23(B) is a partial cross-sectional view of the convex portion for explaining the definition of g.
Figure 24:
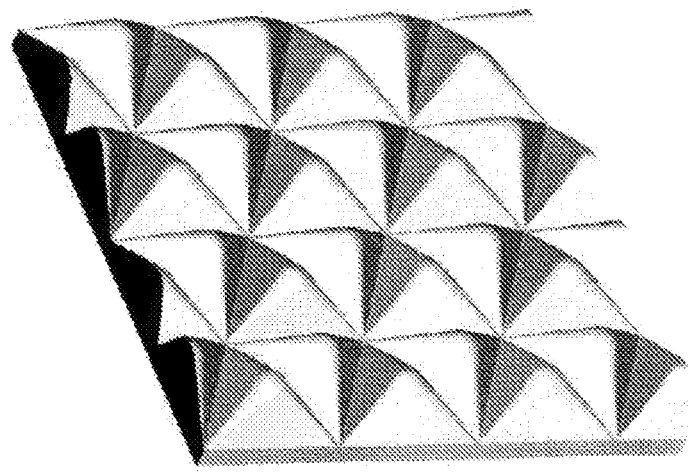
FIG. 24 is a perspective view of one example of a convex triangular pyramid shape whose top and edge line are curved surface shapes shaped on the surface of the light diffuser.

In FIG. 23(B), shown is a cutting surface appearing when the convex portion is cut at a flat surface perpendicular to the triangular bottom surface and passing through the following I' and J' points (dashed lines in FIG. 23(A)).

I' point: A midpoint of a line segment obtained by connecting a point obtained when the top of the convex portion (the center of gravity of the triangle top when the convex portion is the triangular pyramid frustum shape) is vertically projected to the triangle bottom surface with a top of the triangular bottom surface closest to the projected point among the tops of the triangular bottom surface.

J' point: An intersection of a perpendicular with a side that is obtained when the perpendicular is drawn from the I' point to the side closest to the I' point among the sides composing the triangular bottom surface.

FIG. 23(B) shows a portion from a center to a lowermost portion of one side including the J' point in the cutting surface. Defined as g is a length of a projected line segment formed when a portion, which is located closer to a top side than a portion in which the angle θ' between a tangent among tangents of the one side surface of the convex portion and the bottom surface satisfies the (1') and (2'), is projected to the horizontal surface. However, when there exist a plurality of cutting surfaces that satisfy the conditions, the cutting surface in which a value of g is the largest.

From a viewpoint of further improvement in luminance and luminance uniformity, it is more preferable that $0.01 \leq g/(b+c+d) \leq 0.20$, and it is still more preferable that $0.01 \leq g/(b+c+d) \leq 0.10$.

Further, from a viewpoint of a color unevenness characteristic, luminance, and luminance uniformity. it is preferable that the shape and the arrangement of the convex portions of the light diffuser of the embodiment satisfy the following equations (6) and (7).

$$0 \leq c/(b+c+d) \leq 0.20 \quad (6)$$

$$0 \leq d/(b+c+d) \leq 0.40 \quad (7)$$

From the viewpoint of further improvement in luminance and luminance uniformity, it is more preferable that $0.01 \leq c/(b+c+d) \leq 0.13$, and it is still more preferable that $0.01 \leq c/(b+c+d) \leq 0.06$.

It is to be noted that the above-mentioned b, c, d, and g can be obtained by performing observation of the cross-sectional shape of the surface of the diffuser using the laser microscope or the SEM (electron microscope).

In addition, it is preferable that a sum, b+c+d of the above-mentioned b, c, and d in the substantially triangular pyramid shape of the convex portion of the light diffuser is 5 to 200 μm from a viewpoint of luminance uniformity, moire, and manufacturing, more preferable 10 to 150 μm, and still more preferable 15 to 120 μm.

In addition, it is preferable that a height of the substantially triangular pyramid shape (distance from the bottom surface to an uppermost portion) of the convex portion of the light diffuser is 10 to 400 μm.

It is preferable that the convex portion of the light diffuser of the embodiment is a shape that does not exhibit retroreflection characteristics with respect to visible light.

Namely, when the substantially triangular pyramid shape is the shape that does not exhibit retroreflection characteristics, a rate of light is reduced that comes out of the point light sources and returns to the point light sources again, thus enabling to suppress absorption of the light by the point light sources.

As an index of retroreflection characteristics, can be used an average reflectance R obtained when a light with a wavelength of 450 to 750 nm is made to enter at an incident angle that is inclined by seven degrees with respect to a perpendicular with respect to the horizontal surface of the light diffuser from a surface (light entering surface) side opposite to a convex portion forming surface side of the light diffuser.

Here, the average reflectance R means an average value obtained when a reflectance is calculated for every 1 nm wavelength in a wavelength region of 450 to 750 nm.

If the average reflectance R is not less than 45%, it can be said that the light diffuser has few retroreflection components and has little absorption of light in the point light sources, and the light diffuser is particularly superior in a color unevenness characteristic, luminance, and luminance uniformity.

It is preferable that the average reflectance R is not less than 50%, and more preferably not less than 55%.

When the substantially triangular pyramid shape of the convex portion is, for example, a convex substantially triangular pyramid whose bottom surface is a triangle, and is a shape in which the inclined angle θ between the side surface and the bottom surface of the triangular pyramid is 57 degrees, the average reflectance is high since the light does not return to a light entering point of the light and does not have a retroreflective property.

Meanwhile, when the substantially triangular pyramid shape of the convex portion has, for example, the retroreflective property having a corner cube shape (the inclined angle θ is 55 degrees), the average reflectance R is less than 45% since the light returns to the light entering point of the light.

Accordingly, it is preferable that a shape of the substantially triangular pyramid is set to be a substantially triangular pyramid shape in which the inclined angle θ is an inclined angle other than 55 degrees.

In addition, it is desirable that the light entering into the light diffuser is diffused properly from a viewpoint of improvement in a color unevenness characteristic, luminance, and luminance uniformity.

Accordingly, it is preferable that an upper-limit value of the average reflectance R is not more than 70%, and more preferably not more than 67%.

When the light diffuser and the light source of the embodiment are used by combining with each other, can be achieved a backlight device particularly superior in luminance, a color unevenness characteristic, and luminance uniformity (front and oblique fields of view) by arranging at the light outgoing surface side the convex portion of the substantially triangular pyramid shape of two surfaces of the light diffuser.

Note that hereinafter, in this specification, in a case where the light diffuser is used by combining with the light source, it is defined that the surface closer to the light source (namely, a side opposed to the light source) is a light entering surface, and the surface farther from the light source (an opposite side of the light source) is a light outgoing surface.

A plurality of convex portions of the substantially triangular pyramid shape are provided on the surface of the light diffuser.

A shape of the plurality of convex portions may be the same, or may differ.

In addition, an aspect of arrangement of the plurality of convex portions is not limited, either.

For example, it is preferable from a viewpoint of luminance uniformity and productivity that the plurality of convex portions are arranged adjacent to each other so that sides opposed to each other of triangular bottom surfaces of the adjacent convex portions may be parallel to each other.

In addition, a shape of the triangular bottom surface of the convex portion is not limited, either.

Figure 6:
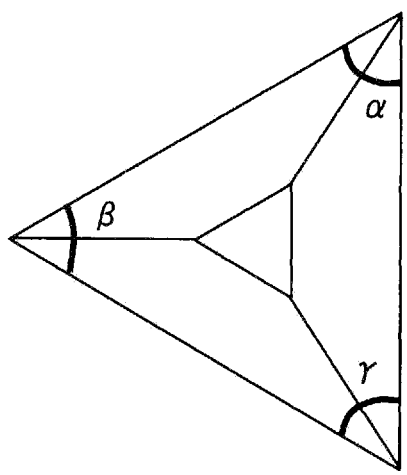
FIG. 6 is an illustration showing an internal angle illustration of a triangular bottom surface of the convex triangular pyramid shape shaped on the surface of the light diffuser.

For example, as shown in FIG. 6, when internal angles of the triangular bottom surface of the convex portion is defined to be α, β, and γ, respectively, it is preferable from a viewpoint of luminance uniformity that $|\alpha-\beta|$, $|\beta-\gamma|$, and $|\gamma-\alpha|$ are not more than 20°, respectively, more preferably not more than 10°, and still more preferably not more than 5°.

The particularly preferable shape of the triangular bottom surface of the convex portion is an isosceles triangle or an equilateral triangle.

Further, it is preferable from the viewpoint of luminance uniformity that the convex portion of the substantially triangular pyramid shape provided on the surface of the light diffuser is formed in a region of not less than 70 area % of the horizontal surface of the light diffuser, more preferably not less than 80 area %, still more preferably not less than 90 area %, and yet still more preferably not less than 95 area %.

It is preferable that the light diffuser of the embodiment comprises at least an (a) lens layer and a (b) diffusion layer from a viewpoint of luminance and luminance uniformity from front and oblique views.

The (a) lens layer is a layer on which the convex triangular pyramid shapes are formed.

The (b) diffusion layer is a layer that diffuses light containing transparent resin and a diffusing agent.

Both the (a) layer and the (b) layer may be formed of a single layer, or each of them may be formed of a plurality of layers.

The (a) layer and the (b) layer may be the same layer as shown in FIG. 7, may be a continuous layer, or may be separation layers.

The same layer means a layer configuration in which the substantially triangular pyramid is formed on a surface of the (b) diffusion layer, i.e., the (a) layer has been incorporated in the (b) layer.

The continuous layer means a layer configuration in which the (a) lens layer and the (b) diffusion layer closely contact with each other to be integrated.

The separation layer means a configuration in which the (a) lens layer and the (b) diffusion layer exist as different sheets, and in which two sheets are physically overlapped with each other.

As for the separation layer, layers may be arranged by employing a combination of the (a) layer and the (b) layer or a combination of the (b) layer and the (a) layer in the order of closer to the light source, or further, another sheet may be arranged between the (a) layer and the (b) layer.

Materials comprised in the convex portion of the light diffuser of the embodiment ((a) lens layer in a case of a configuration shown in FIG. 7) are not limited as long as the materials have refractive indexes A satisfying the above-mentioned equations (1) and (2) and, for example, resin with a high light transmissive property is preferably used.

For example, the following materials can be included: polyester resin, such as polyethylene terephthalate, polytrimethylene terephthalate, polybutylene terephthalate, polyethylene naphthalate, and copolymer thereof; polyolefin resin, such as polypropylene, polymethylpentene, and alicyclic polyolefin; styrene resin, such as polystyrene, styrene acrylonitrile copolymer, styrene methacrylic acid copolymer, a methyl methacrylate styrene copolymer, and an alpha methylstyrene copolymer; acrylic resin, such as polymethylmethacrylate and polyethylacrylate; methacrylate ester resin, polycarbonate resin; etc.

Although the materials comprised in the convex portion of the light diffuser of the embodiment ((a) lens layer in the case of the configuration shown in FIG. 7) are not limited as long as the materials have refractive indexes A satisfying the equations (1) and (2), it is preferable that the refractive index A is not less than 1.43 from a viewpoint of luminance, a color unevenness characteristic, luminance uniformity from a front view, and luminance uniformity from an oblique view, more preferably not less than 1.49, still more preferably not less than 1.53, and particularly preferably not less than 1.55.

Although there is no particular upper limit to the refractive index A, it is preferable that the refractive index A is not more than 1.71 from the viewpoint of luminance, a color unevenness characteristic, luminance uniformity from the front view, and luminance uniformity from the oblique view, and more preferably not more than 1.65.

In addition, it is preferable that a diffusion rate S of the light diffuser of the embodiment is not less than 2%, more preferably not less than 5%, and still more preferably not less than 10%.

It is to be noted that as will be described hereinbelow, when the inclined angle $\theta$ is 55°, it is preferable that the diffusion rate S is set to be not less than 5% in order to reduce retroreflection, and more preferably not less than 10%.

It is preferable that an upper limit of the diffusion rate S of the light diffuser of the embodiment is set to be not more than 40%, and more preferably not more than 30%.

If the diffusion rate S of the light diffuser falls in the range, can be achieved the light diffuser superior in luminance, luminance uniformity (from front and oblique views), and a color unevenness characteristic.

It is to be noted that when the (a) layer and the (b) layer of the light diffuser are the same layer, when the (a) layer and the (b) layer are the continuous layer, and when the (a) layer and the (b) layer are the separation layers, the diffusion rate S can be obtained using the following expression by the following: a surface of the (a) layer and the (b) layer in a state of being laminated is smoothed by heat pressing etc.; and subsequently, using a gonio photometer (for example, GC5000L manufactured by Nippon Denshoku Industries), measured in luminance of a transmitted light when the light is made to enter in a transmissive mode at a light incident angle 0 degree.

In addition, when the light diffuser is composed of only the (a) layer, measurement is performed similarly to the above after the surface of the (a) layer is smoothed by heat pressing etc., and then the diffusion rate S can be obtained by the following expression.

$$\text{Diffusion rate } S = 100 \times (L(20 \text{ degrees}) + L(70 \text{ degrees})) / (L(5 \text{ degrees}) \times 2)$$

Here,

L (5 degrees) indicates luminance of a transmitted light having come out at an angle of 5 degrees ($cd/m^2$), L (20 degrees) indicates luminance of a transmitted light having come out at an angle of 20 degrees ($cd/m^2$), and L (70 degrees) indicates luminance of a transmitted light having come out at an angle of 70 degrees ($cd/m^2$).

When the light diffuser of the embodiment has the configuration of FIG. 7, there is no particular limit to materials comprised in the (b) diffusion layer and, for example, a resin composition including (transparent) resin and a diffusing agent can be included in the materials.

As the materials comprised in the (b) diffusion layer of the light diffuser, it is preferable to use a resin composition in which components of the light diffusing agent having a refractive index different from a refractive index of the resin is dispersed by an optimum amount into transparent resin.

As a specific example of resin, the following ones can be included: polyester resin, such as polyethylene terephthalate, polytrimethylene terephthalate, a polybutylene terephthalate, and polyethylene naphthalate, and copolymers thereof; polyolefin resin, such as polypropylene, polymethylpentene, and alicyclic polyolefin; styrene resin, such as polystyrene, styrene acrylonitrile copolymer, styrene methacrylic acid copolymer, a methyl methacrylate styrene copolymer, and an alpha methylstyrene copolymer; acrylic resin, such as polymethylmethacrylate and polyethylacrylate; methacrylate ester resin, polycarbonate resin; etc.

As the light diffusing agent, for example, the following ones can be included: acrylic resin cross-linked fine particles; styrene resin cross-linked fine particles; silicone resin cross-linked fine particles; MS (methyl methacrylate styrene copolymer) cross-linked fine particles; fluorine resin fine particles; glass particles; silica fine particle; calcium carbonate; barium sulfate; titanium oxide; alumina; talc; mica, etc., and the above-described materials can be used singly or in combination.

As a shape of the light diffusing agent, the following shapes can be included: a real ball; an ellipse; an unfixed shape; a needle; a plate; a hollow; a column; a pyramid, etc.

It is preferable that an average particle diameter of the light diffusing agent is 1 to 20 μm from a viewpoint of luminance uniformity and easy manufacturing, and the most preferably 2 to 10 μm. The average particle diameter can be obtained by an particle size distribution meter.

It is to be noted that when the (a) layer and the (b) layer are the same layer in the case where the light diffuser of the embodiment has the configuration of FIG. 7, the refractive-index of the materials comprised in the (b) diffusion layer is the refractive index A, and it is essential that the refractive-index satisfies the equations (1) and (2) from a viewpoint of luminance and luminance uniformity (from front and oblique views), but when the (a) layer and the (b) layer are the continuous layer and are the separation layers, there is no need for the refractive index of the materials comprised in the (b) diffusion layer to satisfy the equations (1) and (2).

In addition, it is preferable that a refractive index difference between resin comprised in the (b) diffusion layer and the light diffusing agent is 0.05 to 0.2 from the viewpoint of luminance uniformity and easy manufacturing, and more preferably 0.10 to 0.16.

For example, acrylic cross-linked fine particles and silicone cross-linked fine particles are included in a preferable light diffusing agent with respect to polystyrene resin.

Further, it is preferable that an addition amount of the light diffusing agent is 0.02 to 2 mass % with respect to the whole materials (for example, resin composition) comprised in the (b) diffusion layer from the viewpoint of luminance uniformity and easy manufacturing, and more preferably 0.05 to 1 mass %

In addition, it is preferable that a total light transmittance Tb of the light diffuser of the embodiment is not less than 83%, and more preferably not less than 85%.

It is preferable that an upper limit of the total light transmittance Tb is not more than 95%.

If the total light transmittance Tb falls in the range, can be achieved the light diffuser superior in luminance, luminance uniformity (from front and oblique views), and a color unevenness characteristic.

It is to be noted that when the (a) layer and the (b) layer of the light diffuser are the same layer, when the (a) layer and the (b) layer are the continuous layer, and when the (a) layer and the (b) layer are the separation layers, the total light transmittance Tb can be calculated by measuring the pressed layer based on JIS K7105 after the surface of the (a) layer and the (b) layer in the state of being laminated is smoothed with heat pressing etc.

In addition, when the light diffuser is composed of only the (a) layer, the total light transmittance Tb can be obtained by performing measurement similarly to the above after the surface of the (a) layer is smoothed by heat pressing etc.

In the light diffuser of the embodiment, even though the convex portion is a shape exhibiting retroreflection characteristics, such as the substantially triangular pyramid shape whose inclined angle θ is 55 degrees, it is possible to reduce the retroreflection components by adding a diffusing agent to the material forming the convex portion, or providing a diffusion layer containing the diffusing agent.

Specifically, even in a light diffuser of the substantially triangular pyramid shape whose inclined angle θ of the convex portion is 55°, it becomes possible to reduce the retroreflection components by setting the diffusion rate S not less than 5%, and to thereby obtain the light diffuser whose average reflectance R is not less than 45%.

In addition, it is preferable that the upper limit of the diffusion rate S of the light diffuser is not more than 40%, and more preferably not more than 30%.

If the diffusion rate S falls in the range, can be achieved the light diffuser superior in luminance, luminance uniformity (from front and oblique views), and a color unevenness characteristic.

The retroreflection components can be reduced by setting an average inclined angle U in the light entering surface of the light diffuser to be not less than 1 degree, preferably not less than 5 degrees in addition to add the diffusing agent to the light diffuser, or by controlling a total light transmittance T of the light entering from the convex surface of the light diffuser to be 75 to 95%, more preferably 80 to 92%.

(Thickness of Light Diffuser)

It is preferable that a thickness of the light diffuser of the embodiment is 0.5 to 3.0 mm from a viewpoint of rigidity and optical properties (luminance and luminance uniformity), more preferably 0.8 to 2.5 mm, and still more preferably 1.0 to 2.0 mm.

In addition, when the (a) layer and the (b) layer of the light diffuser are the separation layers in the case where the light diffuser of the embodiment has the configuration shown in FIG. 7, a total thickness when the (a) layer and the (b) layer are overlapped is set to be the thickness of the light diffuser.

(Other Layers)

The light diffuser of the embodiment can be formed as a laminated structure in which another layer is laminated in addition to the (a) layer and the (b) layer if needed.

The layer configuration can be suitably selected according to an application and an object.

As examples of the layer configuration, when layers comprised of resin compositions and compounds other than the lens layer (a) layer and the diffusion layer (b) layer are defined as an X layer, a Y layer, and a Z layer, the following layer configurations are included: for example, a two-layer configuration of the X layer/(a) and (b) of the same layer; a three-layer configuration of the X layer/(a) layer/(b) layer, the (a) layer/(b) layer/X layer, and the (a) layer/X layer/(b) layer; a four-layer configuration of the X layer/(a) layer/(b) layer/X layer, the X layer/(a) layer/(b) layer/Y layer, and the X layer/(a) layer/Y layer/(b) layer; and further a five-layer configuration of the X layer/Y layer/(a)/(b)/Y layer, the X layer/(a) layer/Y layer/(b) layer/X layer, and the X layer/(a) layer/Y layer/(b) layer/Z layer, etc.

It is to be noted that a plurality of layers comprised of the same resin compositions can be laminated continuously.

Moreover, although the layers may be formed by laminating not less than five layers, it is preferable that the light diffuser is configured with not more than five layers in view of easy manufacturing.

(Addition Agent)

Various addition agents may be mixed with the light diffuser of the embodiment.

As such addition agents, for example, the following agents can be included: organic and inorganic dyes and pigment; a flatting agent; a heat stabilizer; a fire retardant; an antistat; an antifoam; an orthochromatic agent; an antioxidant; an ultraviolet absorber; a crystal nucleus agent; a brightening agent; a capture agent of impurities; a thickener; a surface adjuster, etc.

(Other Configuration Example of Light Diffuser)

In the light diffuser of the embodiment, from a viewpoint of luminance uniformity and a friction property with an indication pin attached to the backlight, it is preferable to provide a concave-convex shape on a surface opposite to a surface on which the convex portion of the above-mentioned substantially triangular pyramid shape has been formed, i.e., on a surface serving as a light entering surface (surface of a light source side) in the preferred embodiment when the light diffuser is used in combination with the light source.

Specifically, it is preferable that the average inclined angle U of the light entering surface is 1 to 30°, from a viewpoint of luminance and luminance uniformity, more preferably 3 to 25°, and still more preferably 5 to 20°.

When the average inclined angle U of the light entering surface is less than 1°, the light diffuser exhibits retroreflection characteristics if, for example, the inclined angle of the convex portion of a light outgoing surface side is 55 degrees, and thus there is a case where a light come out of the point light sources returns to the point light sources, luminance of the backlight is reduced. Moreover, when the average inclined angle exceeds 30°, luminance uniformity tends to deteriorate.

The average inclined angle U can be obtained by the following: a cross section of the diffuser is observed by a laser microscope; an average inclined angle (inclined angle with respect to the horizontal surface of the light diffuser) with a width of 1 μm is continuously obtained over a range of a width of 1000 μm in a longitudinal direction and in a lateral direction of the diffuser; an average value of the longitudinal direction and an average value of the lateral direction are calculated; and further an average of the two average values is calculated.

It is to be noted that when the (a) layer and the (b) layer are the separation layers in the case where the light diffuser of the embodiment has the configuration shown in FIG. 7, it is preferable that the average inclined angles of the light entering surfaces of both the (a) layer and the (b) layer are set to be in the above-described range.

[Manufacturing Method of Light Diffuser]

The light diffuser of the embodiment can be manufactured by forming the convex portion using a forming method according to a well-known method using materials comprised in each layer of the light diffuser.

For example, the following methods are included: a melt molding method in which a resin composition including resin with a high light transmissive property is extruded from a cap in a molten state to mold using a roll processed to be a desired shape; a solution cast method in which a resin composition is extruded from a cap in a state of being dissolved in a solvent to mold using a roll processed to be a desired shape; an extrusion lamination method in which molten resin is laminated on a solid film obtained by shaping a surface using the solution cast method and a dry lamination method in which solid films are laminated on each other; a method for molding by heat pressing a plate extruded from a cap in a molten state using a press die processed to be a desired shape; and further a method for performing injection molding using a die processed to be a desired shape, etc.

The melt molding method is the most preferred molding method of the above-described methods from a viewpoint of productivity and an environmental aptitude.

[Direct Type Point Light Source Backlight Device]

Figure 8:
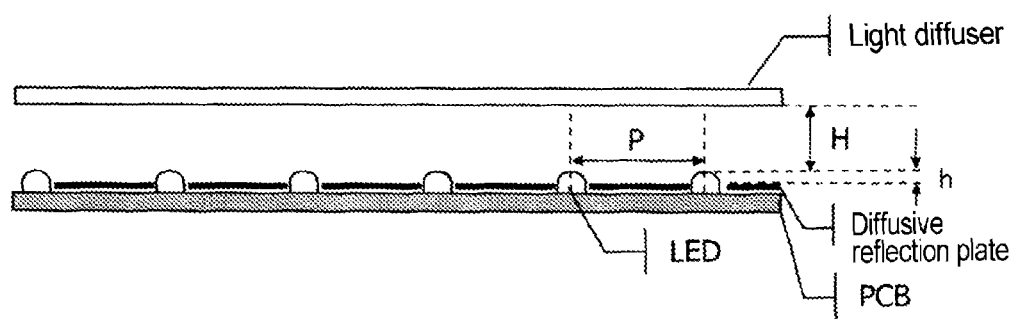
FIG. 8 is a longitudinal cross-sectional view of one example of a point light source backlight device of the embodiment.

A backlight device of the embodiment, as shown in FIG. 8, has a configuration in which a point light source base having a plurality of point light sources (LEDs) arranged thereon, a diffusive reflection sheet (diffusive reflection plate), and the light diffuser of the embodiment are arranged in this order.

In the direct type point light source backlight device of the embodiment, the light diffuser is disposed above the point light sources, and at a surface side opposite to a surface side opposed to the point light sources, formed is the above-mentioned convex portion of the substantially triangular pyramid shape whose bottom surface is a triangle.

In the direct type point light source backlight device of the embodiment, it is preferable that a white resin sheet whose diffuse reflectance is not less than 90% is used for the diffusive reflection sheet (diffusive reflection plate in FIG. 8), and is more preferable that a white resin sheet whose diffuse reflectance is not less than 95% is used.

The diffuse reflectance can be obtained by measuring a reflectance for every 10 nm when a light with a wavelength of 450 to 700 nm is made to enter the sheet at an incident angle 0° using a spectrophotometer, for example, a spectrophotometer UV-2200 manufactured by Shimazu Corporation to then calculate an average reflectance.

In the direct type point light source backlight device of the embodiment, it is preferable that the point light source is an LED light source whose light peak angle is −25° to 25° from the viewpoint of luminance and luminance uniformity.

For example, an LED light source having a Lambertian light outgoing distribution can be included in the light source.

The light diffuser of the embodiment can achieve superior luminance uniformity with respect to point light sources having a wide angle light outgoing distribution in which a light peak angle exceeds 25°.

Since the light diffuser of the embodiment has significantly superior diffuse reflection performance with respect to an incident light of −25° to 25°, it can achieve particularly superior luminance and luminance uniformity by combining with point light sources in which a beam intensity right above the light sources is high and the light peak angle is −25° to 25° instead of using point light sources having a wide angle light outgoing distribution in which the light peak angle exceeds 25°.

Further, the diffusive reflection sheet (diffusive reflection plate) diffusely reflects light diffusely reflected by the light diffuser to a light diffuser side, and thereby the light is equalized between the light diffuser and the diffusive reflection sheet (diffusive reflection plate), thus allowing to hold luminance uniformity of from front and oblique views and further a superior color unevenness characteristic as a backlight.

In addition, since the point light sources (for example, LED light sources) whose light peak angle is −25° to 25° has a feature in which a conversion efficiency to light energy is high and luminance per current is high as compared with the point light sources having the wide angle light outgoing distribution, luminance uniformity and a color unevenness characteristic can be enhanced while holding high luminance when the light diffuser of the embodiment is used for the above-described point light sources.

As described above, since the light diffuser in the embodiment has diffuse reflection performance that diffusely reflects light from the point light sources at a wide angle and light collecting performance between the light sources, the both performance being incompatible in a conventional light diffuser, a direct type point light source backlight having superior luminance can be achieved by combining point light sources, particularly point light sources whose light peak angle is −25° to 25° and whose beam intensity of light right thereabove is high and a diffusive reflection sheet.

In the direct type point light source backlight device of the embodiment, when an average distance between an uppermost portion of the point light sources and the light diffuser is defined as H, and an average distance between the adjacent point light sources is defined as P as shown in FIG. 8 in a case where the LED light sources whose light peak angle is −25° to 25° are used as point light sources, it is preferable to set to be $1.5 \leq P/H \leq 2.5$.

Here, the average distance H between the uppermost portion of the point light sources and the light diffuser is an average value of measured distances (a unit is mm) between the uppermost portion of all the point light sources mounted on the backlight and the light diffuser.

In addition, the average distance P (the unit is mm) between the adjacent point light sources indicates a square root value obtained by dividing a monitor area (a unit is mm$^2$) of the backlight by the number of point light sources.

It is to be noted that the "monitor area of the backlight" means an area of a screen (portion in which images are reflected) displayed using the backlight.

It is preferable that the direct type point light source backlight device of the embodiment is further provided with an optical film having a light collecting property at the light outgoing surface side of the light diffuser of the embodiment from a viewpoint of luminance and luminance uniformity from front and oblique views.

The optical film having the light collecting property means a film having a function to raise light entering the film in a direction right above the film, and a film is preferably used in which a main peak angle of the light outgoing distribution measured by the gonio photometer (for example, GC5000L manufactured by Nippon Denshoku Industries) becomes not more than 50 degrees when a monochromatic light of 550 nm is made to enter the sheet at an incident angle of 60 degrees. More preferably, the optical film is a film whose main peak angle is 35 degrees to 45 degrees.

For example, commercially available prism sheet, diffusion sheet, lens sheet, etc. are included in the optical film.

Particularly, it is preferably used a pattern in which two optical films are arranged in which a main peak angle of the light outgoing distribution measured by the gonio photometer is 35 degrees to 45 degrees when the monochromatic light of 550 nm is made to enter the sheet at the incident angle of 60 degrees at a surface side opposite to the light sources of the light diffuser, or is more preferably used a pattern in which one optical film is arranged in which the main peak angle of the light outgoing distribution measured by the gonio photometer is 35 degrees to 45 degrees when the monochromatic light of 550 nm is made to enter the sheet at the incident angle of 60 degrees at an opposite side to the light sources of the light diffuser, and in which a prism sheet is further arranged on the optical film.

Although at least three or more optical films having the light collecting property have been required in order to achieve a good balance between luminance and luminance uniformity on a condition of P/H=1.9 in a conventional light diffuser, for example, a light diffuser having a concave quadrangular pyramid shape on a surface thereof, only two optical films can exert similar performance to the three films when the light diffuser of the embodiment is used. Consequently, an economical effect is remarkably large since optical films can be reduced significantly.

Figure 9:
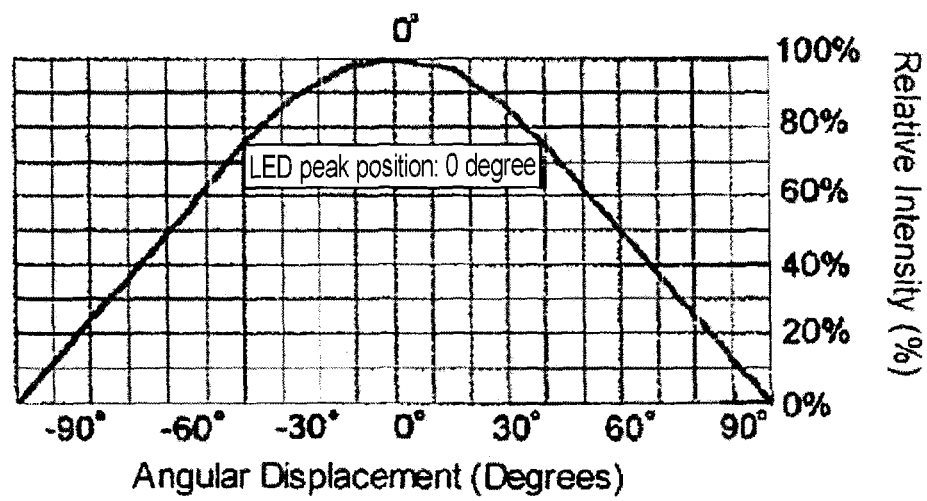
FIG. 9 is a light outgoing distribution graph of an LED-1.

In the direct type backlight device of the embodiment, in a preferred point light source, included are: a point light source whose light peak angle is −25 to 25° and whose beam intensity of light right thereabove is high (for example, an LED light source having the Lambertian light outgoing distribution); an LED light source having the wide angle light outgoing distribution in which the light peak angle exceeds 25°; or laser light sources. Particularly, a point light source is preferably used whose beam intensity right thereabove is high, for example, a point light source having the light outgoing distribution in which the light peak intensity is −25 to 25°, and among them, as shown in FIG. 9, more preferably used is a point light source having a Lambertian type light outgoing distribution in which a light peak angle is 0 degree and a half angle is 60 degrees (LED light source).

There is no particular limit to conditions other than the light outgoing distribution and, for example, the following point light sources can be included: a pseudo white LED of a type that excites a yellow phosphor by a blue LED, or of one-chip type that excites green and red phosphors by the blue LED; a pseudo white LED of a multichip type that combines red/green/blue LEDs to produce a white light, or further of one-chip type that combines a near-ultraviolet LED and red/green/blue phosphors; and further a combination of red/green/blue lasers, etc.

The direct type point light source backlight of the embodiment exerts particularly superior luminance uniformity when arrangement of the plurality of point light sources and the triangular pyramid shape of the convex portion provided on the surface of the light diffuser have a specific relation with each other.

Specifically, as shown in FIG. 10, it is preferable from a viewpoint of luminance uniformity that the plurality of convex portions are periodically arranged on the surface of the light diffuser so as to be parallel to one sides of triangular bottom surfaces of the adjacent convex portions, and that the plurality of point light sources are periodically arranged in a lattice, and that the point light sources and the light diffuser have a positional relation in which at least one side of the triangular bottom surface of each convex portion of the light diffuser is parallel to or perpendicular to diagonal lines of a quadrangle composing lattices of lattice-shaped arrangement of the plurality of point light sources.

It is to be noted that the parallel positional relation includes misalignment within ±2° from a parallel state, and the vertical positional relation includes misalignment within ±2° from a vertical state.

Here, the lattice means arrangement of each top of the quadrangles when a flat surface is filled with the quadrangles so that sides and tops of the adjacent quadrangles may correspond to each other.

The quadrangle includes, for example, a square, a rectangle, a parallelogram, etc.

It is particularly preferable from a viewpoint of luminance uniformity and a color unevenness characteristic that the point light sources and the light diffuser have a positional relation in which at least one side of the triangular bottom surface of each convex portion of the light diffuser is perpendicular to the shorter diagonal line of the diagonal lines of the quadrangle composing the lattices of the lattice-shaped arrangement of the plurality of point light sources.

In addition, as shown in FIG. 11, when the triangular bottom surface of the triangular pyramid, which is the convex portion of the light diffuser is an isosceles triangle, it is preferable from the viewpoint of luminance uniformity that a base of the isosceles triangular bottom surface of the convex portion and the diagonal lines of the quadrangle composing the lattices of the lattice-shaped arrangement of the point light sources are in a parallel or a vertical positional relation, and is more preferable that the quadrangle composing the lattices of the lattice-shaped arrangement is a rhombus shape in which bases of isosceles triangles are aligned face to face.

The parallel positional relation includes misalignment within ±2° from a parallel state, and the vertical positional relation includes misalignment within ±2° from a vertical state.

It is particularly preferable from the viewpoint of luminance uniformity and the color unevenness characteristic that the base of the isosceles triangular bottom surface of the convex portion, and the shorter diagonal line of the diagonal lines of the quadrangle composing the lattices of the lattice-shaped arrangement of the point light sources have a vertical relation with each other.

Further, when the triangular bottom surface of the triangular pyramid convex portion of the light diffuser is an equilateral triangle, it is more preferable from the viewpoint of luminance uniformity that one side of the equilateral triangular bottom surface of the convex portion and the diagonal lines of the quadrangle composing the lattices of the lattice-shaped arrangement of the point light sources are in a parallel or a vertical positional relation, and as shown in FIG. 12, it is more preferable that the quadrangle composing the lattices of the lattice-shaped arrangement is a rhombus shape in which bases of equilateral triangles are aligned face to face.

The parallel positional relation includes misalignment within ±2° from a parallel state, and the vertical positional relation includes misalignment within ±2° from a vertical state.

It is particularly preferable from the viewpoint of luminance uniformity and the color unevenness characteristic that the one side of the equilateral triangular bottom surface of the convex portion and the shorter diagonal line of the diagonal lines of the quadrangle composing the lattices of the lattice-shaped arrangement of the point light sources have a vertical relation with each other.

It is preferable that the point light sources comprised in the direct type point light source backlight device of the embodiment are arranged so that a distance between each point light source is as uniform as possible.

Figure 13:
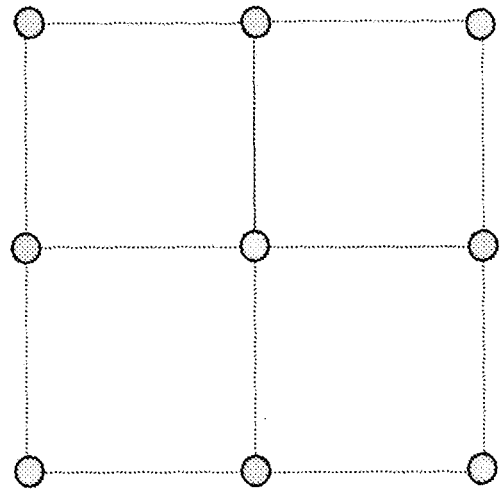
FIG. 13 is an illustration showing one example of LED arrangement (lattice arrangement) in a backlight (plan view).
Figure 14:
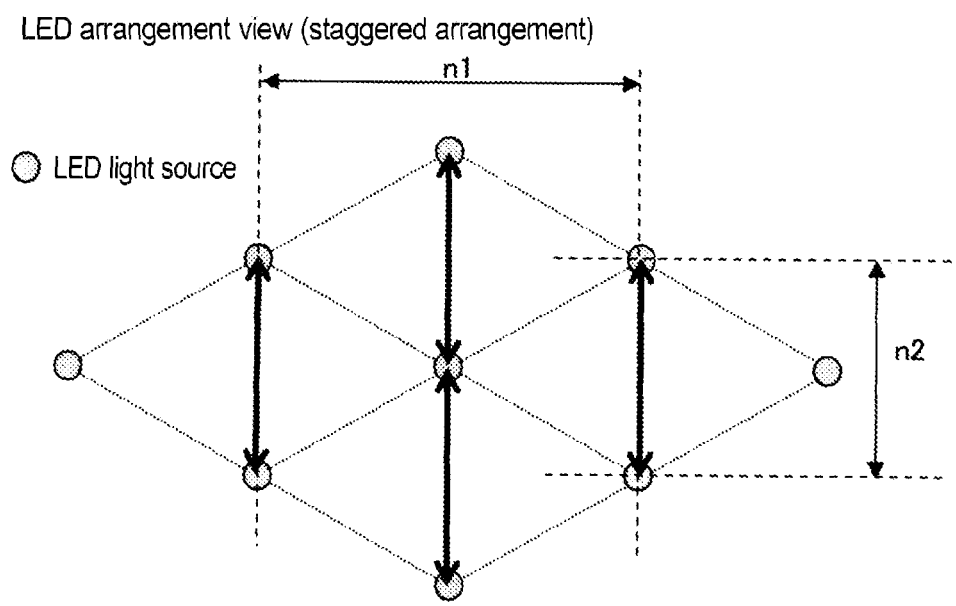
FIG. 14 is an illustration showing one example of LED arrangement (staggered arrangement) in a backlight (plan view).

Specifically, can be preferably employed an array method in which the point light source is respectively arranged in a longitudinal direction and in a lateral direction of the light diffuser at regular intervals in a tetragonal lattice pattern or in a rectangular lattice pattern (refer to FIG. 13, a quadrangle composing the lattice: a square or a rectangle), or an array method in which the point light source is respectively arranged in a longitudinal direction and in a lateral direction of a screen at regular intervals in a staggered (lattice) pattern (triangular lattice pattern), etc (refer to FIG. 14, a quadrangle composing the lattice: a rhombus shape).

Particularly, it is more preferable that the point light source is arranged in the staggered pattern from a viewpoint of improving luminance uniformity, and as shown in FIG. 14, when a distance is set to be n1 and n2 between the light sources of the lateral direction and the longitudinal direction of the backlight (light diffuser) of the point light source arranged in the staggered pattern, it is preferable that n1/n2 is 0.26 to 3.87, more preferable 0.35 to 2.82, still more preferable 0.46 to 0.75 or 1.33 to 2.18, the most preferable 0.51 to 0.66 or 1.52 to 1.96.

[Application]

When the light diffuser in the embodiment is used as a light diffuser for the direct type point light source backlight, it exerts effects of improvement in luminance and improvement in luminance uniformity, and particularly, improvement of luminance uniformity in a front direction and in an oblique view direction since it has the plurality of the substantially triangular pyramid shape convex portions on the surface (preferably at a side that serves as a light outgoing surface when the light diffuser is used in combination with the light sources) thereof. Therefore, according to the direct type point light source backlight using the point light sources, can be reduced reduction of the number of point light sources, reduction of optical films, and thinning of the backlight that have not been able to be achieved by the conventional technology, and the direct type point light source backlight using the point light sources can be preferably used also for digital signages having direct type point light source backlight devices, such as a liquid crystal TV, an illuminating device, or a signboard.

EXAMPLES

Hereinafter, although specific examples and comparative examples will be described, the present invention is not limited to these.

Main measured values in the examples were measured by the following methods.

(1. Light Outgoing Surface Shape of Light Diffuser)

<1-1 Surface Shape>

A light outgoing surface side of a light diffuser was observed by a laser microscope GenerationII VK-9700 manufactured by KEYENCE, and a shape of a convex portion was observed.

<1-2 b, c, d, and g Values>

As for b, c, d, and g values, similarly to the <1-1>, observed was a cross section cut along a flat surface that passes through a top of the convex portion (or a bottom point of the concave portion) of a polygonal pyramid shape convex portion or a polygonal pyramid shape concave portion and that are perpendicular to one side of a triangular bottom surface, a shape of the cross section was observed.

In a cutting surface appearing when the convex portion is cut at a flat surface passing three points of the following I and J points, and the top of the convex portion (a center of gravity of a triangle of a top when the convex portion is a triangular pyramid frustum shape), b, c, and d were, as shown in FIG. 5, for example, respectively set to be: a length of a projected line segment obtained when a portion B, in which an angle A' between a tangent plane of one side surface and a bottom surface of the convex portion satisfies the following equations (1') and (2'), is projected to a horizontal surface (the b value); a length of a projected line segment obtained when a portion C, which is closer to a skirt side of the convex portion than the portion B, is projected to the horizontal surface (the c value); and a length of a projected line segment obtained when a portion D, which is closer to the top side than the portion B, is projected to the horizontal surface (the d value).

$$\theta' \geq -40A° + 115.2°  \quad (1')$$

$$\theta' \leq 25A° + 22.25°  \quad (2')$$

I point: A projected point obtained when the top of the convex portion (the center of gravity of the triangle top when the convex portion is the triangular pyramid frustum shape) is vertically projected to the triangular bottom surface.

J point: An intersection of a perpendicular with a side that is obtained when the perpendicular is drawn from the I point to the side closest to the I point among the sides composing the triangular bottom surface, The g value was, for example, as shown in FIGS. 23(A) and (B), set to be a length of a projected line segment obtained when a portion, which is located closer to the top side than a portion in which the angle θ' between a tangent among tangents of the one side surface of the convex portion and the bottom surface satisfies (1') and (2'), was projected to the horizontal surface in a single-sided portion, which includes the J' point, from a center of a cutting surface appearing when the convex portion is cut at a flat surface perpendicular to the triangular bottom surface and also passing through the following I' and J' points. However, when there exist a plurality of cutting surfaces that satisfy the conditions, the cutting surface in which the value of g was the largest was employed.

I' point: A midpoint of a line segment obtained by connecting a point obtained when the top of the convex portion (the center of gravity of the triangle top when the convex portion is the triangular pyramid frustum shape) is vertically projected to the triangle bottom surface with a top of the triangular bottom surface closest to the projected point among the tops of the triangular bottom surface.

J' point: An intersection of a perpendicular with a side that is obtained when the perpendicular is drawn from the I' point to the side closest to the I' point among the sides composing the triangular bottom surface.

<1-3 Inclined Angle θ (Degree) with Respect to Bottom Surface (Opening Surface) of Side Surface of Convex Portion (Concave Portion)>

Similarly to the <1-2>, observation of the cross section of a light outgoing surface of the light diffuser was performed, and an inclined angle (0) between the side surface and the bottom surface was measured.

<1-4 Angle F Value (Degree) Between One Side of Triangular Bottom Surface of Convex Portion and Diagonal Line of Quadrangle Composing Lattice of Lattice-Shaped Arrangement of Point Light Source>

Figure 15:
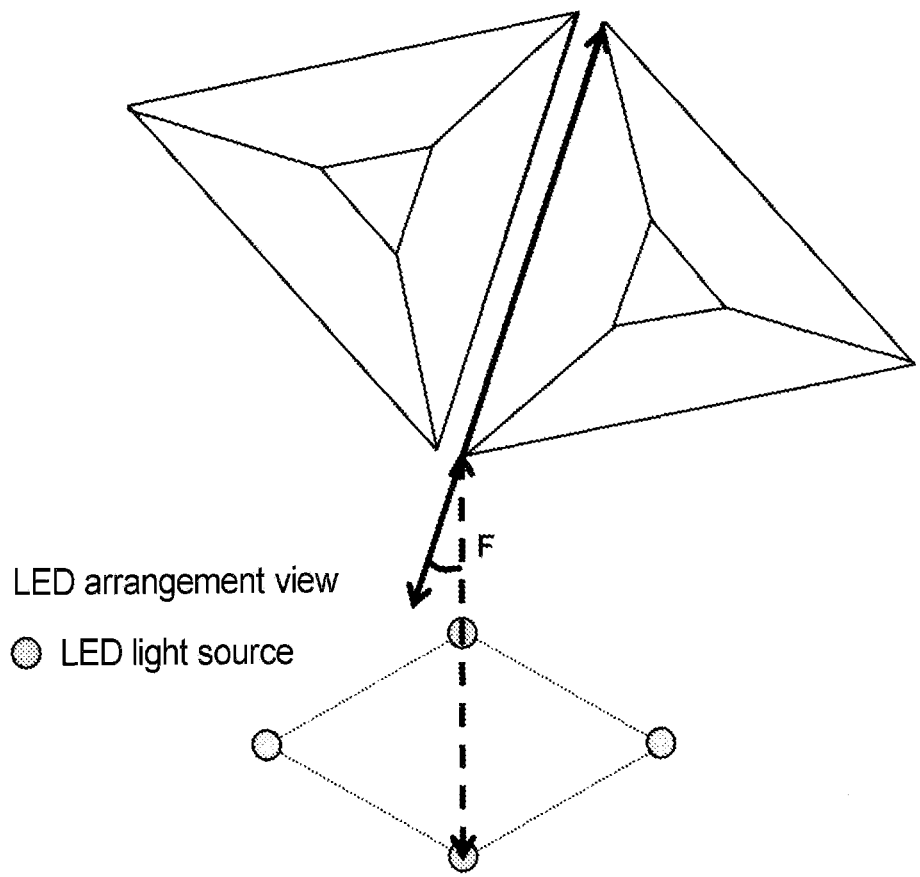
FIG. 15 is an illustration of a correlation between the convex portion triangular pyramid shape shaped on the surface of the light diffuser and the LED arrangement.

Similarly to the <1-1>, a triangular pyramid shape convex portion of a light outgoing surface side of the light diffuser was observed, and as shown in FIG. 15, a most small angle was set to be an F value (degree) of angles between a shorter diagonal line of diagonal lines of a quadrangle comprised in lattices of lattice-shaped arrangement of the light source and one side of the triangular bottom surface of the convex portion.

<1-5 Internal Angle ($\alpha$, $\beta$, and $\gamma$) of Triangular Bottom Surface of Convex Portion>

Similarly to the <1-1>, the light outgoing surface side of the light diffuser was observed by a laser microscope, and as shown in FIG. 6, internal angles $\alpha$, $\beta$, and $\gamma$ of the triangular bottom surface of the convex portion were obtained.

(2. Refractive Index A)

A sheet with a thickness of 0.3 mm was fabricated using a transparent material (transparent resin) of materials used for an (a) lens layer, and a refractive index A was obtained using an Abbe refractometer based on JISK7142.

(3. Average Reflectance R (%))

Using a spectrophotometer UV3150 manufactured by Shimazu Corporation, a light with a wavelength of 450 to 750 nm is made to enter at an incident angle that is inclined by seven degrees from a perpendicular with respect to the horizontal surface of the light diffuser from a light entering surface side of the light diffuser to thereby obtain a reflectance for every wavelength of 1 nm, and an average value of the reflectances was set to be an average reflectance R (%).

It is to be noted that the average reflectance R (%) was obtained as a relative value with respect to an average reflectance of barium sulfate as a standard plate with the average reflectance of barium sulfate being defined as 100%.

(4. Total Light Transmittance)

<4-1. Total Light Transmittance Tb (%) of Light Diffuser>

A total light transmittance Tb of the light diffuser was measured using a turbidity meter NDH2000 manufactured by Nippon Denshoku Industries with a method based on JIS K7105.

It is to be noted that when the (a) lens layer and a (b) diffusion layer of the light diffuser are the same layer, when the (a) layer and the (b) layer are a continuous layer, and when the (a) layer and the (b) layer are separation layers, a surface of the (a) layer and the (b) layer in a state of being laminated was smoothed with heat pressing etc., and subsequently, the pressed molding was measured.

<4-2. Total Light Transmittance T (%) when Light is Made to Enter from Light Outgoing Surface Side>

A total light transmittance T (%) when light is made to enter from a light outgoing surface side of the light diffuser was obtained using a turbidity meter NDH2000 manufactured by Nippon Denshoku Industries, with a method based on JIS K7105.

It is to be noted that when the (a) lens layer and the (b) diffusion layer are the separation layers, the (a) layer and the (b) layer are laminated so that the side of the (a) layer having the convex portions formed thereon might be directed outside, and a numerical value obtained by making the light enter from a lens side of the (a) layer was set to be the total light transmittance T (%).

(5. Diffusion Rate S (%))

Using a gonio photometer GC5000L manufactured by Nippon Denshoku Industries, measured was luminance of a transmitted light of a light entering at a light incident angle of 0 degree in a transmissive mode, and a diffusion rate S of the light diffuser was obtained by the following equation.

It is to be noted that when the (a) lens layer and the (b) diffusion layer of the light diffuser are the same layer, when the (a) layer and the (b) layer are the continuous layer, and when the (a) layer and the (b) layer are the separation layers, the surface of the (a) layer and the (b) layer in a state of being laminated was smoothed with heat pressing etc., and subsequently, the pressed molding was measured.

$$\text{Diffusion rate } S = 100 \times (L(20 \text{ degrees}) + L(70 \text{ degrees}))/(L(5 \text{ degrees}) \times 2)$$

Here,

L (5 degrees) indicates luminance of a transmitted light having come out at an angle of 5 degrees ($cd/m^2$), L (20 degrees) indicates luminance of a transmitted light having come out at an angle of 20 degrees ($cd/m^2$), L (70 degrees) indicates luminance of a transmitted light having come out at an angle of 70 degrees ($cd/m^2$), respectively.

(6. Average Inclined Angle U (Degree) of Convex-Concave Portion of Light Entering Surface of Light Diffuser)

The light entering surface of the light diffuser was observed by the laser microscope, a cross-sectional shape was analyzed over a width of 1000 μm in a longitudinal direction and in a lateral direction of the light diffuser, an average inclined angle (inclined angle with respect to the horizontal surface) of a width of 1 μm was continuously obtained over the width of 1000 μm, an average inclined angle in the longitudinal direction and an average inclined angle in the lateral direction were respectively calculated, and an average value thereof was further calculated to be set to be an average inclined angle U.

(7. Average LED Interval P)

A monitor area ($mm^2$) displayed using an LED light source backlight was divided by the number of mounted LEDs, and a square root of a value obtained by the division was set to be an average LED interval P (mm).

(8. Average Distance H Between Uppermost Portion of LED and Light Diffuser)

A distance (mm) between an uppermost portion of a mounted LED of an LED light source backlight and the light diffuser was measured in all the mounted LED, and an average value of the measured values was set to be an average distance H between the uppermost portion of the LED and the light diffuser.

(9. Average Luminance)

A light diffuser and a predetermined optical film were arranged at the LED light source backlight, the LEDs were turned on, and luminance and a color difference were measured using Prometric of Cybernet Corporation.

It is to be noted that a camera was arranged to perform measurement at a position farther from right above a center of the LED light source backlight by 1 meter.

Although a size of a screen portion of the LED light source backlight used in the examples and the comparative examples was 306 mm×306 mm, 340 mm×340 mm, or 400 mm×400 mm, a portion whose central portion was 200 mm×200 mm was used as a luminance measuring portion, and luminance was measured at resolution of 300×300 square.

An average value of the luminance measured as described above was set to be an average luminance.

(10. Luminance Uniformity)

<10-1. Luminance Unevenness (Front)>

Luminance unevenness was calculated using luminance data of the portion of 200 mm×200 mm measured above (9. Average luminance).

Figure 22:
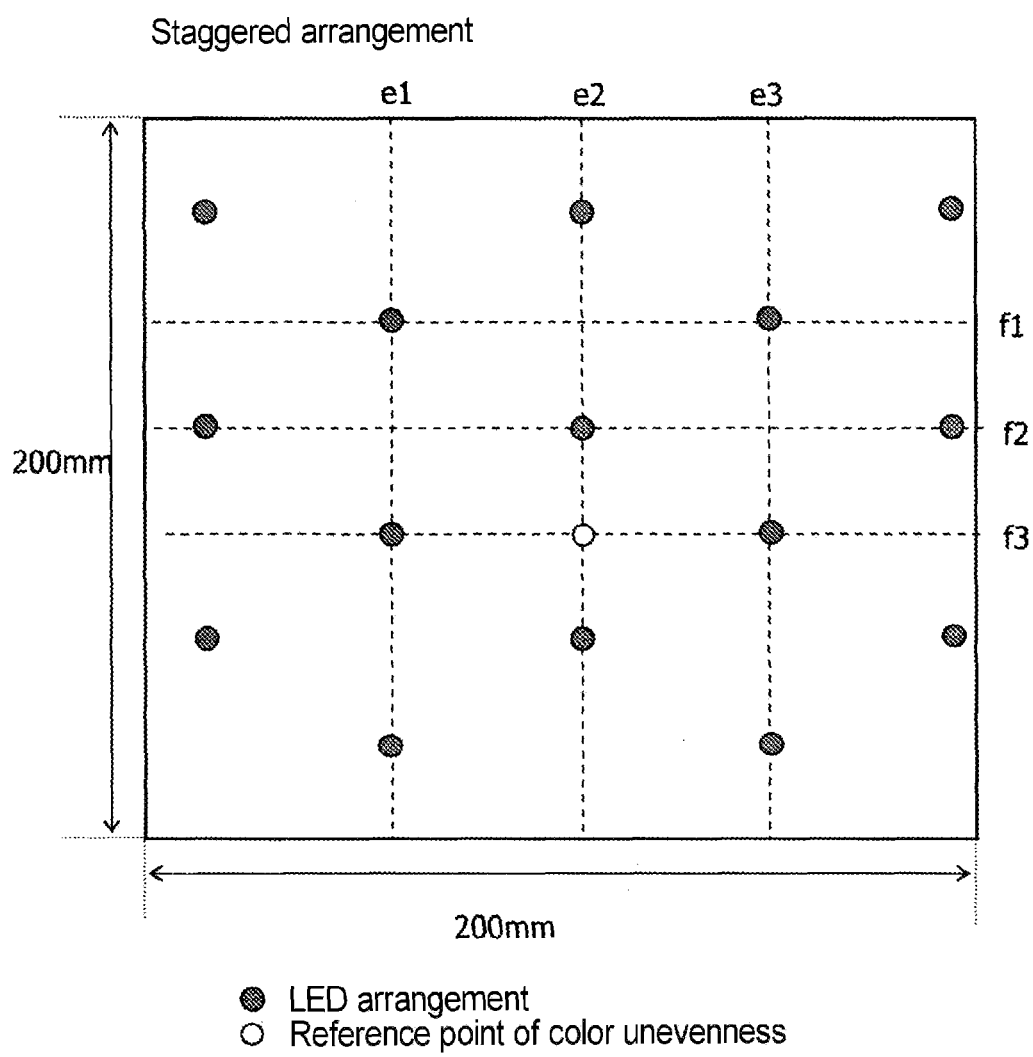
FIG. 22 is an explanatory view of a measuring method of luminance unevenness in an example.

Specifically, as shown in FIG. 22, as for luminance data on vertical lines of a monitor e1, e2, and e3 that pass through right above the LEDs of the LED backlight (on three lines closest to a center of the monitor), and on horizontal lines of the monitor f1, f2, and f3 (on three lines closest to the center of the monitor), a standard deviation of a luminance ratio (luminance/moving average value of luminance) was obtained for each line, and an average value of the obtained standard deviation values was set to be luminance unevenness.

A measurement point was set to be 24649 points of 157 by 157.

Here, the moving average value is an average value of a specific section, and specifically, means an average luminance on a line connecting the adjacent LEDs with each other.

For example, when the data of the luminance on the e1 that passes through right above the LEDs is set to be A, B, C, D, E, F, G, H, I, J, K, L, M, and N, assume that the luminance data right above the LEDs is A, E, I, and N.

In this case, a moving average value at the C point is a luminance average value Cav of the A to E (a space between the adjacent LEDs), and a moving average value at the D point is an average value Dav of the B to F.

A moving average at each point is obtained in a manner described above.

Next, a luminance ratio (luminance/moving average value of luminance) of each point, for example, C/Cav, B/Bav, ... is obtained, and further a standard deviation of the luminance ratio is obtained.

The standard deviation obtained as described above serves as a standard deviation of a luminance ratio concerning the luminance data on the e1.

Standard deviations of the other e2, e3, f1, f2, and f3 were similarly obtained in a manner described above, and finally, an average value of the obtained standard deviations was calculated to set to be a luminance unevenness value from a front view.

<10-2. Luminance Unevenness (Oblique View)>

A camera was inclined at 45 degrees in a direction of the backlight at a position farther from right above the center of the backlight by 1 meter and horizontally farther from the center of the backlight by 1 meter, and a luminance distribution was measured using the Prometric.

A luminance unevenness value was calculated by a technique similar to the <9-1> to be set to be a luminance unevenness value from an oblique view.

It is to be noted that an evaluation of the luminance unevenness was performed based on the following criteria.

<Luminance Unevenness Evaluation>

Very good: Luminance unevenness value≤0.0035

→ A level where luminance unevenness cannot be visually seen at all

Good: 0.0036≤luminance unevenness value≤0.0049

→ A level where luminance unevenness can be slightly visually seen

Poor: 0.0050≤luminance unevenness value

→ A level where luminance unevenness can be visually seen (11. Color Unevenness)

Color unevenness (a maximum color difference) was calculated using color difference data of the portion of 200 mm×200 mm measured above (9. Average luminance).

A measurement point was set to be a total of 24649 points obtained by dividing the 200 mm×200 by 157×157.

Specifically, color difference data is the color difference data expressed by the following equation in a range of the 200 mm×200 mm from a reference point of color unevenness shown in FIG. 22.

A maximum color difference value was set to be a maximum color difference in the color difference data.

$$\text{Color unevenness} = ((u'_{i,j} - u'_{ref(i,j)})^2 + (v'_{i,j} - v'_{ref(i,j)})^2)^{1/2}$$

$u'_{i,j}$, $v'_{i,j}$: each chromaticity of 24649 points $u'_{ref(i,j)}$, $v'_{ref(i,j)}$: chromaticity of reference point (screen center (coordinate (0, 0)))

<Color Unevenness Evaluation>

Very good: Color unevenness value≤0.0035

→ A level where color unevenness cannot be visually seen at all

Good: 0.0036≤color unevenness value≤0.0049

→ A level where color unevenness can be slightly visually seen

Poor: 0.0050≤color unevenness value

→ A level where color unevenness can be visually seen

Next will be described a manufacturing method of a press original plate used when manufacturing the light diffuser in the examples and the comparative examples.

A press original plate, that will be described hereinafter, is a press original plate processed to be a light diffuser by performing heat press processing as described in the examples and the comparative examples, which will be described hereinafter.

(1. Press Original Plate 1)

99.97 mass part of polystyrene resin (Styron G9504 manufactured by PS Japan Corporation) with a refractive index of 1.59, and 0.3 mass part of acrylic cross-linked particles (TECHPOLYMER MBX-5 manufactured by SEKISUI PLASTICS CO., LTD.) with an average particle diameter of 5 μm were mixed by a Henschel mixer, and melt-kneaded to be pelletized on a condition of a resin temperature of 230° C. by a twin screw extruder (TEM-58 manufactured by TOSHIBA MACHINE CO., LTD.).

The pellet was melt-kneaded again by a single screw extruder TEX-90, and extruded from a T die with a width of 1000 mm to fabricate a sheet with a thickness of 1.5 mm.

(2. Press Original Plate 2)

99.95 mass part of polystyrene resin (Styron G9504 manufactured by PS Japan Corporation) with the refractive index of 1.59, and 0.5 mass part of acrylic cross-linked particles (TECHPOLYMER MBX-5 manufactured by SEKISUI PLASTICS CO., LTD.) with the average particle diameter of 5 μm were mixed by the Henschel mixer, and melt-kneaded to be pelletized on the condition of the resin temperature of 230 degrees C. by the twin screw extruder (TEM-58 manufactured by TOSHIBA MACHINE CO., LTD.).

The pellet was melt-kneaded again by the single screw extruder TEX-90, and extruded from the T die with the width of 1000 mm to fabricate the sheet with the thickness of 1.5 mm.

(3. Press Original Plate 3)

99.92 mass part of polystyrene resin (Styron G9504 manufactured by PS Japan Corporation) with the refractive index of 1.59, and 0.8 mass part of acrylic cross-linked particles (TECHPOLYMER MBX-5 manufactured by SEKISUI PLASTICS CO., LTD.) with the average particle diameter of 5 μm were mixed by the Henschel mixer, and melt-kneaded to be pelletized on the condition of the resin temperature of 230° C. by the twin screw extruder (TEM-58 manufactured by TOSHIBA MACHINE CO., LTD.).

The pellet was melt-kneaded again by the single screw extruder TEX-90, and extruded from the T die with the width of 1000 mm to fabricate the sheet with the thickness of 1.5 mm.

(4. Press Original Plate 4)

99.90 mass part of polystyrene resin (Styron G9504 manufactured by PS Japan Corporation) with the refractive index of 1.59, and 1.0 mass part of acrylic cross-linked particles (TECHPOLYMER MBX-5 manufactured by SEKISUI PLASTICS CO., LTD.) with the average particle diameter of 5 μm were mixed by the Henschel mixer, and melt-kneaded to be pelletized on the condition of the resin temperature of 230° C. by the twin screw extruder (TEM-58 manufactured by TOSHIBA MACHINE CO., LTD.).

The pellet was melt-kneaded again by the single screw extruder TEX-90, and extruded from the T die with the width of 1000 mm to fabricate the sheet with the thickness of 1.5 mm.

(5. Press Original Plate 5)

99.97 mass part of polyester resin (OKP4HT manufactured by Osaka Gas Chemicals Co., Ltd.) with a refractive index of 1.63, and 0.50 mass part of MS cross-linked particles (TECHPOLYMER SMX-5R manufactured by SEKISUI PLASTICS CO., LTD.) with an average particle diameter of 5 μm were mixed by the Henschel mixer, and melt-kneaded to be pelletized on a condition of a resin temperature of 270° C. by the twin screw extruder (TEM-58 manufactured by TOSHIBA MACHINE CO., LTD.).

The pellet was melt-kneaded again by the single screw extruder TEX-90, and extruded from the T die with the width of 1000 mm to fabricate the sheet with the thickness of 1.5 mm.

(6. Press Original Plate 6)

99.97 mass part of cycloolefin resin (ZEONEX480 manufactured by ZEON CORPORATION) with a refractive index of 1.53, and 0.30 mass part of silicone cross-linked particles (TOSPEARL T145 manufactured by Momentive Performance Materials Inc.) with an average particle diameter of 4.5 μm were mixed by the Henschel mixer, and melt-kneaded to be pelletized on a condition of a resin temperature of 270° C. by the twin screw extruder (TEM-58 manufactured by TOSHIBA MACHINE CO., LTD.).

The pellet was melt-kneaded again by the single screw extruder TEX-90, and extruded from the T die with the width of 1000 mm to fabricate the sheet with the thickness of 1.5 mm.

(7. Press Original Plate 7)

99.97 mass part of polymethylmethacrylate resin (Delpet 80N manufactured by Asahi Kasei Chemicals Corporation) with a refractive index of 1.49, and 0.30 mass part of polystyrene cross-linked particles (SX-350H manufactured by Soken Chemical & Engineering Co., Ltd.) with an average particle diameter of 5 μm were mixed by the Henschel mixer, and melt-kneaded to be pelletized on a condition of a resin temperature of 240° C. by the twin screw extruder (TEM-58 manufactured by TOSHIBA MACHINE CO., LTD.).

The pellet was melt-kneaded again by the single screw extruder TEX-90, and extruded from the T die with the width of 1000 mm to fabricate a sheet with a thickness of 1.5 mm.

(8. Press Original Plate 8)

99.95 mass part of polychlorotrifluoroethylene resin (M-300P manufactured by DAIKIN INDUSTRIES, ltd.) with a refractive index of 1.42, and 0.50 mass part of acrylic cross-linked particles (TECHPOLYMER SMX-5R manufactured by Sekisui Plastics Co., Ltd.) with an average diameter of 5 μm were mixed by the Henschel mixer, and melt-kneaded to be pelletized on a condition of a resin temperature of 250° C. by the twin screw extruder (TEM-58 manufactured by TOSHIBA MACHINE CO., LTD.).

The pellet was melt-kneaded again by the single screw extruder TEX-90, and extruded from the T die with the width of 1000 mm to fabricate a sheet with a thickness of 1.5 mm.

(9. Press Original Plate 9)

99.97 mass part of polystyrene resin (Styron G9504 manufactured by PS Japan Corporation) with the refractive index of 1.59, and 0.045 mass part of acrylic cross-linked particles (TECHPOLYMER MBX-5 manufactured by SEKISUI PLASTICS CO., LTD.) with the average particle diameter of 5 μm were mixed by the Henschel mixer, and melt-kneaded to be pelletized on the condition of the resin temperature of 230° C. by the twin screw extruder (TEM-58 manufactured by TOSHIBA MACHINE CO., LTD.).

The pellet and polystyrene resin (Styron G9504 manufactured by PS Japan Corporation) were respectively melt-kneaded again using the single screw extruder TEX-90 and a single screw extruder TEX-65, and extruded from the T die (a feed block die) with the width of 1000 mm with a two-layered layer configuration of two types of layers with thicknesses of 1.0 mm and 0.5 mm to fabricate a sheet with a thickness of 1.5 mm.

(10. Press Original Plate 10)

The polystyrene resin (Styron G9504 manufactured by PS Japan Corporation) of the refractive index 1.59 was extruded from the T die with the width of 1000 mm on a temperature condition of a resin temperature of 230 degrees C. by the single screw extruder TEX-90 to fabricate a sheet with a thickness of 0.3 mm.

(11. Press Original Plate 11)

The polystyrene resin (Styron G9504 manufactured by PS Japan Corporation) of the refractive index 1.59 was extruded from the T die with the width of 1000 mm on the temperature condition of the resin temperature of 230 degrees C. by the single screw extruder TEX-90 to fabricate a sheet with a thickness of 1.5 mm.

(12. Press Original Plate 12)

99.95 mass part of polystyrene resin (Styron G9504 manufactured by PS Japan Corporation) with the refractive index of 1.59, and 0.2 mass part of acrylic cross-linked particles (TECHPOLYMER MBX-5 manufactured by SEKISUI PLASTICS CO., LTD.) with the average particle diameter of 5 μm were mixed by the Henschel mixer, and melt-kneaded to be pelletized on the condition of the resin temperature of 230° C. by the twin screw extruder (TEM-58 manufactured by TOSHIBA MACHINE CO., LTD.).

The pellet was melt-kneaded again by the single screw extruder TEX-90, and extruded from the T die with the width of 1000 mm to fabricate a sheet with a thickness of 1.5 mm.

(13. Press Original Plate 13)

The polymethylmethacrylate resin (Delpet 80N manufactured by Asahi Kasei Chemicals Corporation) with the refractive index of 1.49 was extruded from the T die with the width of 1000 mm on the temperature condition of the resin temperature of 240 degrees C. by the single screw extruder TEX-90 to fabricate a sheet with a thickness of 1.0 mm.

(14. Press Original Plate 14)

99.97 mass part of cycloolefin resin (ZEONEX480 manufactured by ZEON CORPORATION) with the refractive index of 1.53, and 0.05 mass part of silicone cross-linked particles (TOSPEARL T145 manufactured by Momentive Performance Materials Inc.) with the average particle diameter of 4.5 μm were mixed by the Henschel mixer, and melt-kneaded to be pelletized on the condition of the resin temperature of 270° C. by the twin screw extruder (TEM-58 manufactured by TOSHIBA MACHINE CO., LTD.).

The pellet was melt-kneaded again by the single screw extruder TEX-90, and extruded from the T die with the width of 1000 mm to fabricate a sheet with a thickness of 1.5 mm.

Next will be described LED types and an LED arrangement method in a light source portion of an LED light source backlight used in combination with the light diffuser in the examples and the comparative examples.

(1. LED Type)

<1-1. LED-1>

A white LED manufactured by Cree, Inc. (LM6-EWN1-03-N3) in which a light peak angle is 0 degree was used (As for a light outgoing distribution, refer to FIG. 9.).

<1-2. LED-2>

Figure 19:
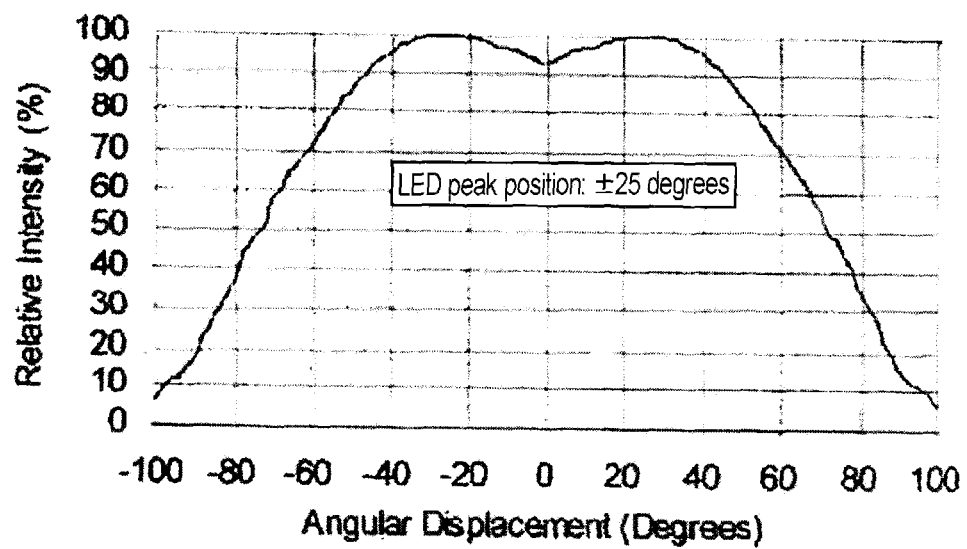
FIG. 19 is a light outgoing distribution graph of an LED-2.

A white LED manufactured by Philips Lumileds Lighting Company (LUXION EMITTER) in which a light peak angle is ±25 degrees was used (As for a light outgoing distribution, refer to FIG. 19.).

<1-3. LED-3>

Figure 20:
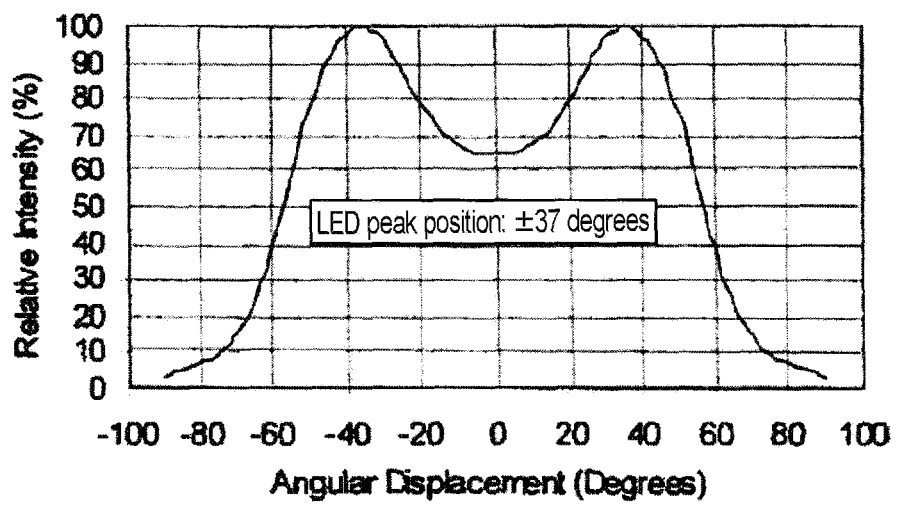
FIG. 20 is a light outgoing distribution graph of an LED-3.

A white LED manufactured by Philips Lumileds Lighting Company (LUXION EMITTER) in which a light peak angle is ±37 degrees was used (As for a light outgoing distribution, refer to FIG. 20.).

(2. LED Backlight)<

2-1. LED Backlight 1>

A hundred and four white LEDs were, as shown in FIG. 14, mounted on an LED board (PCB) in a staggered arrangement (arrangement 1) of an LED interval n1: 55.8 mm and n2: 32.2 mm (n1/n2=0.58 (Refer to FIG. 14.)), and an LED light source backlight evaluator with a screen size of 306×306 mm was fabricated.

At this time, an average LED interval P was 30 mm.

On the LED board (PCB) having the LED mounted thereon, applied was MC-PET (manufactured by FURUKAWA ELECTRIC CO., LTD.) whose diffuse reflectance is 95% as a reflection film with a double-sided tape, and a distance h between the reflection film and an uppermost portion of the LED was kept to be 1.5 mm (Refer to FIG. 8.).

Next, a light reflection plate was fixed above the reflection film so that a distance H between the uppermost portion of the LED and the light diffuser might be 16 mm to be set as an LED backlight 1 (Refer to FIG. 8.).

A current of 20 mA was made to flow in one LED to turn on the backlight. Measurement of luminance and luminance unevenness was performed after aging of the backlight was performed for an hour after the LED was turned on.

<2-2. LED Backlight 2>

The light diffuser was fixed above the reflection film so that the distance H between the uppermost portion of the LED and the light diffuser might be 14 mm.

The other conditions were set to be similar to those of the <2-1. LED backlight 1>, and a backlight evaluator was fabricated to be set as an LED backlight 2.

<2-3. LED Backlight 3>

The light diffuser was fixed above the reflection film so that the distance H between the uppermost portion of the LED and the light diffuser might be 12 mm.

The other conditions were set to be similar to those of the <2-1. LED backlight 1>, and a backlight evaluator was fabricated to be set as an LED backlight 3.

<2-4. LED Backlight 4>

A hundred white LEDs were, as shown in FIG. 14, mounted on the LED board (PCB) in a staggered arrangement (arrangement 2) of the LED interval n1: 63.3 mm and n2: 36.5 mm (n1/n2=0.58 (Refer to FIG. 14.)), and an LED light source backlight device with a screen size of 340×340 mm was fabricated.

At this time, the average LED interval P was 34 mm.

The other conditions were set to be similar to those of the <2-1. LED backlight 1>, and the fabricated LED light source backlight device was set as an LED backlight 4.

<2-5. LED Backlight 5>

A hundred white LEDs were, as shown in FIG. 14, mounted on the LED board (PCB) in a staggered arrangement (arrangement 3) of the LED interval n1: 74.4 mm and n2: 43.0 mm (n1/n2=0.58 (Refer to FIG. 14.)), and an LED light source backlight device with a screen size of 400×400 mm was fabricated.

At this time, the average LED interval P was 40 mm.

The other conditions were set to be similar to those of the <2-1. LED backlight 1>, and the fabricated LED light source backlight device was set as an LED backlight 5.

Next, optical films used in the examples and the comparative examples will be described.

(1. Optical Film 1)

A diffusion sheet: BS-912 (KEIWA Inc.)

When using the gonio photometer (GC5000L manufactured by Nippon Denshoku Industries), measured was a main peak angle of a light outgoing distribution when a monochromatic light of 550 nm was made to enter at an incident angle of 60 degrees, the measured value was 38 degrees.

(2. Optical Film 2)

A lens sheet: PTR733 (manufactured by SHINWHA INTERTEK Co., Ltd.)

When using the gonio photometer (GC5000L manufactured by Nippon Denshoku Industries), measured was a main peak angle of a light outgoing distribution when the monochromatic light of 550 nm was made to enter at the incident angle of 60 degrees, the measured value was 42 degrees.

(3. Optical Film 3)

A prism sheet: BEFIII (manufactured by Sumitomo 3M Limited)

When using the gonio photometer (GC5000L manufactured by Nippon Denshoku Industries), measured was a main peak angle of a light outgoing distribution when the monochromatic light of 550 nm was made to enter at the incident angle of 60 degrees, the measured value was 27 degrees.

(4. Optical Film 4)

A luminance improving sheet: DBEF-D400 (manufactured by Sumitomo 3M Limited)

When using the gonio photometer (GC5000L manufactured by Nippon Denshoku Industries), measured was a main peak angle of a light outgoing distribution when the monochromatic light of 550 nm was made to enter at the incident angle of 60 degrees, the measured value was 56 degrees.

Example 1

A press original plate 1 fabricated as mentioned above was made to be held between a press die shaped as a predetermined shape to be put in a pressing machine, and it was pressed for 30 minutes on a condition where a press plate temperature was 180° C. and a surface pressure was 100 kg/cm².

Subsequently, the press die having the press original plate 1 held therebetween was transferred to the pressing machine cooled with water, and cooled for ten minutes.

After cooled, a light diffuser with a thickness of 1.5 mm shaped as the predetermined shape was taken out from the press die.

Figure 21:
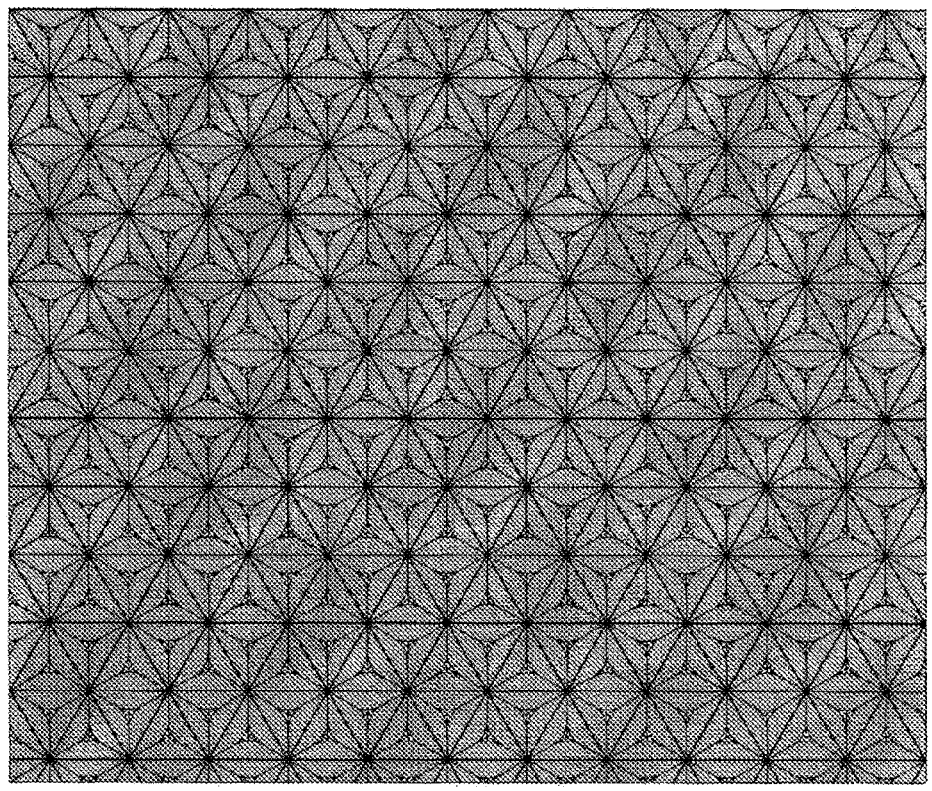
FIG. 21 is an elevational view (convex triangular pyramid shape) of a light outgoing surface side of one example of the light diffuser of the present embodiment.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

In addition, an inclined angle θ of the substantially triangular pyramid convex portion of this light diffuser is 62 degrees, and cross-sectional shapes of the b, c, and d portions having described using FIG. 5 were 89 μm, 1 μm, and 10 μm, respectively, and a cross-sectional shape of the g portion having described using FIGS. 23(A) and (B) was 1 μm.

Further, when a total light transmittance T of the light diffuser was measured in a case where a light entered from a convex lens side was measured, the measured value was 84%.

In addition, it was confirmed that an average reflectance R of the light diffuser was 46%, and that the light diffuser did not have retroreflection characteristics.

The light diffuser fabricated as described above was attached to the LED backlight 1 so that one side of the bottom surface equilateral triangle of each convex portion of the light diffuser might be parallel (F=0°) to diagonal lines of a quadrangle comprised in lattices of the LED arrangement 1 of the LED backlight 1, and two diffusion sheets and one luminance improving film were overlappingly placed on the light diffuser, and then luminance, luminance unevenness (from front and oblique views) and color unevenness were measured, good results were shown in which luminance was 5340 cd/cm², luminance unevenness from the front was 0.0044, luminance unevenness from the oblique view observed from an oblique angle of 45 degrees was 0.0048, and color unevenness (a maximum color difference) was 0.0045.

Evaluation results are shown in the following Table 1.

Examples 2 to 8 and Comparative Examples 1 to 4

The press die was changed.

The other conditions were set to be similar to example 1 to fabricate a light diffuser, and luminance, luminance unevenness (from front and oblique views), and color unevenness of the backlight were measured similarly to example 1.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

An inclined angle θ of the substantially triangular pyramid convex portion of the light diffuser obtained in each example and comparative example was just as the following Table 1.

All the light diffusers of each example showed good results of luminance, luminance unevenness (from front and oblique views), and color unevenness.

Evaluation results are shown in the following Table 1.

Examples 9 to 17 and Comparative Examples 5 and 6

The press die was changed, and press molding was performed using the press original plate 5 on a condition where a press plate temperature was 200° C. and a surface pressure was 100 kg/cm².

The other conditions were set to be similar to example 1 to fabricate a light diffuser, and luminance, luminance unevenness (from front and oblique views), and color unevenness of the backlight were measured similarly to example 1.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

An inclined angle θ of the substantially triangular pyramid convex portion of the light diffuser obtained in each example and comparative example was just as the following Table 2.

All the light diffusers of each example showed good results of luminance, luminance unevenness (from front and oblique views), and color unevenness.

Evaluation results are shown in the following Table 2.

Example 18

After Lumiplus LPB-110 (manufactured by MITSUBISHI GAS CHEMICAL COMPANY, INC.) was applied on the press die described in example 3 by a thickness of 300 μm, the press original plate 1 was put on an application layer, and irradiated by the metal halide irradiator by 2 J/cm². The press original plate 1 with which an ultraviolet cured layer was closely contacted was detached from the die after the application layer was ultraviolet-cured, and luminance, luminance unevenness (from front and oblique views), and color unevenness of the backlight were measured similarly to example 1.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

An inclined angle θ of the substantially triangular pyramid convex portion of the light diffuser obtained in each example and comparative example was just as the following Table 3.

The light diffusers of the examples all showed good results of luminance, luminance unevenness (from front and oblique views), and color unevenness.

Evaluation results are shown in the following Table 3.

Examples 19 to 23 and Comparative Examples 7 and 8

The press die was changed, and press molding was performed using a press original plate 6 on a condition where a press plate temperature was 200° C. and a surface pressure was 100 kg/cm².

The other conditions were set to be similar to example 1 to fabricate a light diffuser, and luminance, luminance unevenness (from front and oblique views), and color unevenness of the backlight were measured similarly to example 1.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

An inclined angle θ of the substantially triangular pyramid convex portion of the light diffuser obtained in each example and comparative example was just as the following Table 3.

All the light diffusers of each example showed good results of luminance, luminance unevenness (from front and oblique views), and color unevenness.

Evaluation results are shown in the following Table 3.

Examples 24 to 26 and Comparative Examples 9 and 10

The press die was changed, and a press original plate 7 was used.

The other conditions were set to be similar to example 1 to fabricate a light diffuser, and luminance, luminance unevenness (from front and oblique views), and color unevenness of the backlight were measured similarly to example 1.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

An inclined angle θ of the substantially triangular pyramid convex portion of the light diffuser obtained in each example and comparative example was just as the following Table 3.

All the light diffusers of each example showed good results of luminance, luminance unevenness (from front and oblique views), and color unevenness.

Evaluation results are shown in the following Table 3.

Comparative Example 11

The press die was changed, and a press original plate 8 was used.

In addition, press molding was performed on a condition where a press plate temperature was 200° C. and a surface pressure was 100 kg/cm$^2$.

The other conditions were set to be similar to example 1 to fabricate a light diffuser, and luminance, luminance unevenness (from front and oblique views), and color unevenness of the backlight were measured similarly to example 1.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

An obtained inclined angle θ of the substantially triangular pyramid convex portion of the light diffuser was just as the following Table 3.

As evaluation results, luminance unevenness from front and oblique views was both large, and the object of the present application could not be achieved.

Detailed evaluation results are shown in the following Table 3.

Comparative Examples 12 to 20

The press die was changed.

The other conditions were set to be similar to example 1 to fabricate a light diffuser, and luminance, luminance unevenness (from front and oblique views), and color unevenness of the backlight were measured.

The obtained light diffuser had a mat shape in which a surface of a light entering surface side had a concave-convex shape with an average inclined angle of 10 degrees, and a surface of a light outgoing surface side had a periodically formed a substantially triangular pyramid frustum shape concave portion (comparative examples 12 to 14), had a substantially quadrangular pyramid frustum shape convex portion (comparative examples 15 to 17), or had a substantially triangular pyramid frustum shape concave portion (comparative examples 18 to 20).

The obtained evaluation results of the light diffuser are shown in the following Table 4.

Comparative Example 21

A light diffuser was fabricated similarly to the comparative example 20 to be attached to the LED backlight 1, two diffusion sheets, one prism sheet, and one luminance improving film were overlappingly placed on the light diffuser, and luminance, luminance unevenness (from front and oblique views) and color unevenness were measured.

Evaluation results are shown in the following Table 4.

Comparative Example 22

A light diffuser was fabricated similarly to the comparative example 20 to be attached to the LED backlight 1, three diffusion sheets, one prism sheet, and one luminance improving film were overlappingly placed on the light diffuser, and luminance, luminance unevenness (from front and oblique views) and color unevenness were measured.

Evaluation results are shown in the following Table 4.

Comparative Examples 27 to 42

The press die was changed.

The other conditions were set to be similar to example 1 to fabricate a light diffuser, and luminance, luminance unevenness (from front and oblique views), and color unevenness of the backlight were measured.

The obtained light diffuser had a mat shape in which a surface of a light entering surface side had a concave-convex shape with an average inclined angle of 10 degrees, and a surface of a light outgoing surface side had a periodically formed substantially equilateral triangular pyramid shape convex portion.

The obtained evaluation results of the light diffuser are shown in the following Table 5.

Comparative Examples 43 to 50

The press die was changed.

The other conditions were set to be similar to example 9 to fabricate a light diffuser, and luminance, luminance unevenness (from front and oblique views), and color unevenness of the backlight were measured.

The obtained light diffuser had a mat shape in which a surface of a light entering surface side had a concave-convex shape with an average inclined angle of 10 degrees, and a surface of a light outgoing surface side had a periodically formed substantially equilateral triangular pyramid shape convex portion.

The obtained evaluation results of the light diffuser are shown in the following Table 6.

Examples 51, 52, 53, 56, and 57

As press original plates, used were a press original plate 11 (example 51), a press original plate 12 (example 52), a press original plate 2 (example 53), a press original plate 3 (example 56), and a press original plate 4 (example 57).

The other conditions were set to be similar to example 3 to fabricate a light diffuser, and luminance, luminance unevenness (from front and oblique views), and color unevenness of the backlight were measured.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

The obtained evaluation results of the light diffuser are shown in the following Table 7.

Example 58

The press original plate 12 was used.

The other conditions were set to be similar to example 5 to fabricate a light diffuser, and luminance, luminance unevenness (from front and oblique views), and color unevenness of the backlight were measured.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

The obtained evaluation results of the light diffuser are shown in the following Table 7.

Example 59

A press original plate 14 was used.

The other conditions were set to be similar to example 19 to fabricate a light diffuser, and luminance, luminance unevenness (from front and oblique views), and color unevenness of the backlight were measured.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

The obtained evaluation results of the light diffuser are shown in the following Table 7.

Example 54

A light diffuser was fabricated similarly to example 53 to be attached to the LED backlight 1, one diffusion sheet, one prism sheet, and one luminance improving film were overlappingly placed on the light diffuser, and luminance, luminance unevenness (from front and oblique views) and color unevenness were measured.

Evaluation results are shown in the following Table 7.

Example 55

A light diffuser was fabricated similarly to example 53 to be attached to the LED backlight 1, two lens sheets and one luminance improving film were overlappingly placed on the light diffuser, and luminance, luminance unevenness (from front and oblique views) and color unevenness were measured.

Evaluation results are shown in the following Table 7.

Comparative Example 23

A press original plate 13 was used.

The press die was changed, and a light diffuser was fabricated similarly to example 1 other than having made the surface of the light entering surface side into a smooth surface.

Luminance, luminance unevenness (from front and oblique views), and color unevenness of the backlight were measured.

The obtained light diffuser had a light entering surface side whose surface was a smooth surface with an average inclined angle of 0 degree, had a surface of a light outgoing surface side having a periodically formed substantially triangular pyramid shape convex portion (corner cube (triangular pyramid) shape), and had retroreflection characteristics.

The light diffuser resulted in having drastically lower luminance and inferior luminance uniformity (from both front and oblique views).

Evaluation results are shown in the following Table 7.

Example 60

A press original plate 9 was used, and the same press die as in example 3 was used.

The other conditions were set to be similar to example 1 to fabricate a light diffuser, and luminance, luminance unevenness (from front and oblique views), and color unevenness of the backlight were measured.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

The obtained evaluation results of the light diffuser are shown in the following Table 8.

Example 61

A press original plate 10 was made to be held between a press die shaped as a predetermined shape to be put in a pressing machine, and pressed for 30 minutes on a condition where a press plate temperature was 180° C. and a surface pressure was 100 kg/cm², and subsequently, the press die having the press original plate 1 held therebetween was transferred to the pressing machine cooled with water, and cooled for ten minutes.

After cooled, an (a) lens layer with a thickness of 0.3 mm shaped as the predetermined shape was taken out from the press die.

The press original plate 1 was laminated under the (a) lens layer as the (b) diffusion layer to form a separation layer configuration type of light diffuser.

The obtained light diffuser had a mat shape in which a surface of a light entering surface side had a concave-convex shape with an average inclined angle of 10 degrees, and a surface of a light outgoing surface side had a periodically formed substantially triangular pyramid shape convex portion (equilateral triangular pyramid frustum shape) (Refer to FIG. 21.).

Luminance, luminance unevenness (from front and oblique views), and color unevenness were measured similarly to example 1.

The obtained evaluation results of the light diffuser are shown in the following Table 8.

Example 62

An (a) lens layer is fabricated similarly to example 61, and a press original plate is laminated on the (a) lens layer as a (b) diffusion layer to form a separation layer configuration type of light diffuser.

Luminance, luminance unevenness (from front and oblique views), and color unevenness of the backlight were measured similarly to example 61.

The obtained evaluation results of the light diffuser are shown in the following Table 8.

Examples 63 to 66

A light diffuser was fabricated similarly to example 3, and LED backlights 2, 3, 4, and 5 were used, respectively.

The other conditions were set to be similar to example 3, and luminance, luminance unevenness (from front and oblique views), and color unevenness of the backlight were measured.

The obtained evaluation results of the light diffuser are shown in the following Table 9.

Example 67

As shown in FIG. 22, a hundred and four white LEDs were mounted on an LED board (PCB) in a staggered arrangement of an LED interval n1: 55.8 mm and n2: 32.2 mm (n1/n2=0.58 (Refer to FIG. 14.)), and an LED light source backlight evaluator with a screen size of 320×320 mm was fabricated. At this time, the average LED interval P was 30 mm.

Next, on the LED board (PCB) having the LED mounted thereon, applied was Lumirror E6SL (manufactured by TORAY INDUSTRIES, INC.) whose diffuse reflectance is 95% as a reflection sheet with a double-sided tape, and a distance h between the reflection sheet and an uppermost portion of the LED was kept to be 1.9 mm (Refer to FIG. 8.). Subsequently, a light reflection plate was fixed above the reflection sheet so that an average distance H between an uppermost portion of the LED and a light diffuser might be 20 mm, two diffusion sheets were disposed above the light diffuser, and one luminance improving sheet was disposed further above the light diffuser. The light diffuser was fabricated similarly to example 3, and attached to an LED backlight so that an F value (an angle between one side of a triangular bottom surface of a triangular pyramid shape convex portion shaped on a surface of the light diffuser and a lattice of point light sources) might be an angle indicating −5 degrees. Moreover, a current of 20 mA was made to flow in one LED to turn on the backlight.

Subsequently, when the average distance H between the uppermost portion of the LED and the light diffuser was shortened by 1 mm to obtain a minimum distance at which luminance unevenness and color unevenness from front and oblique views were very good, the obtained minimum distance was 18 mm.

Detailed results are shown in FIG. 7.

It is to be noted that measurement of luminance unevenness was performed after aging of the backlight was performed for an hour after the LED was turned on.

The obtained evaluation results of the light diffuser are shown in the following Table 10.

Examples 68 to 77

An angle between LED arrangement of a backlight and a convex triangular pyramid shape of a light diffuser: An F value was changed, and an average distance H between an uppermost portion of the LED and the light diffuser was shortened by 1 mm as in example 67 to obtain a minimum distance at which luminance unevenness and color unevenness from front and oblique views were very good.

When the F value was −2, 0, and 2 degrees, H=16 mm, i.e., luminance unevenness and color unevenness from front and oblique views were very good, and thus excellent results could be obtained.

In addition, when the F value was 28, 30, and 32 degrees, significantly excellent results could be obtained in which H=14 mm, i.e., luminance unevenness and color unevenness from front and oblique views were very good.

Meanwhile, when the F value was 5, 15, 25, and 35 degrees, a minimum distance was 18 mm when luminance unevenness and color unevenness from front and oblique views were very good.

The obtained evaluation results of the light diffuser are shown in the following Table 10.

Examples 78 to 80

A light diffuser was fabricated similarly to example 3 other than having changed a press die, the light diffuser was attached to a backlight similarly to example 69, and an average distance H between an uppermost portion of an LED and the light diffuser was shortened by 1 mm to obtain a minimum distance at which luminance unevenness and color unevenness from front and oblique views were very good.

The obtained evaluation results of the light diffuser are shown in the following Table 10.

Example 81

An H (distance from light sources to a light diffuser) of the LED backlight 1 was changed to 15 mm.

The other conditions were set to be similar to example 3 to fabricate a light diffuser, and luminance, luminance unevenness (from front and oblique views), and color unevenness of the backlight were measured.

The obtained evaluation results of the light diffuser are shown in the following Table 11.

Example 82

An H (distance from light sources to a light diffuser) of the LED backlight 1 was changed to 15 mm.

In addition, an LED type was changed to an LED-2.

The other conditions were set to be similar to example 3 to fabricate a light diffuser, and luminance, luminance unevenness (from front and oblique views), and color unevenness of the backlight were measured.

The obtained evaluation results of the light diffuser are shown in the following Table 11.

Example 83

An H (distance from light sources to a light diffuser) of the LED backlight 1 was changed to 15 mm.

In addition, an LED type was changed to an LED-3.

The other conditions were set to be similar to example 3 to fabricate a light diffuser, and luminance, luminance unevenness (from front and oblique views), and color unevenness of the backlight were measured.

The obtained evaluation results of the light diffuser are shown in the following Table 11.

TABLE 1

| | Light diffuser characteristics | | | | | | | | | | | |
|---|---|---|---|---|---|---|---|---|---|---|---|---|
| | Shaped outgoing surface shape | | | | | | Entrance surface | Reflectance | Total light transmittance | | Diffusion rate | |
| | Convex-concave portion shape | θ Degree | A | b μm | c μm | d μm | g μm | U Degree | R % | T % | Tb % | S % | Layer configuration* |
| Comparative example 1 | Substantially convex triangular pyramid | 65 | 1.59 | 89 | 1 | 10 | 1 | 10 | 33 | 85 | 93 | 12 | *1 |
| Comparative example 2 | Substantially convex triangular pyramid | 63 | 1.59 | 89 | 1 | 10 | 1 | 10 | 37 | 85 | 93 | 12 | *1 |
| Example 1 | Substantially convex triangular pyramid | 62 | 1.59 | 89 | 1 | 10 | 1 | 10 | 46 | 84 | 93 | 12 | *1 |
| Example 2 | Substantially convex triangular pyramid | 60 | 1.59 | 89 | 1 | 10 | 1 | 10 | 58 | 85 | 93 | 12 | *1 |
| Example 3 | Substantially convex triangular pyramid | 57 | 1.59 | 89 | 1 | 10 | 1 | 10 | 65 | 86 | 93 | 12 | *1 |
| Example 4 | Substantially convex triangular pyramid | 55.5 | 1.59 | 89 | 1 | 10 | 1 | 10 | 59 | 86 | 93 | 12 | *1 |
| Example 5 | Substantially convex triangular pyramid | 55 | 1.59 | 89 | 1 | 10 | 1 | 10 | 46 | 86 | 93 | 12 | *1 |
| Example 6 | Substantially convex triangular pyramid | 54.5 | 1.59 | 89 | 1 | 10 | 1 | 10 | 54 | 86 | 93 | 12 | *1 |
| Example 7 | Substantially convex triangular pyramid | 53 | 1.59 | 89 | 1 | 10 | 1 | 10 | 53 | 85 | 93 | 12 | *1 |
| Example 8 | Substantially convex triangular pyramid | 52 | 1.59 | 89 | 1 | 10 | 1 | 10 | 48 | 88 | 93 | 12 | *1 |
| Comparative example 3 | Substantially convex triangular pyramid | 50 | 1.59 | 89 | 1 | 10 | 1 | 10 | 42 | 88 | 93 | 12 | *1 |
| Comparative example 4 | Substantially convex triangular pyramid | 45 | 1.59 | 89 | 1 | 10 | 1 | 10 | 35 | 87 | 93 | 12 | *1 |

| | Backlight characteristics | | | | | | | | | |
|---|---|---|---|---|---|---|---|---|---|---|
| | BLU specification | | | Optical | | | | | Maximum color difference of | |
| | P mm | H mm | P/H | Film disposal* | Luminance cd/cm$^2$ | Luminance unevenness value | | | color unevenness | |
| | | | | | | Front | | Oblique view | | |
| Comparative example 1 | 30 | 16 | 1.88 | #1 | 5350 | 0.0158 | Poor | 0.0172 | Poor | 0.0057 | Poor |
| Comparative example 2 | 30 | 16 | 1.88 | #1 | 5340 | 0.0108 | Poor | 0.0124 | Poor | 0.0055 | Poor |
| Example 1 | 30 | 16 | 1.88 | #1 | 5340 | 0.0044 | Good | 0.0048 | Good | 0.0045 | Good |
| Example 2 | 30 | 16 | 1.88 | #1 | 5320 | 0.0020 | Very good | 0.0022 | Very good | 0.0031 | Very good |
| Example 3 | 30 | 16 | 1.88 | #1 | 5330 | 0.0017 | Very good | 0.0020 | Very good | 0.0029 | Very good |
| Example 4 | 30 | 16 | 1.88 | #1 | 5300 | 0.0018 | Very good | 0.0021 | Very good | 0.0031 | Very good |
| Example 5 | 30 | 16 | 1.88 | #1 | 5010 | 0.0042 | Good | 0.0045 | Good | 0.0047 | Good |
| Example 6 | 30 | 16 | 1.88 | #1 | 5310 | 0.0023 | Very good | 0.0036 | Good | 0.0040 | Good |
| Example 7 | 30 | 16 | 1.88 | #1 | 5300 | 0.0025 | Very good | 0.0037 | Good | 0.0042 | Good |
| Example 8 | 30 | 16 | 1.88 | #1 | 5340 | 0.0036 | Good | 0.0042 | Good | 0.0040 | Good |
| Comparative example 3 | 30 | 16 | 1.88 | #1 | 5350 | 0.0038 | Good | 0.0071 | Poor | 0.0052 | Poor |
| Comparative example 4 | 30 | 16 | 1.88 | #1 | 5330 | 0.0114 | Poor | 0.0112 | Poor | 0.0054 | Poor |

In Table 1, "#1" shown in "optical Film disposal *" means a configuration of a light diffuser/a diffusion sheet/a diffusion sheet/a luminance improving film.

The diffusion sheet is BS-912 (manufactured by KEIWA Inc.).

The luminance improving film is DBEF-D400 (manufactured by Sumitomo 3M Limited).

In Table 1, "*1" shown in "layer configuration *" means a single layer.

TABLE 2

| | | Light diffuser characteristics | | | | | | | | | | |
|---|---|---|---|---|---|---|---|---|---|---|---|---|
| | | Shaped outgoing surface shape | | | | | | Entrance surface | Reflectance | Total light transmittance | | Diffusion rate | |
| | Convex-concave portion shape | θ Degree | A | b mm | c mm | d mm | g mm | U Degree | R % | T % | Tb % | S % | Layer configuration* |
| Comparative example 5 | Substantially convex triangular pyramid | 65 | 1.63 | 89 | 1 | 10 | 1 | 10 | 36 | 86 | 93 | 12 | *1 |
| Example 9 | Substantially convex triangular pyramid | 63 | 1.63 | 89 | 1 | 10 | 1 | 10 | 45 | 86 | 93 | 12 | *1 |
| Example 10 | Substantially convex triangular pyramid | 61 | 1.63 | 89 | 1 | 10 | 1 | 10 | 58 | 85 | 93 | 12 | *1 |
| Example 11 | Substantially convex triangular pyramid | 60 | 1.63 | 89 | 1 | 10 | 1 | 10 | 59 | 86 | 93 | 12 | *1 |
| Example 12 | Substantially convex triangular pyramid | 57 | 1.63 | 89 | 1 | 10 | 1 | 10 | 66 | 85 | 93 | 12 | *1 |
| Example 13 | Substantially convex triangular pyramid | 55.5 | 1.63 | 89 | 1 | 10 | 1 | 10 | 61 | 85 | 93 | 12 | *1 |
| Example 14 | Substantially convex triangular pyramid | 55 | 1.63 | 89 | 1 | 10 | 1 | 10 | 45 | 85 | 93 | 12 | *1 |
| Example 15 | Substantially convex triangular pyramid | 54.5 | 1.63 | 89 | 1 | 10 | 1 | 10 | 54 | 85 | 93 | 12 | *1 |
| Example 16 | Substantially convex triangular pyramid | 51 | 1.63 | 89 | 1 | 10 | 1 | 10 | 51 | 86 | 93 | 12 | *1 |
| Example 17 | Substantially convex triangular pyramid | 50 | 1.63 | 89 | 1 | 10 | 1 | 10 | 47 | 87 | 93 | 12 | *1 |
| Comparative example 6 | Substantially convex triangular pyramid | 48 | 1.63 | 89 | 1 | 10 | 1 | 10 | 38 | 86 | 93 | 12 | *1 |

| | BLU specification | | | Optical Film disposal* | Backlight characteristics | | | | | |
|---|---|---|---|---|---|---|---|---|---|---|
| | P mm | H mm | P/H | | Luminance cd/cm² | Luminance unevenness value | | | Maximum color difference of color unevenness | |
| | | | | | | Front | | Oblique view | | |
| Comparative example 5 | 30 | 16 | 1.88 | #1 | 5340 | 0.0144 | Poor | 0.0152 | Poor | 0.0056 | Poor |
| Example 9 | 30 | 16 | 1.88 | #1 | 5340 | 0.0047 | Good | 0.0049 | Good | 0.0046 | Good |
| Example 10 | 30 | 16 | 1.88 | #1 | 5330 | 0.0024 | Very good | 0.0027 | Very good | 0.0033 | Very good |
| Example 11 | 30 | 16 | 1.88 | #1 | 5340 | 0.0017 | Very good | 0.0021 | Very good | 0.0028 | Very good |
| Example 12 | 30 | 16 | 1.88 | #1 | 5330 | 0.0016 | Very good | 0.0020 | Very good | 0.0028 | Very good |
| Example 13 | 30 | 16 | 1.88 | #1 | 5310 | 0.0018 | Very good | 0.0021 | Very good | 0.0032 | Very good |
| Example 14 | 30 | 16 | 1.88 | #1 | 5000 | 0.0039 | Good | 0.0043 | Good | 0.0045 | Good |
| Example 15 | 30 | 16 | 1.88 | #1 | 5320 | 0.0023 | Very good | 0.0037 | Good | 0.0043 | Good |
| Example 16 | 30 | 16 | 1.88 | #1 | 5300 | 0.0024 | Very good | 0.0040 | Good | 0.0044 | Good |
| Example 17 | 30 | 16 | 1.88 | #1 | 5320 | 0.0039 | Good | 0.0049 | Good | 0.0045 | Good |
| Comparative example 6 | 30 | 16 | 1.88 | #1 | 5330 | 0.0048 | Good | 0.0109 | Poor | 0.0053 | Poor |

In Table 2, "#1" shown in "optical Film disposal *" means a configuration of a light diffuser/a diffusion sheet/a diffusion sheet/a luminance improving film.

The diffusion sheet is BS-912 (manufactured by KEIWA Inc.).

It is defined that the luminance improving film is DBEF-D400 (manufactured by Sumitomo 3M Limited).

In Table 2, "*1" shown in "layer configuration *" means a single layer.

TABLE 3

| | | Light diffuser characteristics | | | | | | | | | | |
|---|---|---|---|---|---|---|---|---|---|---|---|---|
| | | Shaped outgoing surface shape | | | | | | Entrance surface | Reflectance | Total light transmittance | | Diffusion rate | |
| | Convex-concave portion shape | θ Degree | A | b mm | c mm | d mm | g mm | U Degree | R % | T % | Tb % | S % | Layer configuration* |
| Example 18 | Substantially convex triangular pyramid | 57 | 1.71 | 89 | 1 | 10 | 1 | 10 | 68 | 87 | 93 | 12 | *1 |
| Comparative example 7 | Substantially convex triangular pyramid | 62 | 1.53 | 89 | 1 | 10 | 1 | 10 | 35 | 85 | 93 | 12 | *1 |
| Example 19 | Substantially convex triangular pyramid | 60 | 1.53 | 89 | 1 | 10 | I | 10 | 45 | 85 | 93 | 12 | *1 |
| Example 20 | Substantially convex triangular pyramid | 17 | 1.53 | 89 | 1 | 10 | 1 | 10 | 56 | 86 | 93 | 12 | *1 |
| Example 21 | Substantially convex triangular pyramid | 55.5 | 1.53 | 89 | 1 | 10 | 1 | 10 | 55 | 85 | 93 | 12 | *1 |
| Example 22 | Substantially convex triangular pyramid | 55 | 1.53 | 89 | 1 | 10 | 1 | 10 | 45 | 85 | 93 | 12 | *1 |
| Example 23 | Substantially convex triangular pyramid | 54 | 1.53 | 89 | 1 | 10 | 1 | 10 | 46 | 85 | 93 | 12 | *1 |
| Comparative example 8 | Substantially convex triangular pyramid | 52 | 1.53 | 89 | 1 | 10 | 1 | 10 | 39 | 86 | 93 | 12 | *1 |
| Comparative example 9 | Substantially convex triangular pyramid | 60 | 1.49 | 89 | 1 | 10 | 1 | 10 | 37 | 85 | 93 | 12 | *1 |
| Example 24 | Substantially convex triangular pyramid | 58 | 1.49 | 89 | 1 | 10 | 1 | 10 | 47 | 85 | 93 | 12 | *1 |
| Example 25 | Substantially convex triangular pyramid | 57 | 1.49 | 89 | 1 | 10 | 1 | 10 | 55 | 85 | 93 | 12 | *1 |
| Example 26 | Substantially convex triangular pyramid | 56 | 1.49 | 89 | 1 | 10 | 1 | 10 | 45 | 85 | 93 | 12 | *1 |
| Comparative example 10 | Substantially convex triangular pyramid | 55 | 1.49 | 89 | 1 | 16 | 1 | 10 | 36 | 85 | 93 | 12 | *1 |
| Comparative example 11 | Substantially convex triangular pyramid | 57 | 1.42 | 89 | 1 | 10 | 1 | 10 | 38 | 85 | 93 | 12 | *1 |

| | Backlight characteristics | | | | | | | |
|---|---|---|---|---|---|---|---|---|
| | BLU specification | | | Optical Film disposal* | Luminance cd/cm² | Luminance unevenness value | | Maximum color difference of color unevenness |
| | P mm | H mm | P/H | | | Front | Oblique view | |
| Example 18 | 30 | 16 | 1.88 | #1 | 5470 | 0.0016 Very good | 0.0020 Very good | 0.0028 Very good |
| Comparative example 7 | 30 | 16 | 1.88 | #1 | 5240 | 0.0101 Poor | 0.0121 Poor | 0.0055 Poor |
| Example 19 | 30 | 16 | 1.88 | #1 | 5250 | 0.0046 Good | 0.0048 Good | 0.0044 Good |
| Example 20 | 30 | 16 | 1.88 | #1 | 5240 | 0.0028 Very good | 0.0033 Very good | 0.0038 Good |
| Example 21 | 30 | 16 | 1.88 | #1 | 5240 | 0.0033 Very good | 0.0035 Very good | 0.0042 Good |
| Example 22 | 30 | 16 | 1.88 | #1 | 4920 | 0.0041 Good | 0.0045 Good | 0.0048 Good |
| Example 23 | 30 | 16 | 1.88 | #1 | 5230 | 0.0042 Good | 0.0048 Good | 0.0043 Good |
| Comparative example 8 | 30 | 16 | 1.88 | #1 | 5230 | 0.0047 Good | 0.0082 Poor | 0.0052 Poor |
| Comparative example 9 | 30 | 16 | 1.88 | #1 | 5050 | 0.0063 Poor | 0.0071 Poor | 0.0052 Poor |
| Example 24 | 30 | 16 | 1.88 | #1 | 5060 | 0.0040 Good | 0.0046 Good | 0.0047 Good |
| Example 25 | 30 | 16 | 1.88 | #1 | 5070 | 0.0033 Very good | 0.0034 Very good | 0.0043 Good |
| Example 26 | 30 | 16 | 1.88 | #1 | 5040 | 0.0044 Good | 0.0047 Good | 0.0049 Good |
| Comparative example 10 | 30 | 16 | 1.88 | #1 | 4730 | 0.0059 Poor | 0.0063 Poor | 0.0057 Poor |
| Comparative example 11 | 30 | 16 | 1.88 | #1 | 4900 | 0.0061 Poor | 0.0066 Poor | 0.0052 Poor |

In Table 3, "#1" shown in "optical Film disposal *" means a configuration of a light diffuser/a diffusion sheet/a diffusion sheet/a luminance improving film.

The diffusion sheet is BS-912 (manufactured by KEIWA Inc.).

It is defined that the luminance improving film is DBEF-D400 (manufactured by Sumitomo 3M Limited).

In Table 3, "*1" shown in "layer configuration *" means a single layer.

TABLE 4

| | Light diffuser characteristics | | | | | | | | | | |
|---|---|---|---|---|---|---|---|---|---|---|---|
| | Shaped outgoing surface shape | | | | | | Entrance surface | Reflectance | Transmittance | Diffusion rate | |
| | Convex-concave portion shape | θ Degree | A | b μm | c μm | d μm | g μm | U Degree | R % | Tb % | S % | Layer configuration |
| Comparative example 12 | Substantially concave triangular pyramid | 60 | 1.59 | 89 | 1 | 10 | 1 | 10 | 26 | 93 | 12 | *1 |
| Comparative example 13 | Substantially concave triangular pyramid | 55 | 1.59 | 89 | 1 | 10 | 1 | 10 | 32 | 93 | 12 | *1 |
| Comparative example 14 | Substantially concave triangular pyramid | 50 | 1.59 | 89 | 1 | 10 | 1 | 10 | 38 | 93 | 12 | *1 |
| Comparative example 15 | Substantially convex quadrangular pyramid | 60 | 1.59 | 89 | 1 | 10 | 1 | 10 | 29 | 93 | 12 | *1 |
| Comparative example 16 | Substantially convex quadrangular pyramid | 55 | 1.59 | 89 | 1 | 10 | 1 | 10 | 38 | 93 | 12 | *1 |
| Comparative example 17 | Substantially convex quadrangular pyramid | 50 | 1.59 | 89 | 1 | 10 | 1 | 10 | 39 | 93 | 12 | *1 |
| Comparative example 18 | Substantially concave quadrangular pyramid | 60 | 1.59 | 89 | 1 | 10 | 1 | 10 | 27 | 93 | 12 | *1 |
| Comparative example 19 | Substantially concave quadrangular pyramid | 55 | 1.59 | 89 | 1 | 10 | 1 | 10 | 33 | 93 | 12 | *1 |
| Comparative example 20 | Substantially concave quadrangular pyramid | 50 | 1.59 | 89 | 1 | 10 | 1 | 10 | 39 | 93 | 12 | *1 |
| Comparative example 21 | Substantially concave quadrangular pyramid | 50 | 1.59 | 89 | 1 | 10 | 1 | 10 | 39 | 93 | 12 | *1 |
| Comparative example 22 | Substantially concave quadrangular pyramid | 50 | 1.59 | 89 | 1 | 10 | 1 | 10 | 39 | 93 | 12 | *1 |

| | BLU specification | | | Optical Film disposal* | Backlight characteristics | | | | | |
|---|---|---|---|---|---|---|---|---|---|---|
| | P mm | H mm | P/H | | Luminance cd/cm$^2$ | Luminance unevenness value | | | | Maximum color difference of color unevenness |
| | | | | | | Front | | Oblique view | | |
| Comparative example 12 | 30 | 16 | 1.88 | #1 | 5290 | 0.0229 | Poor | 0.0251 | Poor | 0.0061 | Poor |
| Comparative example 13 | 30 | 16 | 1.88 | #1 | 5320 | 0.0177 | Poor | 0.0198 | Poor | 0.0059 | Poor |
| Comparative example 14 | 30 | 16 | 1.88 | #1 | 5310 | 0.0171 | Poor | 0.0197 | Poor | 0.0060 | Poor |
| Comparative example 15 | 30 | 16 | 1.88 | #1 | 5330 | 0.0158 | Poor | 0.0211 | Poor | 0.0059 | Poor |
| Comparative example 16 | 30 | 16 | 1.88 | #1 | 5320 | 0.0091 | Poor | 0.0145 | Poor | 0.0057 | Poor |
| Comparative example 17 | 30 | 16 | 1.88 | #1 | 5320 | 0.0103 | Poor | 0.0114 | Poor | 0.0055 | Poor |
| Comparative example 18 | 30 | 16 | 1.88 | #1 | 5320 | 0.0215 | Poor | 0.0241 | Poor | 0.0059 | Poor |
| Comparative example 19 | 30 | 16 | 1.88 | #1 | 5330 | 0.0179 | Poor | 0.0182 | Poor | 0.0058 | Poor |
| Comparative example 20 | 30 | 16 | 1.88 | #1 | 5430 | 0.0175 | Poor | 0.0185 | Poor | 0.0058 | Poor |
| Comparative example 21 | 30 | 16 | 1.88 | #2 | 5010 | 0.0047 | Good | 0.0055 | Poor | 0.0052 | Poor |
| Comparative example 22 | 30 | 16 | 1.88 | #3 | 4650 | 0.0028 | Very good | 0.0036 | Good | 0.0040 | Good |

In Table 4, "#2" shown in "optical Film disposal *" means a configuration of a light diffuser/a diffusion sheet/a diffusion sheet/a prism sheet/a luminance improving film.

In Table 4, "#3" shown in "optical Film disposal *" means a configuration of a light diffuser/a diffusion sheet/a diffusion sheet/a diffusion sheet/a prism sheet/a luminance improving film.

The diffusion sheet is BS-912 (manufactured by KEIWA Inc.).

The prism sheet is BEFIII (manufactured by Sumitomo 3M Limited).

The luminance improving film is DBEF-D400 (manufactured by Sumitomo 3M Limited).

In Table 4, "*1" shown in "layer configuration *" means a single layer.

TABLE 5

| | | Light diffuser characteristics | | | | | | | | | | | |
|---|---|---|---|---|---|---|---|---|---|---|---|---|---|
| | | Shaped outgoing surface shape | | | | | | Entrance surface | Reflectance | Total light transmittance | | Diffusion rate | |
| | Convex-concave portion shape | θ Degree | A | b μm | c μm | d μm | g μm | U Degree | R % | T % | Tb % | S % | Layer configuration |
| Example 27 | Substantially convex triangular pyramid | 57 | 1.59 | 90 | 0 | 10 | 0 | 10 | 69 | 86 | 93 | 12 | *1 |
| Example 3 | Substantially convex triangular pyramid | 57 | 1.59 | 89 | 1 | 10 | 1 | 10 | 65 | 86 | 93 | 12 | *1 |
| Example 28 | Substantially convex triangular pyramid | 57 | 1.59 | 84 | 6 | 10 | 1 | 10 | 60 | 86 | 93 | 12 | *1 |
| Example 29 | Substantially convex triangular pyramid | 57 | 1.59 | 84 | 6 | 10 | 10 | 10 | 56 | 86 | 93 | 12 | *1 |
| Example 30 | Substantially convex triangular pyramid | 57 | 1.59 | 77 | 13 | 10 | 10 | 10 | 54 | 86 | 93 | 12 | *1 |
| Example 31 | Substantially convex triangular pyramid | 57 | 1.59 | 77 | 13 | 10 | 20 | 10 | 51 | 86 | 93 | 12 | *1 |
| Example 32 | Substantially convex triangular pyramid | 57 | 1.59 | 70 | 20 | 10 | 20 | 10 | 48 | 86 | 93 | 12 | *1 |
| Example 33 | Substantially convex triangular pyramid | 57 | 1.59 | 70 | 20 | 10 | 30 | 10 | 46 | 86 | 93 | 12 | *1 |
| Example 34 | Substantially convex triangular pyramid | 57 | 1.59 | 50 | 20 | 30 | 30 | 10 | 45 | 86 | 93 | 12 | *1 |
| Example 35 | Substantially convex triangular pyramid | 55.5 | 1.59 | 90 | 0 | 10 | 0 | 10 | 68 | 86 | 93 | 12 | *1 |
| Example 4 | Substantially convex triangular pyramid | 55.5 | 1.59 | 89 | 1 | 10 | 1 | 10 | 59 | 86 | 93 | 12 | *1 |
| Example 36 | Substantially convex triangular pyramid | 55.5 | 1.59 | 84 | 6 | 10 | 1 | 10 | 57 | 86 | 93 | 12 | *1 |
| Example 37 | Substantially convex triangular pyramid | 55.5 | 1.59 | 84 | 6 | 10 | 10 | 10 | 55 | 86 | 93 | 12 | *1 |
| Example 38 | Substantially convex triangular pyramid | 55.5 | 1.59 | 77 | 13 | 10 | 10 | 10 | 53 | 86 | 93 | 12 | *1 |
| Example 39 | Substantially convex triangular pyramid | 55.5 | 1.59 | 77 | 13 | 10 | 20 | 10 | 50 | 86 | 93 | 12 | *1 |
| Example 40 | Substantially convex triangular pyramid | 55.5 | 1.59 | 70 | 20 | 10 | 20 | 10 | 47 | 86 | 93 | 12 | *1 |
| Example 41 | Substantially convex triangular pyramid | 55.5 | 1.59 | 70 | 20 | 10 | 30 | 10 | 46 | 86 | 93 | 12 | *1 |
| Example 42 | Substantially convex triangular pyramid | 55.5 | 1.59 | 50 | 20 | 30 | 30 | 10 | 45 | 86 | 93 | 12 | *1 |

| | BLU specification | | | Optical Film disposal* | Backlight characteristics | | | | | Maximum color difference of color unevenness | |
|---|---|---|---|---|---|---|---|---|---|---|---|
| | P mm | H mm | P/H | | Luminance cd/cm² | Luminance unevenness value | | | | | |
| | | | | | | Front | | Oblique view | | | |
| Example 27 | 30 | 16 | 1.88 | #1 | 5010 | 0.0020 | Very good | 0.0023 | Very good | 0.0031 | Very good |
| Example 3 | 30 | 16 | 1.88 | #1 | 5330 | 0.0017 | Very good | 0.0020 | Very good | 0.0029 | Very good |
| Example 28 | 30 | 16 | 1.88 | #1 | 5280 | 0.0020 | Very good | 0.0023 | Very good | 0.0033 | Very good |
| Example 29 | 30 | 16 | 1.88 | #1 | 5310 | 0.0027 | Very good | 0.0033 | Very good | 0.0034 | Very good |
| Example 30 | 30 | 16 | 1.88 | #1 | 5290 | 0.0031 | Very good | 0.0038 | Good | 0.0041 | Good |
| Example 31 | 30 | 16 | 1.88 | #1 | 5290 | 0.0035 | Very good | 0.0041 | Good | 0.0044 | Good |
| Example 32 | 30 | 16 | 1.88 | #1 | 5320 | 0.0040 | Good | 0.0043 | Good | 0.0046 | Good |
| Example 33 | 30 | 16 | 1.88 | #1 | 5320 | 0.0044 | Good | 0.0046 | Good | 0.0048 | Good |
| Example 34 | 30 | 16 | 1.88 | #1 | 5310 | 0.0046 | Good | 0.0048 | Good | 0.0049 | Good |
| Example 35 | 30 | 16 | 1.88 | #1 | 4980 | 0.0021 | Very good | 0.0023 | Very good | 0.0033 | Very good |
| Example 4 | 30 | 16 | 1.88 | #1 | 5300 | 0.0018 | Very good | 0.0021 | Very good | 0.0031 | Very good |
| Example 36 | 30 | 16 | 1.88 | #1 | 5310 | 0.0020 | Very good | 0.0021 | Very good | 0.0032 | Very good |
| Example 37 | 30 | 16 | 1.88 | #1 | 5330 | 0.0029 | Very good | 0.0033 | Very good | 0.0036 | Very good |

TABLE 5-continued

|  | | | | | | | | | | |
|---|---|---|---|---|---|---|---|---|---|---|
| Example 38 | 30 | 16 | 1.88 | #1 | 5310 | 0.0033 | Very good | 0.0037 | Good | 0.0042 | Good |
| Example 39 | 30 | 16 | 1.88 | #1 | 5320 | 0.0034 | Very good | 0.0040 | Good | 0.0044 | Good |
| Example 40 | 30 | 16 | 1.88 | #1 | 5340 | 0.0041 | Good | 0.0045 | Good | 0.0045 | Good |
| Example 41 | 30 | 16 | 1.88 | #1 | 5330 | 0.0045 | Good | 0.0048 | Good | 0.0047 | Good |
| Example 42 | 30 | 16 | 1.88 | #1 | 5340 | 0.0047 | Good | 0.0049 | Good | 0.0048 | Good |

In Table 5, "#1" shown in "optical Film disposal *" means a configuration of a light diffuser/a diffusion sheet/a diffusion sheet/a luminance improving film.

The diffusion sheet is BS-912 (manufactured by KEIWA Inc.), and the luminance improving film is DBEF-D400 (manufactured by Sumitomo 3M Limited).

In Table 5, "*1" shown in "layer configuration" means a single layer.

TABLE 6

| | Light diffuser characteristics | | | | | | | | | | |
|---|---|---|---|---|---|---|---|---|---|---|---|
| | Shaped outgoing surface shape | | | | | | Entrance surface | Reflectance | Total light transmittance | | Diffusion rate | |
| | Convex-concave portion shape | θ Degree | A | b μm | c μm | d μm | g μm | U Degree | R % | T % | Tb % | S % | Layer configuration |
| Example 43 | Substantially convex triangular pyramid | 57 | 1.63 | 90 | 0 | 10 | 0 | 10 | 70 | 86 | 93 | 12 | *1 |
| Example 12 | Substantially convex triangular pyramid | 57 | 1.63 | 89 | 1 | 10 | 1 | 10 | 66 | 85 | 93 | 12 | *1 |
| Example 44 | Substantially convex triangular pyramid | 57 | 1.63 | 84 | 6 | 10 | 1 | 10 | 62 | 86 | 93 | 12 | *1 |
| Example 45 | Substantially convex triangular pyramid | 57 | 1.63 | 84 | 6 | 10 | 10 | 10 | 59 | 86 | 93 | 12 | *1 |
| Example 46 | Substantially convex triangular pyramid | 57 | 1.63 | 77 | 13 | 10 | 10 | 10 | 54 | 86 | 93 | 12 | *1 |
| Example 47 | Substantially convex triangular pyramid | 57 | 1.63 | 77 | 13 | 10 | 20 | 10 | 53 | 86 | 93 | 12 | *1 |
| Example 48 | Substantially convex triangular pyramid | 57 | 1.63 | 70 | 20 | 10 | 20 | 10 | 49 | 86 | 93 | 12 | *1 |
| Example 49 | Substantially convex triangular pyramid | 57 | 1.63 | 70 | 20 | 10 | 30 | 10 | 48 | 86 | 93 | 12 | *1 |
| Example 50 | Substantially convex triangular pyramid | 57 | 1.63 | 50 | 20 | 30 | 30 | 10 | 46 | 86 | 93 | 12 | *1 |

| | Backlight characteristics | | | | | | | |
|---|---|---|---|---|---|---|---|---|
| | BLU specification | | | Optical Film disposal* | Luminance cd/cm² | Luminance unevenness value | | Maximum color difference of color unevenness |
| | P mm | H mm | P/H | | | Front | Oblique view | |
| Example 43 | 30 | 16 | 1.88 | #1 | 5020 | 0.0019 Very good | 0.0024 Very good | 0.0033 Very good |
| Example 12 | 30 | 16 | 1.88 | #1 | 5330 | 0.0016 Very good | 0.0020 Very good | 0.0028 Very good |
| Example 44 | 30 | 16 | 1.88 | #1 | 5330 | 0.0020 Very good | 0.0021 Very good | 0.0032 Very good |
| Example 45 | 30 | 16 | 1.88 | #1 | 5320 | 0.0023 Very good | 0.0024 Very good | 0.0034 Very good |
| Example 46 | 30 | 16 | 1.88 | #1 | 5340 | 0.0029 Very good | 0.0036 Good | 0.0039 Good |
| Example 47 | 30 | 16 | 1.88 | #1 | 5350 | 0.0033 Very good | 0.0039 Good | 0.0043 Good |
| Example 48 | 30 | 16 | 1.88 | #1 | 5340 | 0.0041 Good | 0.0044 Good | 0.0045 Good |
| Example 49 | 30 | 16 | 1.88 | #1 | 5350 | 0.0042 Good | 0.0045 Good | 0.0045 Good |
| Example 50 | 30 | 16 | 1.88 | #1 | 5350 | 0.0045 Good | 0.0047 Good | 0.0048 Good |

In Table 6, "#1" shown in "optical Film disposal *" means a configuration of a light diffuser/a diffusion sheet/a diffusion sheet/a luminance improving film.

The diffusion sheet is BS-912 (manufactured by KEIWA Inc.), and the luminance improving film is DBEF-D400 (manufactured by Sumitomo 3M Limited).

In Table 6, "*1" shown in "layer configuration" means a single layer.

In Table 7, "#3" shown in "optical Film disposal *" means a configuration of a light diffuser/a lens sheet/a lens sheet/a luminance improving film.

In Table 7, "*1" shown in "layer configuration" means a single layer.

The diffusion sheet is BS-912 (manufactured by KEIWA Inc.).

TABLE 7

| | | Light diffuser characteristics | | | | | | | | | |
|---|---|---|---|---|---|---|---|---|---|---|---|
| | | Shaped outgoing surface shape | | | | | Entrance surface | Reflectance | Total light transmittance | | Diffusion rate | |
| | Convex-concave portion shape | θ Degree | A | b μm | c μm | d μm | g μm | U Degree | R % | T % | Tb % | S % | Layer configuration |
| Example 51 | Substantially convex triangular pyramid | 57 | 1.59 | 89 | 1 | 10 | 1 | 10 | 72 | 93 | 90 | 2 | *1 |
| Example 52 | Substantially convex triangular pyramid | 57 | 1.59 | 89 | 1 | 10 | 1 | 10 | 68 | 90 | 91 | 5 | *1 |
| Example 53 | Substantially convex triangular pyramid | 57 | 1.59 | 89 | 1 | 10 | 1 | 10 | 56 | 83 | 91 | 17 | *1 |
| Example 54 | Substantially convex triangular pyramid | 57 | 1.59 | 89 | 1 | 10 | 1 | 10 | 56 | 83 | 91 | 17 | *1 |
| Example 55 | Substantially convex triangular pyramid | 57 | 1.59 | 89 | 1 | 10 | 1 | 10 | 56 | 83 | 91 | 17 | *1 |
| Example 56 | Substantially convex triangular pyramid | 57 | 1.59 | 89 | 1 | 10 | 1 | 10 | 51 | 80 | 87 | 28 | *1 |
| Example 57 | Substantially convex triangular pyramid | 57 | 1.59 | 89 | 1 | 10 | 1 | 10 | 45 | 76 | 85 | 36 | *1 |
| Example 58 | Substantially convex triangular pyramid | 55 | 1.59 | 89 | 1 | 10 | 1 | 10 | 45 | 91 | 93 | 5 | *1 |
| Example 59 | Substantially convex triangular pyramid | 55 | 1.53 | 89 | 1 | 10 | 1 | 10 | 46 | 90 | 93 | 5 | *1 |
| Comparative example 23 | Substantially convex triangular pyramid | 55 | 1.49 | 100 | 0 | 0 | 0 | 0 | 25 | 95 | 93 | 2 | *1 |

| | Backlight characteristics | | | | | | | | | |
|---|---|---|---|---|---|---|---|---|---|---|
| | BLU specification | | | Optical | | | | | Maximum color difference of | |
| | P mm | H mm | P/H | Film disposal* | Luminance cd/cm² | Luminance unevenness value | | | color unevenness | |
| | | | | | | Front | | Oblique view | | |
| Example 51 | 30 | 16 | 1.88 | #1 | 5100 | 0.0047 | Good | 0.0048 | Good | 0.0045 | Good |
| Example 52 | 30 | 16 | 1.88 | #1 | 5280 | 0.0033 | Very good | 0.0034 | Very good | 0.0038 | Good |
| Example 53 | 30 | 16 | 1.88 | #1 | 5310 | 0.0016 | Very good | 0.0020 | Very good | 0.0030 | Very good |
| Example 54 | 30 | 16 | 1.88 | #2 | 5430 | 0.0015 | Very good | 0.0019 | Very good | 0.0029 | Very good |
| Example 55 | 30 | 16 | 1.88 | #3 | 5380 | 0.0015 | Very good | 0.0020 | Very good | 0.0029 | Very good |
| Example 56 | 30 | 16 | 1.88 | #1 | 5360 | 0.0029 | Very good | 0.0034 | Very good | 0.0037 | Good |
| Example 57 | 30 | 16 | 1.88 | #1 | 5340 | 0.0045 | Good | 0.0047 | Good | 0.0044 | Good |
| Example 58 | 30 | 16 | 1.88 | #1 | 4880 | 0.0043 | Good | 0.0045 | Good | 0.0047 | Good |
| Example 59 | 30 | 16 | 1.88 | #1 | 4860 | 0.0045 | Good | 0.0048 | Good | 0.0049 | Good |
| Comparative example 23 | 30 | 16 | 1.88 | #1 | 4620 | 0.0125 | Poor | 0.0144 | Poor | 0.0058 | Poor |

In Table 7, "#1" shown in "optical Film disposal *" means a configuration of a light diffuser/a diffusion sheet/a diffusion sheet/a luminance improving film.

In Table 7, "#2" shown in "optical Film disposal *" means a configuration of a light diffuser/a diffusion sheet/a prism sheet/a luminance improving film.

The prism sheet is BEFIII (manufactured by Sumitomo 3M Limited).

The lens sheet is PTR733 (manufactured by SHINWHA INTERTEK Co., Ltd.).

The luminance improving film is DBEF-D400 (manufactured by Sumitomo 3M Limited).

TABLE 8

| | Light diffuser characteristics | | | | | | | | | | | |
|---|---|---|---|---|---|---|---|---|---|---|---|---|
| | Shaped outgoing surface shape | | | | | | Entrance surface | Reflectance | Total light transmittance | | Diffusion rate | |
| | Convex-concave portion shape | θ Degree | A | b μm | c μm | d μm | g μm | U Degree | R % | T % | Tb % | S % | Layer configuration |
| Example 60 | Substantially convex triangular pyramid | 57 | 1.59 | 89 | 1 | 10 | 1 | 10 | 64 | 85 | 93 | 12 | *2 |
| Example 61 | Substantially convex triangular pyramid | 57 | 1.59 | 89 | 1 | 10 | 1 | 10 | 67 | 84 | 93 | 12 | *3 |
| Example 62 | Substantially convex triangular pyramid | 57 | 1.59 | 89 | 1 | 10 | 1 | 10 | 64 | 85 | 93 | 12 | *4 |

| | Backlight characteristics | | | | | | | | |
|---|---|---|---|---|---|---|---|---|---|
| | BLU specification | | | Optical Film disposal* | Luminance cd/cm² | Luminance unevenness value | | Maximum color difference of color unevenness | |
| | P mm | H mm | P/H | | | Front | Oblique view | | |
| Example 60 | 30 | 16 | 1.88 | #1 | 5310 | 0.0018 Very good | 0.0021 Very good | 0.0028 Very good | |
| Example 61 | 30 | 16 | 1.88 | #1 | 5300 | 0.0019 Very good | 0.0022 Very good | 0.0029 Very good | |
| Example 62 | 30 | 16 | 1.88 | #1 | 5340 | 0.0018 Very good | 0.0022 Very good | 0.0029 Very good | |

In Table 8, "#1" shown in "optical Film disposal *" means a configuration of a light diffuser/a diffusion sheet/a diffusion sheet/a luminance improving film.

In Table 8, "*2" shown in "layer configuration" means a two-types two-layered diffuser.

In Table 8, "*3" shown in "layer configuration" means a configuration of a shaped non-diffuser in addition to a shaped film.

In Table 8, "*4" shown in "layer configuration" means a configuration of a shaped film in addition to a shaped non-diffuser.

The diffusion sheet is BS-912 (manufactured by KEIWA Inc.).

The luminance improving film is DBEF-D400 (manufactured by Sumitomo 3M Limited).

TABLE 9

| | Light diffuser characteristics | | | | | | | | | | | |
|---|---|---|---|---|---|---|---|---|---|---|---|---|
| | Shaped outgoing surface shape | | | | | | Entrance surface | Reflectance | Total light transmittance | | Diffusion rate | |
| | Convex-concave portion shape | θ Degree | A | b μm | c μm | d μm | g μm | U Degree | R % | T % | Tb % | S % | Layer configuration |
| Example 63 | Substantially convex triangular pyramid | 57 | 1.59 | 89 | 1 | 10 | 1 | 10 | 65 | 86 | 93 | 12 | *1 |
| Example 64 | Substantially convex triangular pyramid | 57 | 1.59 | 89 | 1 | 10 | 1 | 10 | 65 | 86 | 93 | 12 | *1 |
| Example 65 | Substantially convex triangular pyramid | 57 | 1.59 | 89 | 1 | 10 | 1 | 10 | 65 | 86 | 93 | 12 | *1 |
| Example 66 | Substantially convex triangular pyramid | 57 | 1.59 | 89 | 1 | 10 | 1 | 10 | 65 | 86 | 93 | 12 | *1 |

| | Backlight characteristics | | | | | | | | |
|---|---|---|---|---|---|---|---|---|---|
| | BLU specification | | | LED arrangement | Optical Film disposal* | Luminance unevenness value | | Maximum color difference of color unevenness | |
| | P mm | H mm | P/H | | | Front | Oblique view | | |
| Example 63 | 30 | 14 | 2.14 | Arrangement 1 | #1 | 0.0027 Very good | 0.0032 Very good | 0.0034 Very good | |
| Example 64 | 30 | 12 | 2.5 | Arrangement 1 | #1 | 0.0043 Good | 0.0048 Good | 0.0046 Good | |

TABLE 9-continued

| | | | | | | | | | | | |
|---|---|---|---|---|---|---|---|---|---|---|---|
| Example 65 | 34 | 16 | 2.13 | Arrangement 2 | #1 | 0.0027 | Very good | 0.0031 | Very good | 0.0032 | Very good |
| Example 66 | 40 | 16 | 2.5 | Arrangement 3 | #1 | 0.0044 | Good | 0.0048 | Good | 0.0046 | Good |

In Table 9, "#1" shown in "optical Film disposal *" means a configuration of a light diffuser/a diffusion sheet/a diffusion sheet/a luminance improving film.

In Table 9, "*1" shown in "layer configuration" means a single layer.

The diffusion sheet is BS-912 (manufactured by KEIWA Inc.).

The luminance improving film is DBEF-D400 (manufactured by Sumitomo 3M Limited).

TABLE 10

| | Light diffuser characteristics | | | | | | | | | | | | |
|---|---|---|---|---|---|---|---|---|---|---|---|---|---|
| | Shaped outgoing surface shape | | | | | | Entrance surface | Reflectance | Total light transmittance | | Diffusion rate | | |
| | Convex-concave portion shape | θ Degree | A | b μm | c μm | d μm | g μm | U Degree | R % | T % | Tb % | S % | F Degree | α/β/γ Degree |
| Example 67 | Substantially convex triangular pyramid | 57 | 1.59 | 89 | 1 | 10 | 1 | 10 | 65 | 86 | 93 | 12 | −5 | 60/60/60 |
| Example 68 | Substantially convex triangular pyramid | 57 | 1.59 | 89 | 1 | 10 | 1 | 10 | 65 | 86 | 93 | 12 | −2 | 60/60/60 |
| Example 69 | Substantially convex triangular pyramid | 57 | 1.59 | 89 | 1 | 10 | 1 | 10 | 65 | 86 | 93 | 12 | 0 | 60/60/60 |
| Example 70 | Substantially convex triangular pyramid | 57 | 1.59 | 89 | 1 | 10 | 1 | 10 | 65 | 86 | 93 | 12 | 2 | 60/60/60 |
| Example 71 | Substantially convex triangular pyramid | 57 | 1.59 | 89 | 1 | 10 | 1 | 10 | 65 | 86 | 93 | 12 | 5 | 60/60/60 |
| Example 72 | Substantially convex triangular pyramid | 57 | 1.59 | 89 | 1 | 10 | 1 | 10 | 65 | 86 | 93 | 12 | 15 | 60/60/60 |
| Example 73 | Substantially convex triangular pyramid | 57 | 1.59 | 89 | 1 | 10 | 1 | 10 | 65 | 86 | 93 | 12 | 25 | 60/60/60 |
| Example 74 | Substantially convex triangular pyramid | 57 | 1.59 | 89 | 1 | 10 | 1 | 10 | 65 | 86 | 93 | 12 | 28 | 60/60/60 |
| Example 75 | Substantially convex triangular pyramid | 57 | 1.59 | 89 | 1 | 10 | 1 | 10 | 65 | 86 | 93 | 12 | 30 | 60/60/60 |
| Example 76 | Substantially convex triangular pyramid | 57 | 1.59 | 89 | 1 | 10 | 1 | 10 | 65 | 86 | 93 | 12 | 32 | 60/60/60 |
| Example 77 | Substantially convex triangular pyramid | 57 | 1.59 | 89 | 1 | 10 | 1 | 10 | 65 | 86 | 93 | 12 | 35 | 60/60/60 |
| Example 78 | Substantially convex triangular pyramid | 57 | 1.59 | 89 | 1 | 10 | 1 | 10 | 61 | 86 | 93 | 12 | 0 | 58/60/62 |
| Example 79 | Substantially convex triangular pyramid | 57 | 1.59 | 89 | 1 | 10 | 1 | 10 | 54 | 86 | 93 | 12 | 0 | 55/60/65 |
| Example 80 | Substantially convex triangular pyramid | 57 | 1.59 | 89 | 1 | 10 | 1 | 10 | 48 | 86 | 93 | 12 | 0 | 56/68/56 |

| | BLU specification | | | Optical Film disposal* | Backlight characteristics | | | | | |
|---|---|---|---|---|---|---|---|---|---|---|
| | P mm | H mm | P/H | LED arrangement | | Luminance cd/cm² | Luminance unevenness value | | | Maximum color difference of color unevenness | |
| | | | | | | | Front | | Oblique view | | |
| Example 67 | 30 | 17 | 1.76 | Arrangement 1 | #1 | 5310 | 0.0022 | Very good | 0.0032 | Very good | 0.0033 | Very good |
| Example 68 | 30 | 15 | 2 | Arrangement 1 | #1 | 5300 | 0.0019 | Very good | 0.0026 | Very good | 0.0029 | Very good |
| Example 69 | 30 | 15 | 2 | Arrangement 1 | #1 | 5280 | 0.0019 | Very good | 0.0023 | Very good | 0.0029 | Very good |
| Example 70 | 30 | 15 | 2 | Arrangement 1 | #1 | 5300 | 0.0018 | Very good | 0.0028 | Very good | 0.0030 | Very good |
| Example 71 | 30 | 17 | 1.76 | Arrangement 1 | #1 | 5320 | 0.0019 | Very good | 0.0030 | Very good | 0.0031 | Very good |
| Example 72 | 30 | 18 | 1.67 | Arrangement 1 | #1 | 5330 | 0.0023 | Very good | 0.0034 | Very good | 0.0034 | Very good |
| Example 73 | 30 | 17 | 1.76 | Arrangement 1 | #1 | 5300 | 0.0021 | Very good | 0.0031 | Very good | 0.0033 | Very good |
| Example 74 | 30 | 13 | 2.3 | Arrangement 1 | #1 | 5320 | 0.0020 | Very good | 0.0029 | Very good | 0.0031 | Very good |
| Example 75 | 30 | 13 | 2.3 | Arrangement 1 | #1 | 5320 | 0.0019 | Very good | 0.0027 | Very good | 0.0030 | Very good |

TABLE 10-continued

| | | | | | | | | | | | | | |
|---|---|---|---|---|---|---|---|---|---|---|---|---|---|
| Example 76 | 30 | 13 | 2.3 | Arrangement 1 | #1 | 5320 | 0.0019 | Very good | 0.0028 | Very good | 0.0030 | Very good |
| Example 77 | 30 | 17 | 1.76 | Arrangement 1 | #1 | 5310 | 0.0022 | Very good | 0.0032 | Very good | 0.0032 | Very good |
| Example 78 | 30 | 15 | 2 | Arrangement 1 | #1 | 5300 | 0.0019 | Very good | 0.0030 | Very good | 0.0029 | Very good |
| Example 79 | 30 | 17 | 1.76 | Arrangement 1 | #1 | 5290 | 0.0022 | Very good | 0.0031 | Very good | 0.0034 | Very good |
| Example 80 | 30 | 18 | 1.67 | Arrangement 1 | #1 | 5300 | 0.0020 | Very good | 0.0031 | Very good | 0.0032 | Very good |

In Table 10, "#1" shown in "optical Film disposal *" means a configuration of a light diffuser/a diffusion sheet/a diffusion sheet/a luminance improving film.

The diffusion sheet is BS-912 (manufactured by KEIWA Inc.).

The luminance improving film is DBEF-D400 (manufactured by Sumitomo 3M Limited).

Figure 16:
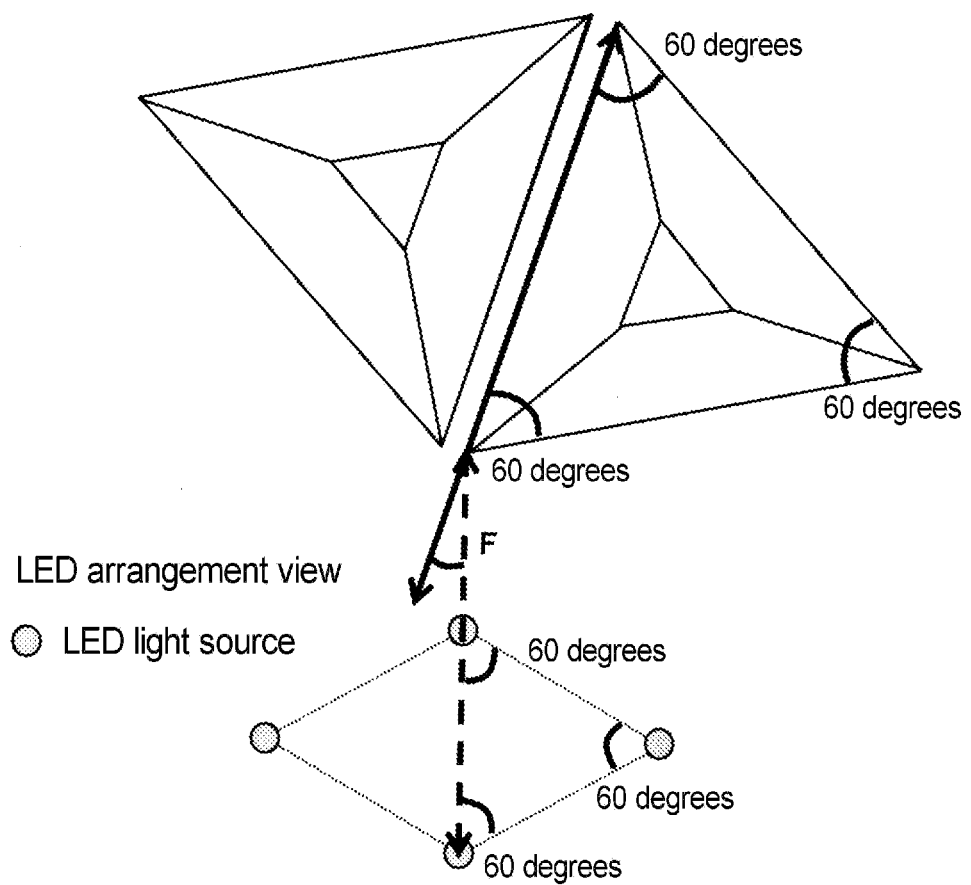
FIG. 16 is an illustration of a correlation between the convex portion triangular pyramid shape shaped on the surface of the light diffuser and the LED arrangement.
Figure 17:
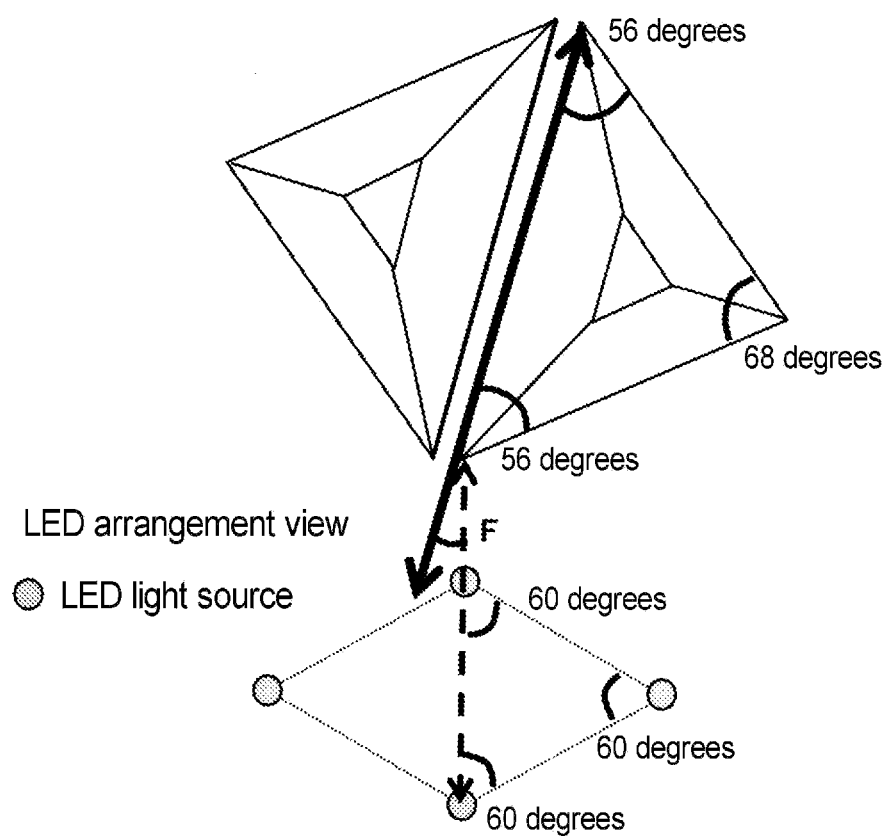
FIG. 17 is an illustration of a correlation between the convex portion triangular pyramid shape shaped on the surface of the light diffuser and the LED arrangement.
Figure 18:
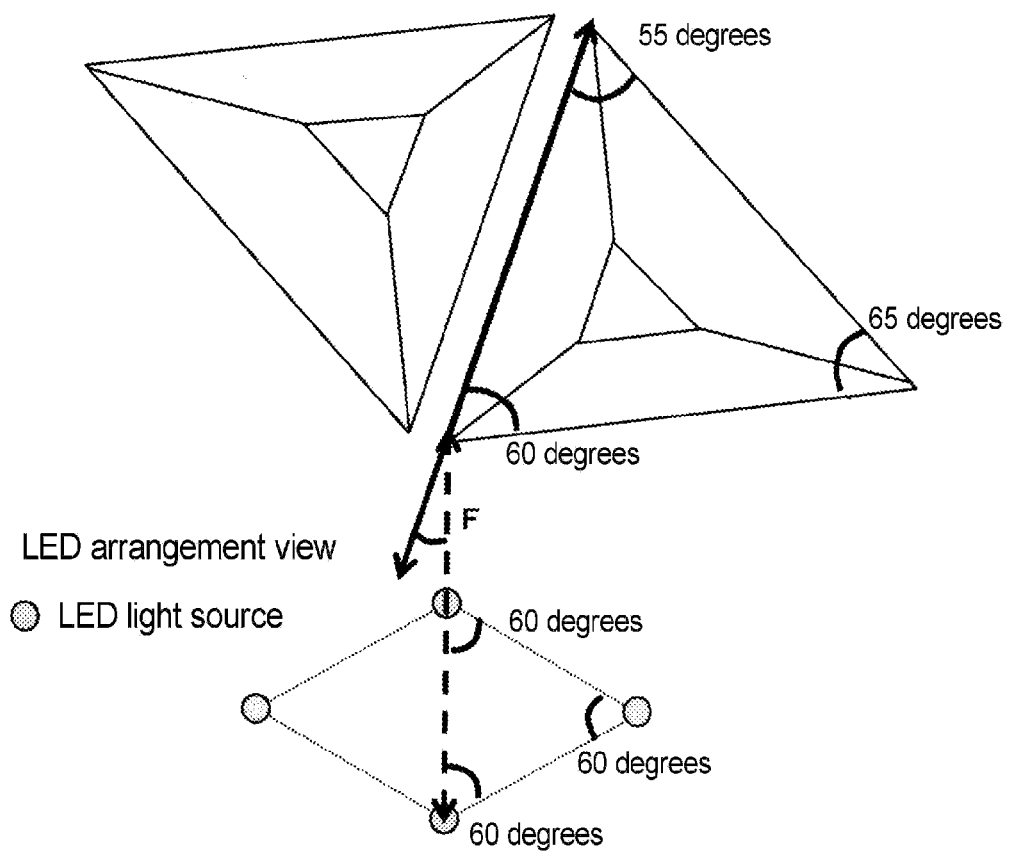
FIG. 18 is an illustration of a correlation between the convex portion triangular pyramid shape shaped on the surface of the light diffuser and the LED arrangement.

In Table 10, "arrangement 1" shown in "LED arrangement" means a staggered arrangement (Refer to FIGS. 16 to 18.) in which a distance between LEDs is 32.2 mm.

The present application is based on Japanese patent application (Japanese Patent Application No. 2009-211115) filed on Sep. 11, 2009 in Japanese Patent Office and similarly, based on Japanese patent application (Japanese Patent Application No. 2009-211117) filed on Sep. 11, 2009 in Japanese Patent Office, the contents of which are incorporated herein by reference.

INDUSTRIAL APPLICABILITY

The light diffuser of the present invention has an industrial applicability as a backlight in which arranged are point light sources, particularly point light sources whose light peak angle is −25 to 25 degrees and whose beam intensity of light right thereabove is high.

TABLE 11

| | Light diffuser characteristics | | | | | | | | | | | | |
|---|---|---|---|---|---|---|---|---|---|---|---|---|---|
| | Shaped outgoing surface shape | | | | | | Entrance surface | Reflectance | Total light transmittance | | Diffusion rate | BLU specification | |
| | Convex-concave portion shape | θ Degree | A | b μm | c μm | d μm | g μm | U Degree | R % | T % | Tb % | S % | P mm | H mm | P/H |
| Example 81 | Substantially concave triangular pyramid | 57 | 1.59 | 89 | 1 | 10 | 1 | 10 | 65 | 86 | 93 | 12 | 30 | 15 | 2 |
| Example 82 | Substantially concave triangular pyramid | 57 | 1.59 | 89 | 1 | 10 | 1 | 10 | 65 | 86 | 93 | 12 | 30 | 15 | 2 |
| Example 83 | Substantially concave triangular pyramid | 57 | 1.59 | 89 | 1 | 10 | 1 | 10 | 65 | 86 | 93 | 12 | 30 | 15 | 2 |

| | BLU specification | | Optical Film disposal* | Backlight characteristics | | | | | |
|---|---|---|---|---|---|---|---|---|---|
| | LED type | LED arrangement | | Luminance cd/cm² | Luminance unevenness value | | | | Maximum color difference of color unevenness |
| | | | | | Front | | Oblique view | | |
| Example 81 | LED-1 | Arrangement 1 | #1 | 5280 | 0.0019 | Very good | 0.0023 | Very good | 0.0029 Very good |
| Example 82 | LED-2 | Arrangement 1 | #1 | 5190 | 0.0018 | Very good | 0.0023 | Very good | 0.0033 Very good |
| Example 83 | LED-3 | Arrangement 1 | #1 | 4860 | 0.0021 | Very good | 0.0025 | Very good | 0.0041 Good |

In Table 11, "#1" shown in "optical Film disposal *" means a configuration of a light diffuser/a diffusion sheet/a diffusion sheet/a luminance improving film.

The diffusion sheet is BS-912 (manufactured by KEIWA Inc.).

The luminance improving film is DBEF-D400 (manufactured by Sumitomo 3M Limited).

In Table 11, "arrangement 1" shown in "LED arrangement" means a staggered arrangement (Refer to FIGS. 16 to 18.) in which a distance between LEDs is 32.2 mm.

Since a point light source backlight in which the light diffuser of the present invention is disposed can achieve significantly superior luminance, luminance uniformity (from front and oblique views), and a color unevenness characteristic with a desired backlight thickness using few optical films, it is useful for wide applications, such as an LED light source liquid crystal television, an LED light source signboard, and an LED light source illumination.

REFERENCE SIGNS LIST

B: a portion that satisfies (1') and (2') in a cross section of a convex portion C: a portion closer to a skirt side than B in the cross section of the convex portion D: a portion closer to a top side than C in the cross section of the convex portion α: an internal angle of a triangular bottom surface of a triangular pyramid shape convex portion shaped on a surface of a light diffuser β: an internal angle of the triangular bottom surface of the triangular pyramid shape convex portion shaped on the surface of the light diffuser γ: an internal angle of the triangular bottom surface of the triangular pyramid shape convex portion shaped on the surface of the light diffuser n1: a distance between LEDs in LED staggered arrangement n2: a distance between LEDs in the LED staggered arrangement F: an angle between one side of the triangular bottom surface of the triangular pyramid shape convex portion shaped on the surface of the light diffuser and a diagonal line of a quadrangle comprised in lattices of point light sources

The invention claimed is:

1. A light diffuser for point light sources comprising:
a plurality of convex portions formed on a surface thereof, the convex portions being convex with respect to the surface, wherein
each of the convex portions has a substantially triangular pyramid shape whose bottom surface is a triangle, and
an inclined angle θ with respect to a bottom surface of a side surface of the substantially triangular pyramid shape and a refractive index A of a material forming the convex portion satisfy the following equations (1) and (2):

$$\theta \geq -40A° + 115.2°  \qquad (1)$$

$$\theta \leq 25A° + 22.25°, \text{ and} \qquad (2)$$

wherein the light diffuser further satisfies the following conditions:

$$0 \leq g/(b+c+d) \leq 0.30 \qquad (5)$$

$$\theta' \geq -40A° + 115.2° \qquad (1')$$

$$\theta' \leq 25A° + 22.25°, \qquad (2')$$

wherein g indicates a length of a projected line segment formed when a portion which is located closer to a top side than a portion in which the angle θ' between a tangent among tangents of the one side surface of the convex portion and the bottom surface satisfies (1') and (2') is projected to the horizontal surface;

b indicates a length of a projected line segment obtained when a portion B in which an angle θ' between a tangent plane of one side surface and a bottom surface of the convex portion satisfies (1') and (2') is projected to a horizontal surface;

c indicates a length of a projected line segment obtained when a portion C which is closer to a skirt side of the convex portion than the portion B is projected to the horizontal surface;

d indicates a length of a projected line segment obtained when a portion D which is closer to a top side than the portion B is projected to the horizontal surface; and in a cutting surface appearing, the convex portion is cut at a flat surface passing through an I point, a J point, and a top of the convex portion (a center of gravity of a top triangle when the convex portion is a triangular pyramid frustum shape), wherein the I point is a projected point obtained when the top of the convex portion (the center of gravity of the triangle top when the convex portion is the triangular pyramid frustum shape) is vertically projected to the triangular bottom surface;

the J point is an intersection of a perpendicular with a side that is obtained when the perpendicular is drawn from the I point to the side closest to the I point among the sides comprised in the triangular bottom surface, wherein a single-sided portion further passes through an I' point and a J' point from a center of a cutting surface appearing when the convex portion is cut at a flat surface perpendicular to the triangle bottom surface, wherein the I' point is a midpoint of a line segment obtained by connecting a point obtained when the top of the convex portion (the center of gravity of the triangle top when the convex portion is the triangular pyramid frustum shape) is vertically projected to the triangle bottom surface with a top of the triangular bottom surface closest to the projected point among the tops of the triangular bottom surface;

the J' point is an intersection of a perpendicular with a side that is obtained when the perpendicular is drawn from the I' point to the side closest to the I' point among the sides comprised in the triangular bottom surface; and when there exist a plurality of cutting surfaces that satisfy the conditions, the cutting surface where g has a maximum value is adopted.

2. The light diffuser for the point light sources according to claim 1, wherein the inclined angle θ and the refractive index A satisfy the following equations (3) and (4):

$$\theta \geq -40A° + 116.2° \qquad (3)$$

$$\theta \leq 25A° + 20.25°. \qquad (4)$$

3. The light diffuser for the point light sources according to claim 1 or 2, wherein the inclined angle θ satisfies θ≠55°.

4. The light diffuser for the point light sources according to claim 1, wherein
an average reflectance R is not less than 45%, and
the average reflectance R is obtained when a light with a wavelength of 450 to 750 nm enters the surface from a surface side opposite to the convex portion formed surface side of the light diffuser at a seven degrees incident angle inclined with respect to the horizontal surface of the light diffuser.

5. The light diffuser for the point light sources according to claim 1, wherein a sum of the b, c, and d is 5 to 200 μm.

6. The light diffuser for the point light sources according to claim 1, comprising:
at least an (a) lens layer and a (b) diffusion layer, wherein
the (a) lens layer and the (b) diffusion layer are any layer selected from a group consisting of a same layer, a continuous layer, and separation layers, and
the convex portion is formed on a surface of the (a) lens layer.

7. The light diffuser for the point light sources according to claim 6, wherein the (b) diffusion layer contains transparent resin and a diffusing agent, and a diffusion rate S thereof is 2 to 40%.

8. The light diffuser for the point light sources according to claim 6 or 7, comprising:
an (a) lens layer and a (b) diffusion layer, wherein
a sum of thicknesses of the (a) lens layer and the (b) diffusion layer is 0.5 to 3.0 mm.

9. A direct type point light source backlight device, comprising:
a plurality of point light sources; and
a light diffuser according to claim 1 or claim 2 which is disposed above the point light sources, and in which a plurality of substantially triangular pyramid shape convex portions whose bottom surfaces are triangles are formed in a surface of a surface side opposite to a surface side opposed to the point light sources; and
a diffusive reflection sheet disposed under the point light sources.

10. The direct type point light source backlight device according to claim 9, wherein each of the point light sources is an LED light source whose light peak angle is −25 to 25°.

11. The direct type point light source backlight device according to claim 9, wherein a diffuse reflectance of the diffusive reflection sheet is not less than 90%.

12. The direct type backlight device according to claim 9, further comprising at least two optical films having a light-collecting function at a light outgoing surface side of the light diffuser.

13. The direct type backlight device according to claim 9, wherein an average pitch of the point light sources is set to be P,
a distance from the point light source to the light diffuser is set to be H, and
P/H falls in a range of 1.5 to 2.5.

14. A direct type backlight device, comprising:
a plurality of point light sources; and
the light diffuser according to claim 1 or claim 2, wherein
the plurality of point light sources are periodically arranged in a lattice,
the plurality of convex portions of the light diffuser are periodically arranged so that sides of triangular bottom surfaces of the adjacent convex portions are parallel to each other, and
the plurality of point light sources and the light diffuser are laminated so that any one side of the triangle bottom surface of each convex portion of the light diffuser is parallel to or perpendicular to diagonal lines of a quadrangle comprised in lattices of lattice-shaped arrangement of the point light sources.

15. A direct type backlight device, comprising:
a plurality of point light sources; and
the light diffuser according to claim 1 or claim 2, wherein
the plurality of point light sources are periodically arranged in a lattice,
the plurality of convex portions are substantially triangular pyramid shapes whose bottom surfaces are isosceles triangles,
the plurality of convex portions of the light diffuser are periodically arranged so that bases of isosceles triangular bottom surfaces of the adjacent convex portions are parallel to each other, and
the plurality of point light sources and the light diffuser are laminated so that a base of the isosceles triangle bottom surface of each convex portion of the light diffuser is parallel to or perpendicular to diagonal lines of quadrangles comprised in lattices of lattice-shaped arrangement of the point light sources.

16. A direct type backlight device, comprising:
a plurality of point light sources; and
the light diffuser according to claim 1 or claim 2, wherein
the plurality of point light sources are periodically arranged in a lattice,
the plurality of convex portions are substantially triangular pyramid shapes whose bottom surfaces are equilateral triangles,
the plurality of convex portions are periodically arranged so that one sides of equilateral triangular bottom surfaces of the adjacent convex portions may be parallel to each other, and
the plurality of point light sources and the light diffuser are laminated so that any one side of the equilateral triangle bottom surface of the each convex portion of the light diffuser is parallel to or perpendicular to diagonal lines of quadrangles comprised in lattices of lattice-shaped arrangement of the point light sources.

\* \* \* \* \*